US010328972B2

(12) United States Patent
Fujita et al.

(10) Patent No.: US 10,328,972 B2
(45) Date of Patent: Jun. 25, 2019

(54) ROTATION DETECTING APPARATUS AND ELECTRIC POWER STEERING APPARATUS USING THE SAME

(71) Applicant: DENSO CORPORATION, Kariya, Aichi-pref. (JP)

(72) Inventors: Toshihiro Fujita, Kariya (JP); Hideki Kabune, Kariya (JP); Katsuhiko Hayashi, Kariya (JP); Takaharu Kozawa, Kariya (JP); Shuhei Miyachi, Kariya (JP); Koichi Nakamura, Kariya (JP); Yuki Watanabe, Kariya (JP); Atsuko Oka, Kariya (JP); Shuji Kuramitsu, Kariya (JP); Toshimitsu Sakai, Kariya (JP); Masaya Taki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/479,066

(22) Filed: Apr. 4, 2017

(65) Prior Publication Data

US 2017/0291640 A1 Oct. 12, 2017

(30) Foreign Application Priority Data

Apr. 6, 2016 (JP) .................................. 2016-076676
Feb. 10, 2017 (JP) .................................. 2017-023440

(51) Int. Cl.
*B62D 15/02* (2006.01)
*B62D 5/04* (2006.01)
(Continued)

(52) U.S. Cl.
CPC ....... *B62D 15/0235* (2013.01); *B62D 5/0409* (2013.01); *B62D 5/049* (2013.01);
(Continued)

(58) Field of Classification Search
None
See application file for complete search history.

(56) References Cited

U.S. PATENT DOCUMENTS 9,540,036 B2 * 1/2017 Harada .................. B62D 5/049
2005/0236221 A1 * 10/2005 Ura .......................... B62D 6/10
180/443
(Continued)

FOREIGN PATENT DOCUMENTS

JP      2015-116964 A    6/2015
JP      2018-128429      8/2018
(Continued)

OTHER PUBLICATIONS

U.S. Appl. No. 15/480,182, filed Apr. 5, 2017, Yamasaki.

*Primary Examiner* — Tamara L Weber
(74) *Attorney, Agent, or Firm* — Knobbe, Martens, Olson & Bear, LLP

(57) ABSTRACT

In a rotation detecting apparatus, a sensor includes a sensor element outputting a measurement value representing rotation of a detection target, and a circuit module. The circuit module includes a rotational angle calculator calculating, based on the measurement value, rotational angle information indicative of a rotational angle of the detection target. The rotational angle calculator generates a rotational angle signal including the rotational angle information. The circuit module includes a rotation number calculator calculating, based on the measurement value, rotation number information representing the number of rotations of the detection target. The rotation number calculator generates a rotation number signal including the rotation number information. An output unit outputs, as an output signal, a series of the rotational angle signal and the rotation number signal. A controller obtains the output signal from the communicator, and calculates, based on the output signal, information about the rotation of the detection target.

23 Claims, 29 Drawing Sheets

US 10,328,972 B2
Page 2

(51) Int. Cl.
*G01D 5/14* (2006.01)
*G01D 18/00* (2006.01)

(52) U.S. Cl.
CPC ............... *G01D 5/14* (2013.01); *G01D 5/145* (2013.01); *G01D 18/00* (2013.01)

(56) References Cited

U.S. PATENT DOCUMENTS

| | | | |
|---|---|---|---|
| 2006/0293818 A1* | 12/2006 | Lu | B62D 15/0235 701/41 |
| 2012/0273290 A1* | 11/2012 | Kawano | B62D 5/046 180/443 |
| 2014/0035493 A1* | 2/2014 | Ajima | H02P 6/12 318/400.04 |
| 2014/0336878 A1* | 11/2014 | Yanai | G01D 5/145 701/41 |
| 2014/0353073 A1* | 12/2014 | Banno | B62D 5/0481 180/446 |
| 2014/0367189 A1* | 12/2014 | Minoshima | B62D 5/06 180/422 |
| 2015/0175191 A1 | 6/2015 | Harada et al. | |
| 2015/0239496 A1 | 8/2015 | Kozawa et al. | |
| 2015/0239501 A1 | 8/2015 | Fujita et al. | |
| 2016/0288823 A1* | 10/2016 | Mikamo | B62D 5/0463 |

FOREIGN PATENT DOCUMENTS

| | | |
|---|---|---|
| JP | 2018-129995 | 8/2018 |
| JP | 2018-129996 | 8/2018 |
| JP | 2018-130007 | 8/2018 |

* cited by examiner

FIG.19A

| RUN COUNTER SIGNAL | $\theta m\_pk$ | $\theta m\_qk$ | $Tc\_pk$ | STATUS SIGNAL | CRC |

FIG.19B

| RUN COUNTER SIGNAL | $\theta m\_pk$ | $\theta m\_qk$ | $Tc\_pk$ | $Tc\_qk$ | STATUS SIGNAL | CRC |

ROTATION DETECTING APPARATUS AND ELECTRIC POWER STEERING APPARATUS USING THE SAME

CROSS REFERENCE TO RELATED APPLICATIONS

This application is based on and claims the benefit of priority from Japanese Patent Applications 2016-076676 and 2017-023440 respectively filed on Apr. 6, 2016 and Feb. 10, 2017, the disclosure of which is incorporated in its entirety herein by reference.

TECHNICAL FIELD

The present disclosure relates to rotation detecting apparatuses, and electric power steering apparatuses (EPS) using the rotation detecting apparatuses.

BACKGROUND

Various rotation detecting apparatuses include a magnetic sensor for measuring magnetic change based on rotation of a motor, and generate information indicative of rotation of the motor based on the measured magnetic change.

For example, Japanese Patent Application Publication 2015-116964 discloses a typical one of these known apparatuses. Specifically, this JP Patent Publication discloses an electronic control unit for an electric power steering apparatus including a motor that generates torque for assisting a driver's turning effort of a steering wheel.

The electronic control unit includes first and second magnetic sensors, which are an example of first and second rotation sensors.

The first magnetic sensor measures magnetic change based on rotation of a motor, and outputs a first rotation signal indicative of the measured magnetic change. The second magnetic sensor, which is separately disposed from the first magnetic sensor, measures magnetic change based on rotation of the motor, and outputs a second rotation signal indicative of the measured magnetic change.

The electronic control unit also includes a control section that generates, based on the first rotation signal and the second rotation signal, information indicative of the rotational angle of the motor. Then, the control section calculates, based on the generated rotational angle information, the position of the steering wheel.

SUMMARY

The JP Patent Publication is configured such that the first and second magnetic sensors independently measure magnetic change based on rotation of the motor, and independently output the first and second rotation signals each including the corresponding measured magnetic change. This configuration therefore may result in at least the output timing of the first rotation signal from the first magnetic sensor deviating from the output timing of the second rotation signal from the second magnetic sensor.

This deviation may result in the position of the steering wheel calculated based on the rotational angle information deviating from an actual position of the steering wheel.

In view of the circumstances, a first aspect of the present disclosure seeks to provide a rotation detecting apparatus and an electric power steering apparatus using the rotation detecting apparatus, each of which is capable of addressing the problem set forth above.

Specifically, a second aspect of the present disclosure seeks to provide such a rotation detecting apparatus and such an electric power steering apparatus, each of which is capable of reducing at least the deviation between output timing of a rotational angle signal and output timing of a rotation number signal.

According to a first exemplary aspect of the present disclosure, there is provided a rotation detecting apparatus. The rotation detecting apparatus includes a sensor including a sensor element that outputs a measurement value indicative of rotation of a detection target, and a circuit module. The circuit module includes a rotational angle calculator configured to calculate, based on the measurement value, rotational angle information indicative of a rotational angle of the detection target, and generate a rotational angle signal including the rotational angle information. The circuit module includes a rotation number calculator configured to calculate, based on the measurement value, rotation number information indicative of the number of rotations of the detection target, and generate a rotation number signal including the rotation number information. The circuit module includes an output unit configured to output, as an output signal, a series of at least the rotational angle signal and the rotation number signal. The rotation detecting apparatus includes a controller configured to obtain the output signal from the communicator, and calculate, based on the output signal, information associated with the rotation of the detection target.

According to a second exemplary aspect of the present disclosure, there is provided an electric power steering apparatus. The electric power steering apparatus includes a motor configured to provide assist torque for assisting a driver's operation of a steering wheel, and the rotation detecting apparatus according to the first exemplary aspect. The sensor element of the rotation detecting apparatus is configured to output the measurement value indicative of rotation of the motor as the detection target.

The rotation detecting apparatus according to each of the first and second exemplary aspects is configured such that the output unit outputs, to the controller, the output signal comprised of the series of at least the rotational angle signal and the rotation number signal. The controller obtains the output signal from the communicator, and calculates, based on the output signal, information associated with the rotation of the detection target.

This enables a set of the rotational angle signal, which includes the rotational angle information, and the rotation number signal, which includes the rotation number information, to be sent to the controller. This results in reduction in the deviation between the output timing of the rotational angle signal to the controller and the output timing of the rotation number signal to the controller.

BRIEF DESCRIPTION OF THE DRAWINGS

Other aspects of the present disclosure will become apparent from the following description of embodiments with reference to the accompanying drawings in which:

FIG. 19A is a view schematically illustrating an example of the structure of a communication frame of an output signal according to the sixth embodiment;

FIG. 19B is a view schematically illustrating an example of the structure of the communication frame of the output signal according to a modification of the sixth embodiment;

DETAILED DESCRIPTION OF EMBODIMENT

Figure 1:
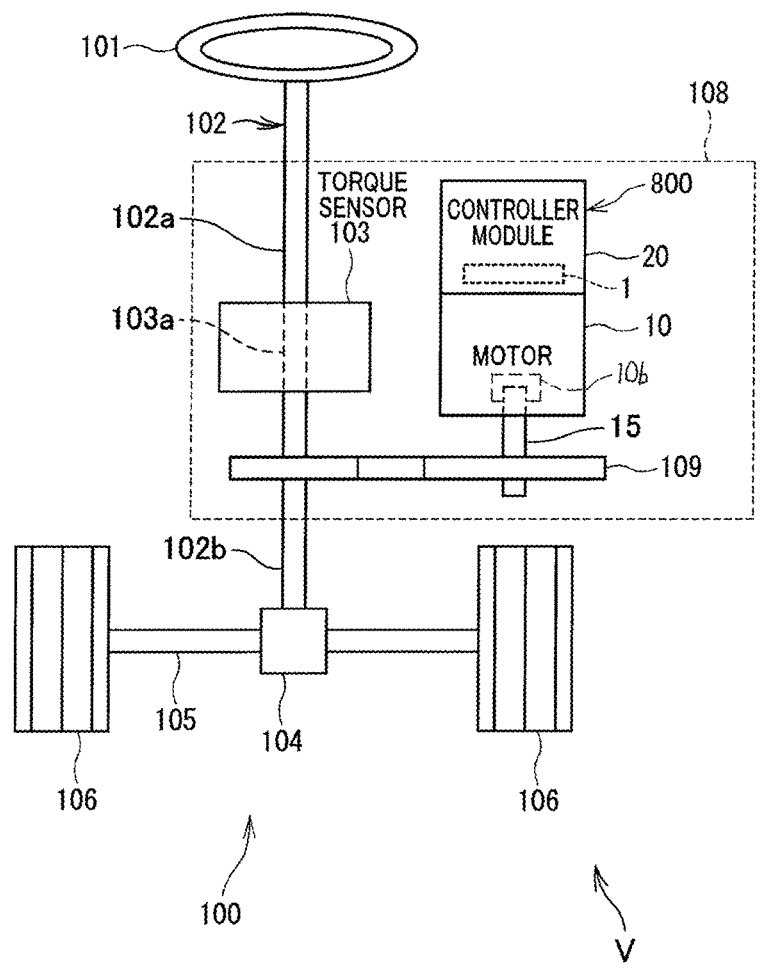
FIG. 1 is a structural diagram schematically illustrating a steering system according to the first embodiment of the present disclosure.

The following describes preferred embodiments of the present disclosure with reference to the accompanying drawings. In the embodiments, like parts between the embodiments, to which like reference characters are assigned, are omitted or simplified to avoid redundant description.

First Embodiment

The following describes the first embodiment of the present disclosure with reference to FIGS. 1 to 11.

Referring to FIG. 1, a rotation detecting apparatus 1 according to the first embodiment is installed in, for example, a drive apparatus 800 of a steering apparatus 100 that includes an electronic power steering apparatus 108. The electronic power steering apparatus 108 is installed in a vehicle V. The electronic power steering apparatus 108 is operative to assist a driver's steering operation of a steering wheel 101 of the vehicle V. The drive apparatus 800 includes a motor 10 with a shaft 15 and a controller module 20 that are integrated with each other to constitute a motor module. FIG. 1 illustrates the controller module 20.

In particular, FIG. 1 schematically illustrates an example of the overall structure of the steering apparatus 100 including the electronic power steering apparatus 108. The steering apparatus 100 is comprised of, for example, the steering wheel 101 as a driver's operation member, a steering shaft 102, a torque sensor 103, a pinion gear 104, a rack axle 105, wheels 106, and the electronic power steering apparatus 108.

The steering shaft 102 is comprised of, for example, a first portion, i.e. an upper portion, 102a and a second portion, i.e. a lower portion, 102b. Each of the first and second portions 102a and 102b of the steering shaft 102 also has opposing first and second ends.

The steering wheel 101 is connected to the first end of the first portion 102a of the steering shaft 102. The torque sensor 103 is mounted to the steering shaft 102; the torque sensor 103 is operative to measure torque based on a driver's steering operation of the steering shaft 102 as steering torque, and output a measurement signal indicative of the measured torque. The torque sensor 103 includes a torsion bar 103a having opposing first and second ends. The second end of the first portion 102a of the steering shaft 102 is coaxially connected to the first end of the torsion bar 103a, and the second end of the torsion bar 103a is coaxially connected to the first end of the second portion 102b of the steering shaft 102. The pinion gear 104 is mounted to the second end of the second portion 102b of the steering shaft 102.

The torque sensor 103 measures the twist of the torsion bar 103a based on a driver's steering operation of the steering shaft 102 as steering torque.

The rack axle 105 includes a rod-shaped rack with which the pinion gear 104 is engaged. The rack axle 105 also includes tie rods each having opposing first and second ends. The first end of each of the tie rods is coupled to a corresponding one of both ends of the rod-shaped rack. One of the wheels 106 is mounted to the second end of a corresponding one of the tie rods, and the other of the wheels 106 is also mounted to the second end of a corresponding one of the tie rods.

Driver's turning of the steering wheel 101 causes the steering shaft 102 coupled to the steering wheel 101 to turn. This rotary motion, i.e. torque, of the steering shaft 102 is transformed to linear motion of the rack of the rack axle 105. This linear motion of the rack of the rack axle 105 causes the wheels 106 to steer via the respective tie rods. The steering angle of each of the wheels 106 is determined based on the axial displacement of the rack of the rack axle 105.

The electric power steering apparatus 108 includes, for example, the drive apparatus 800, a deceleration gear mechanism 109 serving as, for example, a power transfer mechanism, and the torque sensor 103. The deceleration gear mechanism 109 includes, for example, a first gear coupled to the shaft 15 of the motor 10, and a second gear engaged with the first gear and mounted to the steering shaft 102. For example, the deceleration gear mechanism 109 is operative to transfer assist torque generated based on the turning of the shaft 15 of the motor 10 to the steering shaft 102 while decelerating the rotational speed of the motor 10, i.e. increasing the assist torque generated by the motor 10 by a predetermined gear ratio between the first gear and the second gear.

Specifically, the electric power steering apparatus 108 is configured such that the controller module 20 of the drive apparatus 800 causes the motor 10 to generate assist torque based on steering torque measured by the torque sensor 103 and/or vehicle operating condition signals. The vehicle operating condition signals, which include, for example, the speed of the vehicle V, represent the operating conditions of the vehicle V, and is sent from another electronic control unit via an in-vehicle network, such as an unillustrated controller area network (CAN).

Specifically, the electric power steering apparatus 108 according to the first embodiment is designed as a shaft assist system for assisting the turning of the steering shaft 102 based on the assist torque generated by the motor 10. The electric power steering apparatus 108 according to the first embodiment can be designed as a rack assist system for assisting the axial displacement of the rack of the rack axle 105 based on the assist torque generated by the motor 10. That is, the first embodiment is configured such that the steering shaft 102 serves as a target to be assisted, but the rack axle 105 can serve as a target to be assisted.

Figure 2:
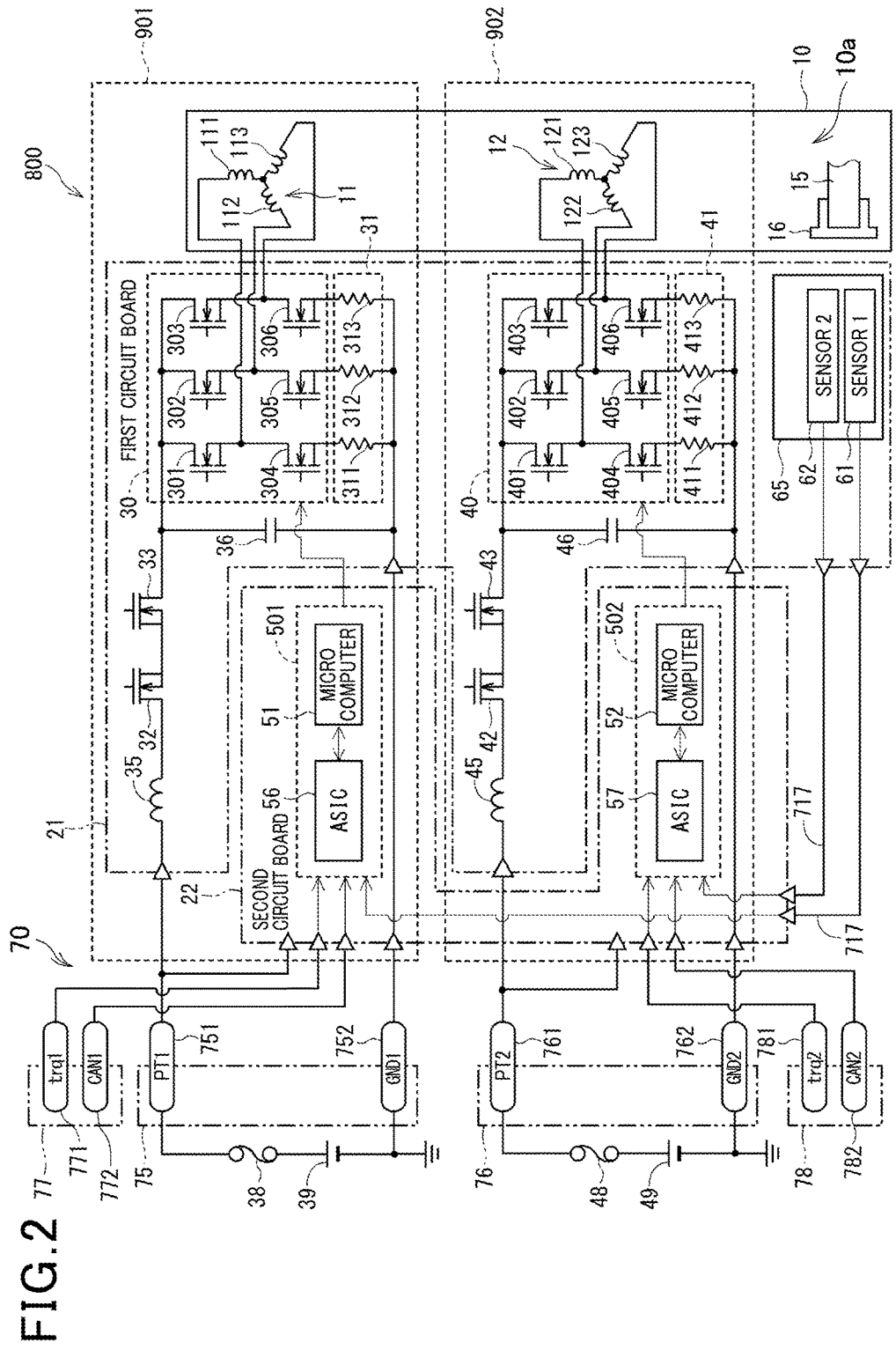
FIG. 2 is a circuit diagram schematically illustrating a drive apparatus illustrated in FIG. 1.

Next, the following describes an example of the electrical configuration of the electric power steering apparatus 108 with reference to FIG. 2. Note that, in FIG. 2, connection wires in each of first and second circuit boards, i.e. substrates, 21 and 22 described later, and correction wires between the first and second circuit boards 21 and 22 are illustrated with thinner lines, and some of the connection wires are omitted to avoid complicated illustration of the electrical configuration of the electric power steering apparatus 108.

The motor 10 is designed as, for example, a three-phase brushless motor comprised of, for example, a stator 10a, a rotor 10b, the shaft 15, and an unillustrated magnetic field member, such as permanent magnets, a field coil, and the like. The stator 10a includes, for example, an unillustrated stator core, a first coil set 11 of three-phase coils, i.e. U1, V1, and W1-phase coils, 111, 112, and 113, and a second coil set 12 of three-phase coils, i.e. U2, V2, and W2-phase coils, 121, 122, and 123. The rotor 10b, to which the shaft 15 is mounted, is configured to be rotatable relative to the stator core together with the shaft 15. The three-phase coils 111, 112, and 113 of the first coil set 11, and the three-phase coils 121, 122, and 123 of the second coil set 12 are wound in, for example, slots of the stator core and around the stator core. The magnetic field member is mounted to the rotor 10b for generating a magnetic field. That is, the motor 10 is capable of rotating the rotor 10b based on magnetic interactions between the magnetic field generated by the magnetic field member of the rotor 10b and a rotating magnetic field generated by the three-phase coils 111, 112, and 113 of the first coil set 11 and the three-phase coils 121, 122, and 123 of the second coil set 12 of the stator 10a.

Note that currents flowing through respective U1, V1, and W1 phase coils 111, 112, and 113 will be referred to as phase currents Iu1, Iv1, and Iw1, and similarly currents flowing through respective U2, V2, and W2 phase coils 121, 122, and 123 will be referred to as phase currents Iu2, Iv2, and Iw2.

As illustrated in FIG. 2, the controller module 20 includes the first and second boards 21 and 22, first and second inverters 30 and 40, first and second current sensors 31 and 41, and first and second relays 32 and 42. The controller module 20 also includes first and second reverse-connection protection relays 33 and 43, choke coils 35 and 45, first and second capacitors 36 and 46, and first and second motor control units 501 and 502.

In particular, the rotation detecting apparatus 1 installed in the drive apparatus 800 is comprised of a sensor package 65. The sensor package 65 includes a first sensor 61 and a second sensor 62 each configured to measure rotation of the rotor 10b of the motor 10. The first sensor 61 and the second sensor 62 are illustrated respectively as SENSOR 1 and SENSOR 2 in FIG. 2.

Figure 3:
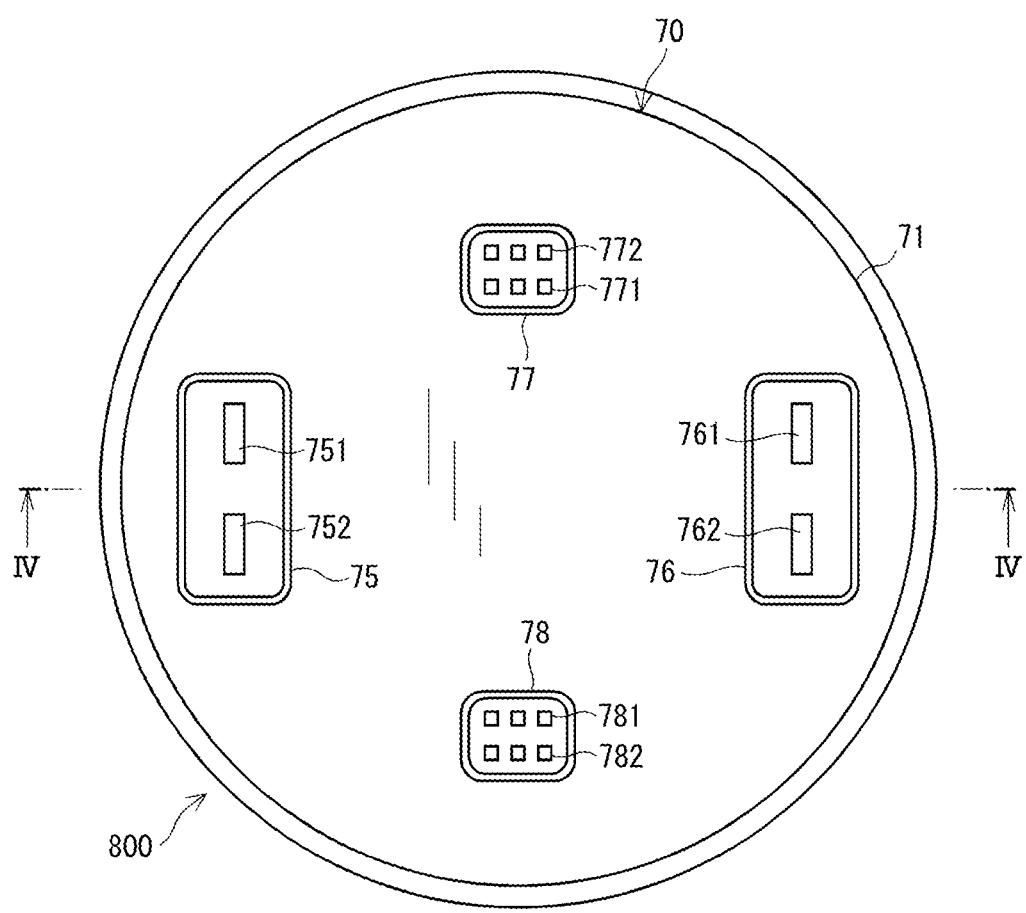
FIG. 3 is a plan view of the drive apparatus illustrated in FIG. 1.
Figure 4:
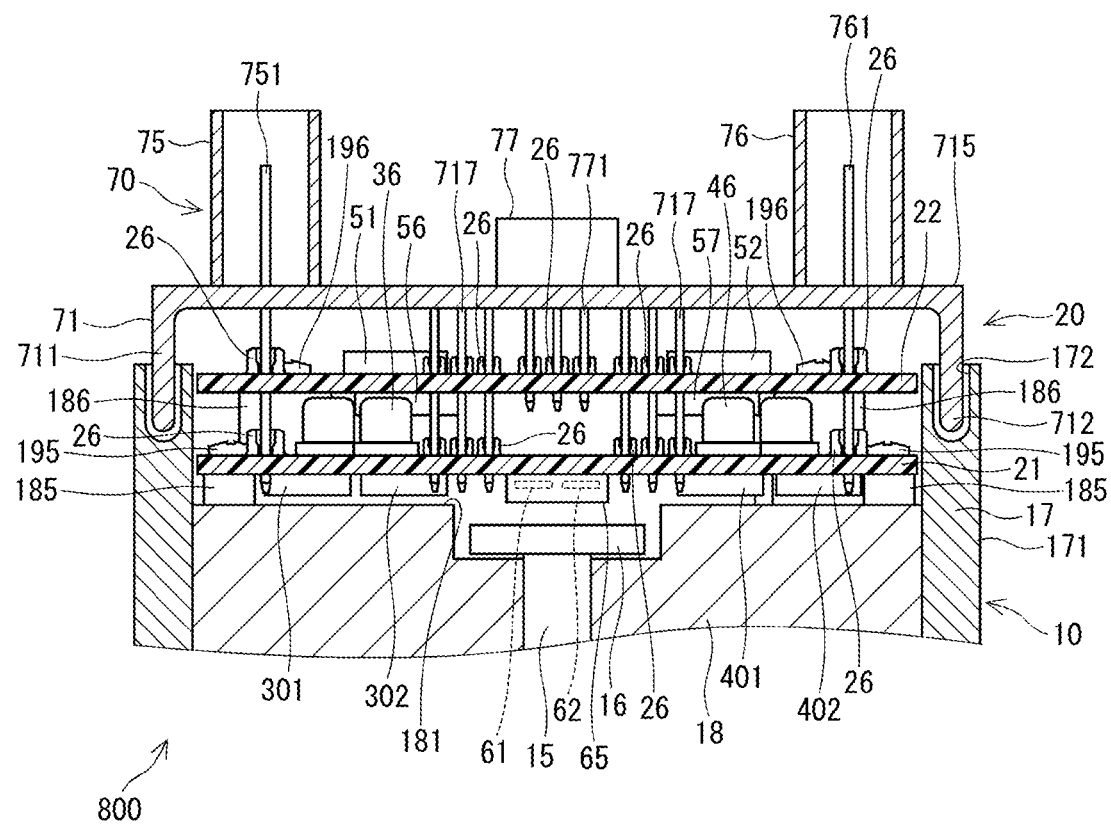
FIG. 4 is a cross sectional view taken on line IV-IV of FIG. 3.

The drive apparatus 800 includes first and second batteries 39 and 49, fuses 38 and 48, and a connector unit 70 (see FIGS. 3 and 4). The connector unit 70 includes first and second power-supply connectors 75 and 76, and first and second signal connectors 77 and 78.

The first battery 39 has a positive terminal and a negative terminal, and the positive terminal of the first battery 39 is connected to the first power-supply connector 75 via the fuse 38, and the negative terminal of the first battery 39 is connected to the first power-supply connector 75. The first battery 39 is connected to the first inverter 30 via the fuse 38, the first power-supply connector 75, the first choke coil 35, the first relay 32, the first reverse-connection protection relay 33, and the first capacitor 36. The first inverter 30 is connected to the three-phase coils 111, 112, and 113 of the first coil set 11.

The first inverter 30 is comprised of six switching elements 301 to 306 connected in bridge configuration.

Specifically, the switching elements 301 and 304 are a pair of U-phase upper- and lower-arm switching elements connected in series to each other, and the switching elements 302 and 305 are a pair of V-phase upper- and lower-arm switching elements connected in series to each other. Additionally, the switching elements 303 and 306 are a pair of W-phase upper- and lower-arm switching elements connected in series to each other.

The switching elements 301 to 306 are for example semiconductor switching elements, such as metal-oxide-semiconductor field-effect transistors (MOSFETs). The first embodiment uses MOSFETs as the respective switching elements 301 to 306, switching elements 401 to 406 described later, and the relays 32, 33, 42, and 43, but can use other types of switching elements, such as Insulated-gate bipolar transistors (IGBTs), in place of the MOSFETs. That is, one of various types of switching elements, such as MOSFETs or IGBTs, can be used for each of switching elements 301 to 306, switching elements 401 to 406 described later, and the relays 32, 33, 42, and 43.

The intrinsic diode of each of the switching elements 301 to 306 comprised of the MOSFETs 301 to 306 can serve as a flywheel diode connected in antiparallel to the corresponding one of the switching elements 301 to 306. Other flywheel diodes can be connected in antiparallel to the respective switching elements 301 to 306.

That is, the source of each of the upper-arm switching elements 301 to 303 is connected to the drain of the corresponding one of the lower-arm switching elements 304 to 306. The drains of the switching elements 301 to 303 are commonly connected to the positive terminal of the first battery 39 via the first reverse-connection protection relay 33, the first relay 32, the first choke coil 35, the first power-supply connector 75, and the fuse 38.

The first current sensor 31 includes current sensing elements 311, 312, and 313. For example, each of the current sensing elements 311, 312, and 313 is comprised of a shunt resistor. Each of the current sensing elements 311 to 313 has opposing first and second ends. The first end of each of the current sensing elements 311 to 313 is connected to the source of a corresponding one of the lower-arm switching elements 304, 305, and 306. The second end of each of the current sensing elements 311 to 313 is connected to the negative terminal of the first battery 39 via a common signal ground and the first power-supply connector 75. This results in the first series connection of the switching elements 301 and 304 and the current sensing element 311, the second series connection of the switching elements 302 and 305 and the current sensing element 312, and the third series connection of the switching elements 303 and 306 and the current sensing element 313 being connected in parallel to the first battery 39.

The connection point between the U-phase upper- and lower-arm switching elements 301 and 304 is connected to a first end of the U1-phase coil 111, and the connection point between the V-phase upper- and lower-arm switching elements 302 and 305 is connected to a first end of the V1-phase coil 112. Additionally, the connection point between the W-phase upper- and lower-arm switching elements 303 and 306 is connected to a first end of the W1-phase coil 113. Second ends of the U1, V1-, and W1-phase coils, which are opposite to the first ends, are connected to a common junction, i.e. a neutral point, in, for example, a star-configuration.

Other types of current sensing elements, such as Hall elements, can be used as the current sensing elements 311 to 313 and 411 to 413 described later.

The first inverter 30 is configured to receive direct-current (DC) power supplied from the first battery 39, and convert the DC power into alternating-current (AC) power. Then, the first inverter 30 is configured to apply the AC power to the three-phase coils 111, 112, and 113 of the first coil set 11.

The first power-supply relay 32, which is a MOSFET as an example, is provided between the first battery 39 and the first inverter 30, and configured to establish an electrical path therebetween when turned on, and interrupt the electrical path when turned off. The first reverse-connection protection relay 33, which is a MOSFET as an example, is connected between the first relay 32 and the first inverter 30 while the forward direction of the intrinsic diode of the first reverse-connection protection relay 33 is opposite to the forward direction of the intrinsic diode of the first power-supply relay 32. This would prevent a current from flowing from the first inverter 30 to the first battery 39 even if the first battery 39 were connected such that the positive terminal of the first battery 39 were connected to the common signal ground and the positive terminal of the first battery 39 were connected to the fuse 38.

The first choke coil 35 is connected between the first power-supply relay 32 and the first battery 39 via the first power-supply connector 75, and the fuse 38. The first capacitor 36 is connected in parallel to each of the first to third series connections of the first inverter 30. The first choke coil 35 and the first capacitor 36 constitute a filter circuit that reduces noise transferred from other devices sharing the first battery 39, and also reduces noise transferred from the drive apparatus 800 to the other devices sharing the first battery 39. The first capacitor 36 is operative to store electrical charge, thus supporting power supply to the first inverter 30.

The second battery 49 has a positive terminal and a negative terminal, and the positive terminal of the second battery 49 is connected to the second power-supply connector 76 via the fuse 48, and the negative terminal of the second battery 49 is connected to the second power-supply connector 76. The second battery 49 is connected to the second inverter 40 via the fuse 48, the second power-supply connector 76, the choke coil 45, the second relay 42, the second reverse-connection protection relay 43, and the second capacitor 46, and the second inverter 40 is connected to the three-phase coils 121, 122, and 123 of the second coil set 12.

The second inverter 40 is comprised of six switching elements 401 to 406 connected in bridge configuration.

Specifically, the switching elements 401 and 404 are a pair of U-phase upper- and lower-arm switching elements connected in series to each other, and the switching elements 402 and 405 are a pair of V-phase upper- and lower-arm switching elements connected in series to each other. Additionally, the switching elements 403 and 406 are a pair of W-phase upper- and lower-arm switching elements connected in series to each other.

The switching elements 401 to 406 are for example semiconductor switching elements, such as metal-oxide-semiconductor field-effect transistors (MOSFETs) like the switching elements 301 to 306.

The intrinsic diode of each of the switching elements 401 to 406 comprised of the MOSFETs 401 to 406 can serve as a flywheel diode connected in antiparallel to the corresponding one of the switching elements 401 to 406. Other flywheel diodes can be connected in antiparallel to the respective switching elements 401 to 406.

That is, the source of each of the upper-arm switching elements 401 to 403 is connected to the drain of the corresponding one of the lower-arm switching elements 404 to 406. The drains of the switching elements 401 to 403 are commonly connected to the positive terminal of the second battery 49 via the second reverse-connection protection relay 43, the second relay 42, the second choke coil 45, the second power-supply connector 76, and the fuse 48.

The second current sensor 41 includes current sensing elements 411, 412, and 413. For example, each of the current sensing elements 411, 412, and 413 is comprised of a shunt resistor like the first current sensor 31. Each of the current sensing elements 411 to 413 has opposing first and second ends. The first end of each of the current sensing elements 411 to 413 is connected to the source of a corresponding one of the lower-arm switching elements 404, 405, and 406. The second end of each of the current sensing elements 411 to 413 is connected to the negative terminal of the second battery 49 via a common signal ground and the second power-supply connector 76. This results in the first series connection of the switching elements 401 and 404 and the current sensing element 411, the second series connection of the switching elements 402 and 405 and the current sensing element 412, and the third series connection of the switching elements 403 and 406 and the current sensing element 413 being connected in parallel to the second battery 49.

The connection point between the U-phase upper- and lower-arm switching elements 401 and 404 is connected to a first end of the U2-phase coil 121, and the connection point between the V-phase upper- and lower-arm switching elements 402 and 405 is connected to a first end of the V2-phase coil 122. Additionally, the connection point between the W-phase upper- and lower-arm switching elements 403 and 406 is connected to a first end of the W2-phase coil 123. Second ends of the U2-, V2-, and W2-phase coils, which are opposite to the first ends, are connected to a common junction, i.e. a neutral point, in, for example, a star-configuration.

The second inverter 40 is configured to convert DC power supplied from the second battery 49 into AC power. Then, the second inverter 40 is configured to apply the AC power to the three-phase coils 121, 122, and 123 of the second coil set 12.

The second power-supply relay 42, which is a MOSFET as an example, is provided between the second battery 49 and the second inverter 40, and configured to establish an electrical path therebetween when turned on, and interrupt the electrical path when turned off. The second reverse-connection protection relay 43, which is a MOSFET as an example, is connected between the second relay 42 and the second inverter 40.

The descriptions of the first power-supply relay 32, the first reverse-connection protection relay 33, the first choke coil 35, and the first capacitor 36 can be applied to the second power-supply relay 42, the second reverse-connection protection relay 43, the second choke coil 45, and the second capacitor 46 with the condition that reference numerals 32, 33, 35, and 36 are respectively replaced with reference numerals 42, 43, 45, and 46. So, the descriptions of the elements 42, 43, 45, and 46 can be omitted.

The first motor control unit 501, which is operative to control how the first coil set 11 is energized, is comprised of a first microcomputer 51 and a first integrated circuit 56 communicably connected to each other. For example, an application specific integrated circuit (ASIC) is used as the first integrated circuit 56 as illustrated in FIG. 2.

The first microcomputer 51, which is comprised of, for example, a CPU and a memory unit including a ROM and a RAM, is communicably connected to the first sensor 61, first current sensor 31, and torque sensor 103 (see FIG. 1). The first microcomputer 51 is configured to generate control signals based on measurement values, i.e. measurement signals, output from the first sensor 61, first current sensor 31, and torque sensor 103; the control signals are to control on-off switching operations of the switching elements 301 to 306 of the first inverter 30 and the relays 32 and 33. For example, the CPU of the first microcomputer 51 can run one or more programs, i.e. program instructions, stored in the memory unit, thus implementing the operations of the first microcomputer 51 as software operations. As another example, the first microcomputer 51 can include a specific hardware electronic circuit to implement the operations of the first microcomputer 51 as hardware operations.

The first integrated circuit 56 is comprised of, for example, a pre-driver, a signal amplifier, and a regulator. The pre-driver is operative to generate gate signals for the respective switching elements 301 to 306 based on the control signals for the respective switching elements 301 to 306. The pre-driver is also operative to output the generated gate signals to the gates of the respective switching elements 301 to 306, thus individually controlling on-off switching operations of the switching elements 301 to 306. The signal amplifier is operative to amplify the measurement signal sent from, for example, the first sensor 61, and output the amplified measurement signal to the first microcomputer 51. The regulator is designed as a stabilization circuit that stabilizes an operating voltage supplied thereto from, for example, an unillustrated power supply.

The second motor control unit 502, which is operative to control how the second coil set 12 is energized, is comprised of a second microcomputer 52 and a second integrated circuit 57 communicably connected to each other. For example, an ASIC is used as the second integrated circuit 57 as illustrated in FIG. 2.

The second microcomputer 52, which is comprised of, for example, a CPU and a memory unit including a ROM and a RAM, is communicably connected to the second sensor 62, second current sensor 41, and the torque sensor 103 (see FIG. 1). The second microcomputer 52 is configured to generate control signals based on measurement values, i.e. measurement signals, output from the second sensor 62, second current sensor 41, and torque sensor 103; the control signals are to control on-off switching operations of the switching elements 401 to 406 of the second inverter 40 and the relays 42 and 43. For example, the CPU of the second microcomputer 52 can run one or more programs, i.e. program instructions, stored in the memory unit, thus implementing the operations of the second microcomputer 52 as software operations. As another example, the second microcomputer 52 can include a specific hardware electronic circuit to implement the operations of the second microcomputer 52 as hardware operations.

The second integrated circuit 57 is comprised of, for example, a pre-driver, a signal amplifier, and a regulator. The pre-driver is operative to generate gate signals for the respective switching elements 401 to 406 based on the control signals for the respective switching elements 401 to 406. The pre-driver is also operative to output the generated gate signals to the gates of the respective switching elements 401 to 406, thus individually controlling on-off switching operations of the switching elements 401 to 406. The signal amplifier is operative to amplify the measurement signal sent from, for example, the second sensor 62, and output the amplified measurement signal to the second microcomputer 52. The regulator is designed as a stabilization circuit that stabilizes an operating voltage supplied thereto from, for example, the unillustrated power supply.

As described above, the rotation detecting apparatus 1 installed in the drive apparatus 800 is comprised of the sensor package 65 including the first and second sensors 61 and 62. That is, the first and second sensors 61 and 62 are encapsulated in a single sensor package 65. FIG. 2 illustrates the first and second sensors 61 and 62 respectively as SENSOR 1 and SENSOR 2. The detailed descriptions of the rotation detecting apparatus 1 will be described later.

Hereinafter, at least the first coil set 11, and the first inverter 30 and the first motor control unit 501 provided for the first coil set 11 constitute a first system, i.e. a first motor drive system, 901. Similarly, at least the second coil set 12, and the second inverter 40 and the second motor control unit 502 provided for the second coil set 12 constitute a second system, i.e. a second motor drive system, 902. The first motor drive system 901 can include the first sensor 61, and the second motor drive system 902 can include the second sensor 62.

That is, the drive apparatus 800 according to the first embodiment is configured such that (1) The circuit components including the first inverter 30 and the first motor control unit 501, which are needed to control the first coil set 11, are provided for the first coil set 11

(2) The circuit components including the second inverter 40 and the second motor control unit 502, which are needed to control the second coil set 12, are provided for the second coil set 12.

In other words, the drive apparatus 800 is configured as a dual redundant system comprised of at least the first and second inverters 30 and 40, and the first and second motor control units 501 and 502.

This dual-redundant configuration of the drive apparatus 800 enables the motor 10 to be continuously driven even if there is a malfunction in one of the first inverter 30 and the second inverter 40, or there is a malfunction in one of the first motor control unit 501 and the second motor control unit 502.

As described above, the drive apparatus 800 includes, as a dual redundant battery system, the first battery 39 for the first coil set 11, and the second battery 40 for the second coil 12. The rated voltage across the first battery 39 can be identical to or different from the rated voltage across the second battery 49. If the rated voltage across the first battery 39 differs from the rated voltage across the second battery 49, a voltage converter can be provided at least one of between the first battery 39 and the first inverter 30 and between the second battery 49 and the second inverter 40.

Figure 9:
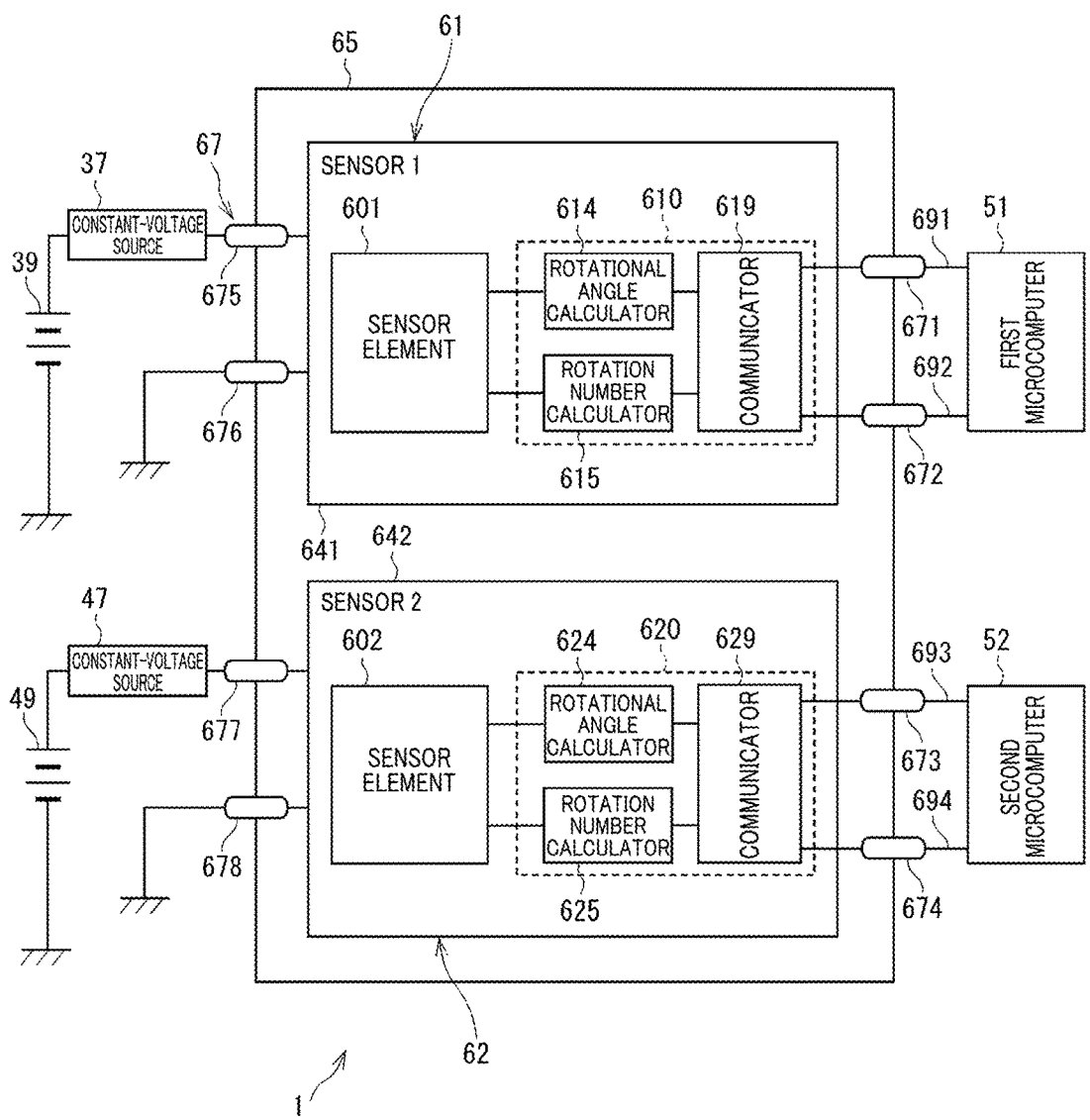
FIG. 9 is a block diagram schematically illustrating the rotation detecting apparatus according to the first embodiment.
Figure 10:
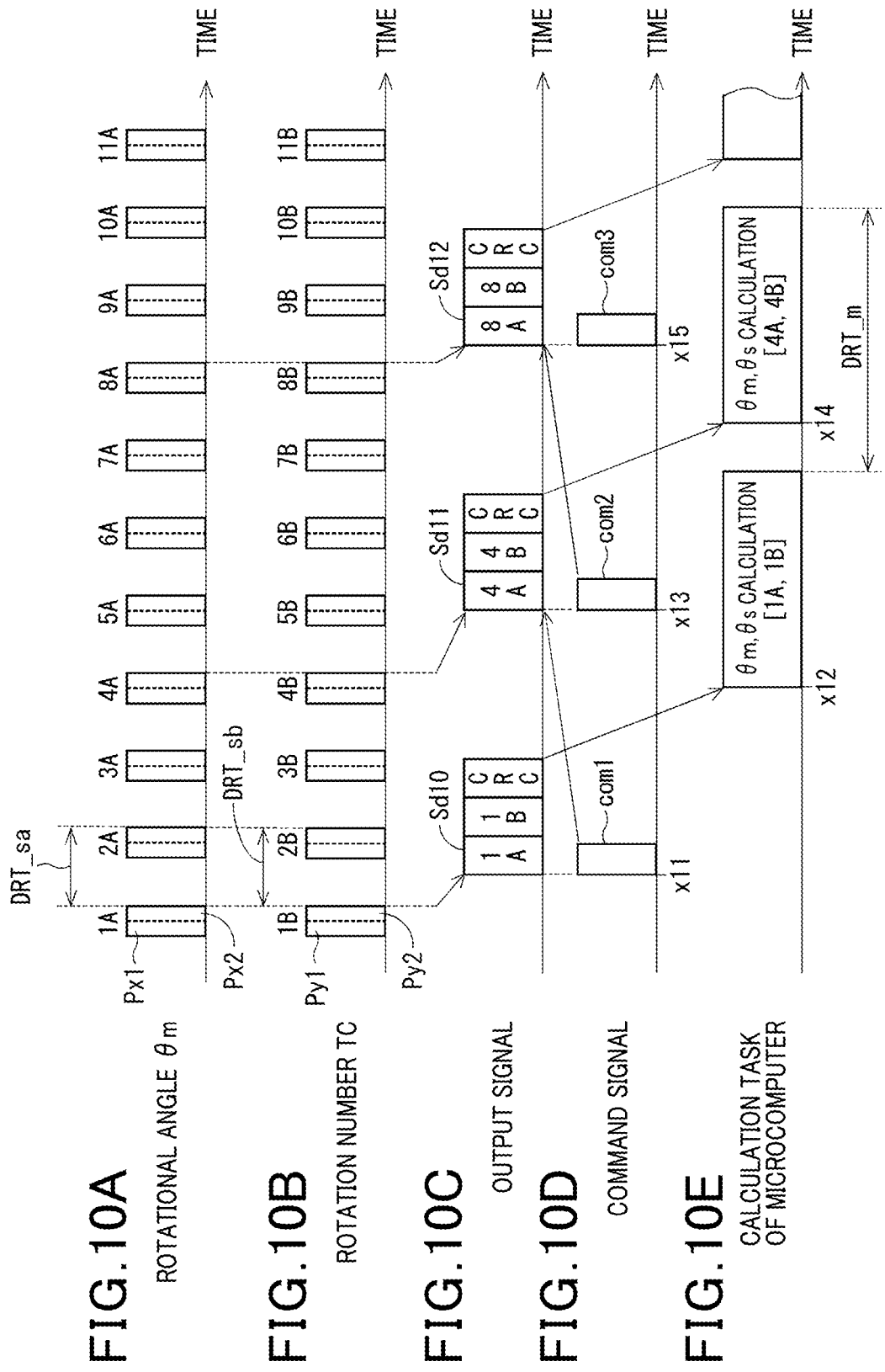
FIGS. 10A to 10E are a joint timing chart schematically illustrating an example of how a first sensor and a first microcomputer illustrated in FIG. 9 communicate with each other.
Figure 11:
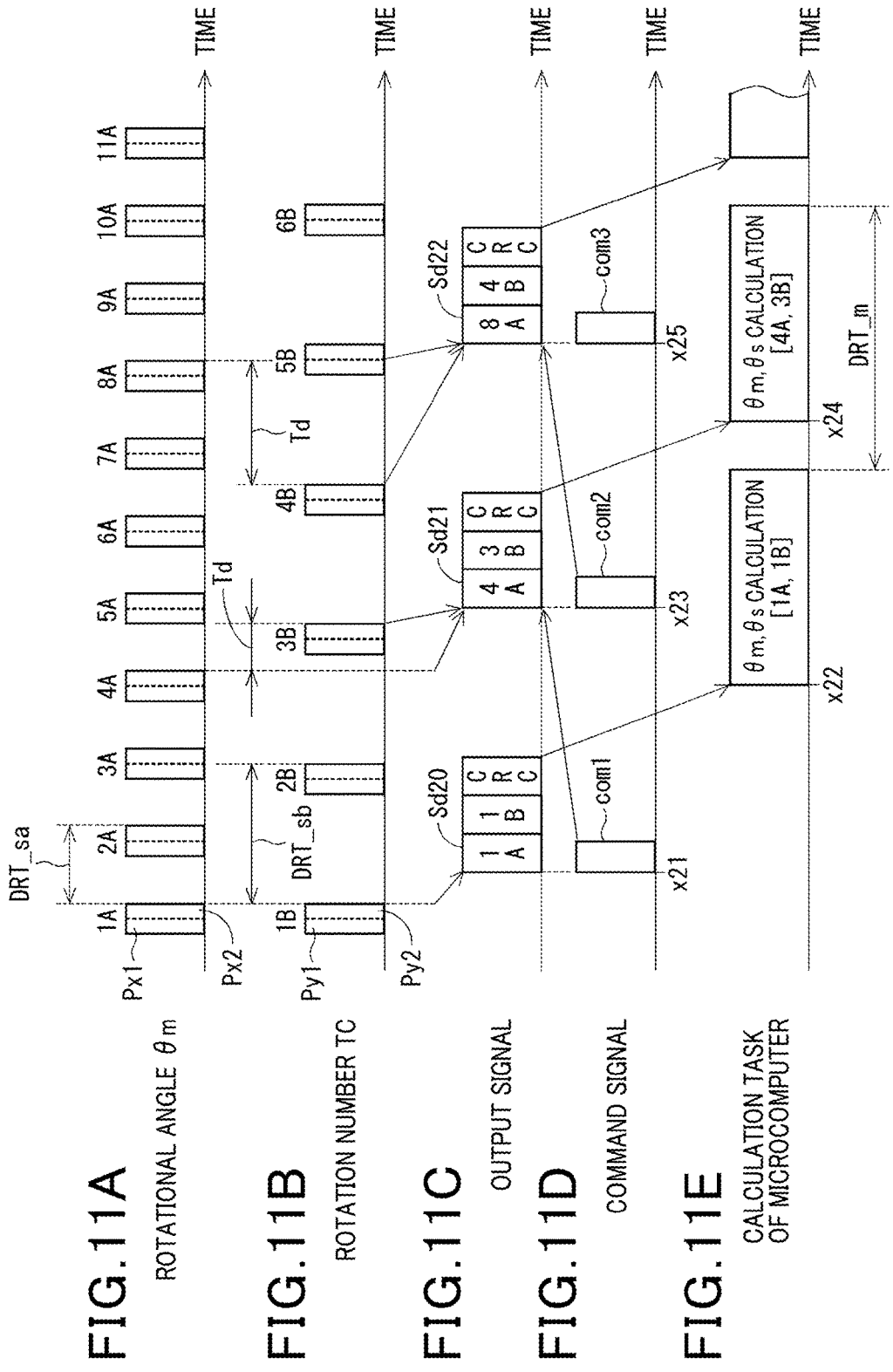
FIGS. 11A to 11E are a joint timing chart schematically illustrating another example of how the first sensor and the first microcomputer illustrated in FIG. 9 communicate with each other.

Note that, for the sake of representation simplicity, the fuses 38 and 48 are omitted from some figures, such as FIG. 9.

Figure 5:
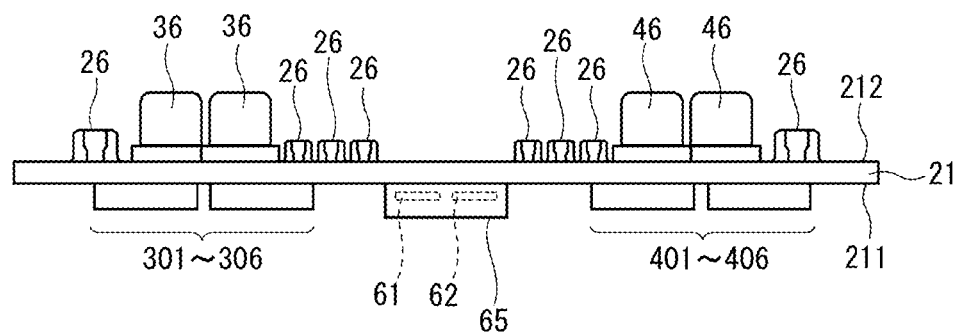
FIG. 5 is a side view of a first circuit board illustrated in FIG. 2.

Referring to FIGS. 2, 4, and 5, drive components, which include the switching elements 301 to 306 and 401 to 406, the current sensing elements 311 to 313 and 411 to 413, the relays 32, 33, 42, and 43, the choke coils 35 and 45, and the capacitors 36 and 46, are mounted to the first circuit board 21. In addition, referring to FIGS. 2, 4, and 5, control components, which include the microcomputers 51 and 52 and the integrated circuits 56 and 57, are mounted to the second circuit board 22.

That is, the drive components are electronic components through which a relatively large current, which is similar to motor currents flowing through the coils 111 to 113 and 121 to 123, flows. The control components are electronic components through which no motor currents flow.

The sensor package 65 is mounted to the first circuit board 21.

The first power supply connector 75 has a power supply terminal 751 and a ground terminal 752, and the second power supply connector 76 has a power supply terminal 761 and a ground terminal 762. The first signal connector 77 has a torque signal terminal 771 and a vehicle signal terminal 772, and the second signal connector 78 has a torque signal terminal 781 and a vehicle signal terminal 782. The drive apparatus 800 has internal signal terminals 717.

Triangular outline marks represent where these terminals are connected to the first circuit board 21 and/or the second circuit board 22. For example, the power supply terminals 751 and 761, the ground terminals 752 and 762, and the internal signal terminals 717 are connected to each of the first and second circuit boards 21 and 22. The torque signal terminals 771 and 781 and the vehicle signal terminals 772 and 782 are connected to only the second circuit board 22.

Note that, in FIG. 2, the power supply terminals 751 and 752 are respectively labeled as PT1 and PT2, and the ground terminals 761 and 762 are respectively labeled as GND1 and GND2. The torque signal terminals 781 and 782 are respectively labeled as trq1 and trq2, and the vehicle signal terminals 772 and 782 are respectively labeled as CAN1 and CAN2.

Even if at least one of lines, each of which connects between a corresponding one of the terminals and at least one of the first and second circuit boards 21 and 22, is branched, this does not necessarily mean that the corresponding at least one actual terminal is actually branched.

Figure 6:
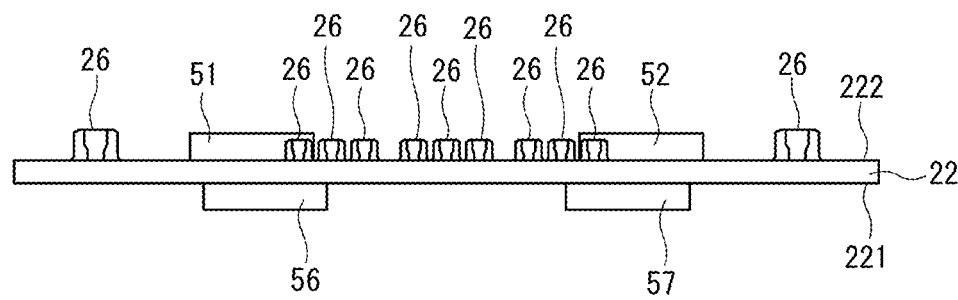
FIG. 6 is a side view of a second circuit board illustrated in FIG. 2.

The following describes an example of the structure of the drive apparatus 800 with reference to FIGS. 3 to 6. Specifically, FIG. 3 is a plan view of the drive apparatus 800, and FIG. 4 is a cross sectional view taken on line Iv-Iv of FIG. 3. FIG. 5 is a schematic side view of the first circuit board 21, and FIG. 6 is a schematic side view of the second circuit board 22.

As illustrated in FIG. 4, the motor 10 includes the stator 10a, the rotor 10b, each of which is illustrated in FIG. 1, and the shaft 15 mounted to the rotor 10b; the first and second coil sets 11 and 12 are individually wound in and around the stator 10a. The motor 10 includes a motor case 17 comprised of a substantially cylindrical housing 171, and the stator 10a, which has, for example, a substantially cylindrical shape, is installed in the cylindrical housing 171 of the motor case 17 to be mounted to the inner peripheral surface of the cylindrical housing 171 of the motor case 17. As described above, the rotor 10b is installed in the stator 10a to be rotatable relative to the stator 10a, and the rotor 10b includes a substantially cylindrical rotor core, and the shaft 15 is mounted to a center axial portion of the rotor core. The shaft 15 penetrates through the rotor core. This enables the shaft 15 and the rotor 10b to be integrally rotated.

The cylindrical housing 171 of the motor case 17 has opposing first and second ends in its axial direction. The first axial end of the cylindrical housing 171 has an opening therethrough, and the controller module 20 is mounted in the opening of the first axial end of the motor case 17. The cylindrical housing 171 has a ring recess 172 formed in the first axial end thereof.

The shaft 15 has opposing first and second ends in its axial direction. The first end of the shaft 15 is located to face the controller module 20. The second end of the shaft 15, which is not illustrated in FIG. 4, serves as an output terminal coupled to the deceleration gear 109 (see FIG. 1). This enables torque generated based on rotation of the rotor assembly, which is comprised of the rotor 10b and the shaft 15, to be transferred to the steering shaft 10 via the deceleration gear 109. This specification also describes rotation, i.e. turning, of the rotor assembly of the motor 10 as "rotation, i.e. turning, of the motor 10" or other similar expressions.

The motor 10 includes a substantially circular plate-like magnet 16 coaxially mounted to an end surface of the first end of the shaft 15. A virtual line extending from the center axis of the shaft 15 and passing through the center of the magnet 16 is defined as a rotation center line Ac (see, for example, FIG. 8).

The motor 10 also includes a substantially cylindrical frame 18 mounted to the inner peripheral surface of the cylindrical housing 171 of the motor case 17 so as to be closer to the first axial end of the cylindrical housing 171 while the shaft 15 rotatably penetrates through the frame 18. For example, the frame 18 is pressed to be fit in the cylindrical housing 171 of the motor case 17. The motor case 17 and the frame 18 constitute an enclosure member for enclosing the components of the motor 10. The frame 18 has an end surface 181 facing the controller module 20, and a concave recess is formed in the center portion of the end surface 181. The magnet 16 is installed in the recess to be exposed toward the controller module 20.

The frame 18 includes first board securing members 185 each having a predetermined first height, and also includes second board securing members 186 each having a predetermined second height; the first and second board securing members 185 and 186 are mounted on the end surface 181 of the frame 18 with their height directions being substantially perpendicular to the end surface 181. The second height of each of the second board securing members 186 is larger than the first height of each of the first board securing members 185. The first circuit board 21, which has formed through holes therethrough, is mounted on the first board securing members 185 to be fastened to the first board securing members 185 with screws 195 while the second board securing members 186 penetrate through the corresponding respective through holes of the first circuit board 21. The second circuit board 22 is mounted on the second board securing members 186 to be fastened to the second board securing members 186 with screws 196. The first and second circuit boards 21 and 22 can be fastened to the frame 18 with one of fastening members other than the screws 195 and 196.

The three-phase coils 111, 112, and 113 are connected to unillustrated respective phase motor lines; the motor lines are penetrated through unillustrated axial through holes formed through the frame 18 to be drawn out from the frame 18 toward the controller module 20. The drawn-out motor lines are extended to be connected to the first circuit board 21.

The controller module 20, which is mounted to the first axial end of the cylindrical housing 171 of the motor case 17, is mounted in the opening of the first axial end of the cylindrical housing 171 such that the controller module 20 is located within a motor silhouette. Note that the motor silhouette represents a virtual region formed by virtually extending the first axial end of the motor case 17 toward the axial direction away from the frame 18.

Note that the axial direction and radial direction of the motor 10 serve as the respective axial direction and radial direction of the drive apparatus 800, and the axial direction and the radial direction of the drive apparatus 800 can be described simply as an axial direction and a radial direction hereinafter.

As described above, the controller module 20 includes, for example, the first circuit board 21, the second circuit board 22, and the connector unit 70. Each of the first and second circuit boards 21 and 22 is arranged in substantially parallel to the end surface 181 of the frame 18. The first and second circuit boards 21 and 22 are also arranged in the order of the first circuit board 21 and the second circuit board 22 from the side of the motor 10.

The first circuit board 21 has opposing first and second major surfaces 211 and 212; the first major surface 211 is closer to the motor 10 than the second major surface 212 thereto (see FIGS. 5 and 6). The second circuit board 22 has opposing first and second major surfaces 221 and 222; the first major surface 221 is closer to the motor 10 than the second major surface 222 thereto (see FIGS. 5 and 6).

Referring to FIGS. 4 and 5, the switching elements 301 to 306 and 401 to 406, the current sensing elements 311 to 313 and 411 to 413, and the sensor package 65 are for example mounted on the first major surface 211 of the first circuit board 21. The choke coils 35 and 45 and the capacitors 36 and 46 are for example mounted on the second major surface 212 of the first circuit board 21.

Note that, from the viewpoint of FIG. 4, the switching elements 301, 302, 401, and 402 are illustrated. For the sake of representation simplicity, the current sensing elements 311 to 313 and 411 to 413, and the choke coils 35 and 45 are omitted from FIGS. 4 and 5.

The frame 18 is made of a heatsink material, such as a metal, and the switching elements 301 to 306 and 401 to 406 are arranged to be thermally linked to the frame 18, so that heat generated by the switching elements 301 to 306 and 401 to 406 are absorbed by the frame 18, and the absorbed heat is released from the drive apparatus 800 via the frame 18 and the motor case 17.

Note that the expression "A is thermally linked to B" includes that
(1) A is directly contacted to B
(2) A is indirectly contacted to B via a heatsink member, such as a heatsink gel.

In FIG. 4, such heatsink members are omitted from FIG. 4, and therefore the switching elements 301 to 306 and 401 to 406 are illustrated to be separated from the frame 18. The current sensing elements 311 to 313 and 411 to 413, which are other than the switching elements, can be thermally linked to the frame 18.

That is, the frame 18 serves as a heatsink, in other words, serves as both an enclosure member of the motor 10 and a heat sink. This enables the drive system 800 to be downsized and the number of components of the drive system 800 to be reduced as compared with a case where an additional heatsink is provided in the drive system 800. The first embodiment, which uses the frame 18 as a heatsink, results in the heat transfer path of the drive apparatus 800 to the atmosphere being shortened, making it possible to dissipate heat from the drive apparatus 800 with higher efficiency.

Referring to FIGS. 4 and 6, the first and second integrated circuits 56 and 57 are mounted on the first major surface 221 of the second circuit board 22, and the first and second microcomputers 51 and 52 are mounted on the second major surface 222 of the second circuit board 22.

Specifically, the drive components through which currents to be supplied to the motor 10 flow are mounted to the first substrate 21, and the control components for controlling, for example, the switching elements mounted to the first circuit board 21 are mounted to the second substrate 22. In other words, the drive apparatus 800 are configured such that the first circuit board 21 serving as a power circuit board and the second circuit board serving as a control circuit board are electrically and physically separated from each other. This prevents large currents to be supplied to the motor 10 from flowing through the second circuit board 22, thus reducing the adverse effects of noise, which is caused by the large currents, on the control components mounted to the second circuit board 22.

Each of the first and second circuit boards 21 and 22 also has spring terminals 26.

Referring to FIGS. 3 and 4, the connector unit 70 includes a cover 71, the first and second power supply connectors 75 and 76, and the first and second signal connectors 77 and 78.

The cover 71 has a substantially cylindrical portion 711 having an opening top and a closed bottom. The bottom of the cylindrical portion 711 serves as a connector base 715. The cylindrical portion 711 has an edge 712 of the opening top, and the edge 712 is filled in the ring recess 172 formed in the first axial end of the cylindrical housing 171, and fixed thereto with, for example, adhesive.

The connector base 715 has opposing first and second major surfaces; the first major surface faces the motor 10. On the second major surface of the connector base 715, the first and second power supply connectors 75 and 76 and the first and second signal connectors 77 and 78 are mounted. The connectors 75 to 78 are disposed in the motor silhouette. Each of the connectors 75 to 78 has a hollow tubular shape with an opening top, i.e. a hollow frontage, into which an unillustrated wire harness can be inserted to be electrically connected to the connector.

Referring to FIGS. 2 to 4, the first power supply connector 75 includes the power supply terminal 751 that connects between the positive terminal of the first battery 39 and the first motor drive system 901, and includes the ground terminal 752 that connects between the negative terminal of the first battery 39 and the common signal ground of the first motor drive system 901. The second power supply connector 76 includes the power supply terminal 761 that connects between the positive terminal of the second battery 49 and the second motor drive system 902, and includes the ground terminal 762 that connects between the negative terminal of the second battery 49 and the common signal ground of the second motor drive system 902.

The first signal connector 77 serves to connect between the first motor drive system 901 and the torque sensor 103, and to connect between the first motor drive system 901 and the in-vehicle network. Specifically, the torque signal terminal 771 of the first signal connector 77 serves to receive the measurement signal, which represents the measured torque, sent from the torque sensor 103 to the first motor drive system 901. The vehicle signal terminal 772 of the first signal connector 77 serves to receive the vehicle operating condition signals externally sent via the in-vehicle network to the first motor drive system 901. Similarly, the torque signal terminal 781 of the second signal connector 78 serves to receive the measurement signal, which represents the measured torque, sent from the torque sensor 103 to the second motor drive system 902. The vehicle signal terminal 782 of the second signal connector 78 serves to receive the vehicle operating condition signals externally sent via the in-vehicle network to the second motor drive system 902.

The duplication of the power supply connectors 75 and 76 provided for the respective first and second motor drive systems 901 and 902 could enable the motor 10 to be continuously driven even if one of wires connected between the first power supply connector 75 and the first motor drive system 901 and wires connected between the second power supply connector 76 and the second motor drive system 902 were disconnected or broken. Similarly, the duplication of the signal connectors 77 and 78 provided for the respective first and second motor drive systems 901 and 902 could enable the motor 10 to be continuously driven even if one of wires connected between the first signal connector 77 and the first motor drive system 901 and wires connected between the second signal connector 78 and the second motor drive system 902 were disconnected or broken.

On the first major surface of the connector base 715, the internal signal terminals 717 are mounted. The internal signal terminals 717 are connected between the first and second circuit boards 21 and 22, and enable signals to be transmitted between the first and second circuit boards 21 and 22. The internal signal terminals 717 are disposed separately from the terminals 751, 752, 761, 762, 771, 772, 781, and 782 of the connectors 75 to 78, and are unconnected to the external devices of the drive apparatus 800, such as the batteries 39 and 49, the torque sensor 103, and the in-vehicle network. The internal signal terminals 717 according to the first embodiment are adapted to (1) Transfer values measured by the rotation detecting apparatus 1 to the electronic components, which include the first and second microcomputers 51 and 52, mounted on the second circuit board 22

(2) Transfer command signals sent from the first and second microcomputers 51 and 52 to the electronic components mounted on the first circuit board 21.

The number of the terminals in each of the connectors 75 to 78 can be changed, and how the terminals are arranged in each of the connectors 75 to 78 can also be changed. How terminals are assigned to the connectors 75 to 78 can further be changed. The internal signal terminals 717 can be freely disposed to any portions where the internal signal terminals 717 do not interfere with the terminals of the connectors 75 to 78. The number of the internal signal terminals 717 can be freely determined.

Each of the terminals 751, 752, 761, 762, 771, 772, 781, 782, and 717 is fitted through a corresponding one of the spring terminals 26 of the first circuit board 21 and/or the second circuit board 22. Each of the spring terminals 26 is configured to be elastically deformed to abut on a corresponding one of the terminals 751, 752, 761, 762, 771, 772, 781, 782, and 717 when a corresponding one of the terminals 751, 752, 761, 762, 771, 772, 781, 782, and 717 is fitted in the spring terminal 26. This enables each of the terminals 751, 752, 761, 762, 771, 772, 781, 782, and 717 to be electrically connected to the first circuit board 21 and/or the second circuit board 22.

Each of the terminals 751, 752, 761, 762, and 717 substantially linearly penetrates through the second circuit board 22 to extend to the first circuit board 21 in the axial direction through a space between the first and second circuit boards 21 and 22. Each of the terminals 751, 752, 761, 762, and 717 is fitted through a corresponding one of the spring terminals 26 of the first circuit board 21 and a corresponding one of the spring terminals 26 of the second circuit board 22. This arrangement of the terminals 751, 752, 761, 762, and 717 prevents the space required to arrange the terminals 751, 752, 761, 762, and 717 from increasing due to the redundancy of the power supply connectors 75 and 76 provided for the respective first and second motor drive systems 901 and 902 and the signal connectors 77 and 78 provided for the respective first and second motor drive systems 901 and 902. Each of the terminals 751, 752, 761, 762, and 717 is configured to substantially linearly penetrate through the second circuit board 22 to extend to the first circuit board 21 in the axial direction. This configuration results in each of the terminals 751, 752, 761, 762, and 717 being shorter, resulting in reduction of the wiring impedance between the first and second circuit boards 21 and 22.

Next, the following describes the rotation detecting apparatus 1.

Referring to FIGS. 4, 5, and 7 to 9, the rotation detecting apparatus 1, which aims to detect rotation of the motor 10, includes the first sensor 61, the second sensor 62, the first microcomputer 51, and the second microcomputer 52. Each of the first and second microcomputers 51 and 52 serves as a controller.

The first and second sensors 61 and 62 are installed in the single sensor package 65 mounted on the first circuit board 21. This reduces the area on which the single sensor package 65 is mounted as compared with a case where individual packages each including a corresponding one of the first and second sensors 61 and 62 are mounted on the first circuit board 21.

Referring to FIG. 9, the first sensor 61 includes a sensor element 601 and a circuit module 610, and the sensor element 601 and the circuit module 610 are integrated in a single chip 641. In other words, the chip 641 incorporates therein the sensor element 601 in addition to the circuit module 610. The second sensor 62 includes a sensor element 602 and a circuit module 620, and the sensor element 602 and the circuit module 620 are integrated in a single chip 642. In other words, the chip 642 incorporates therein the sensor element 602 in addition to the circuit module 620.

Each of the sensor elements 601 and 602 is designed to measure magnetic change, i.e. magnetic flux change, caused by rotation of the magnet 16.

For example, a magnetoresistive (MR) sensor element, such as an anisotropic magnetoresistive (AMR) sensor element, a giant magnetoresistive (GMR) sensor element, or a tunneling magnetoresistive (TMR) sensor element, can be used for each of the sensor elements 601 and 602. A Hall element also can be used for each of the sensor elements 601 and 602.

Figure 7A:
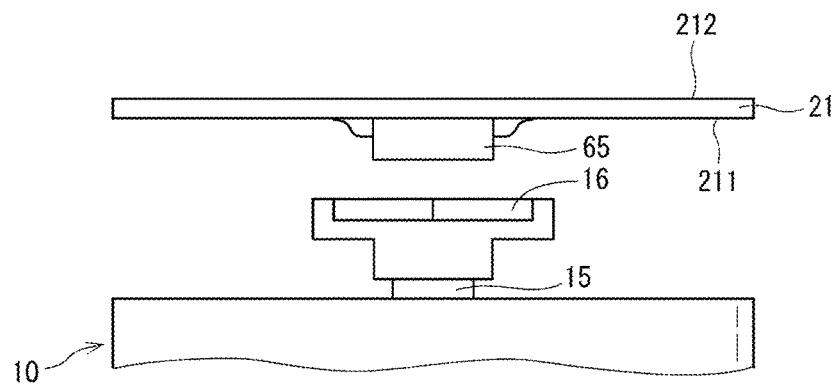
FIG. 7A is a side view of a rotation detecting apparatus according to the first embodiment.
Figure 7B:
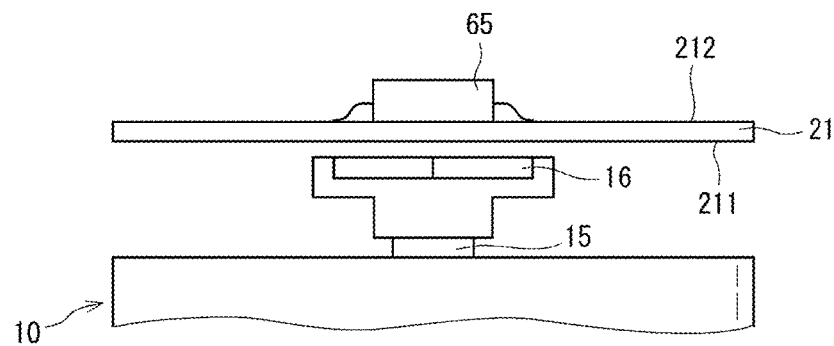
FIG. 7B is a side view of a rotation detecting apparatus according to a modification of the first embodiment.

Referring to FIGS. 4 and 7A, the sensor package 65 is mounted to the first major surface 211 of the first circuit board 21. Mounting the sensor package 65 on the first major surface 211 of the first circuit board 21 results in a shorter distance between the sensor package 65 and the magnet 16, resulting in the sensor package 65 having higher accuracy of detecting rotation of the motor 10 and in the magnet 16 having a lower thickness and a lower radius. In addition, referring to FIG. 7B, the sensor package 65 can be mounted on the second major surface 212 of the first circuit board 21. Mounting the sensor package 65 on the second major surface 212 of the first circuit board 21 enables the first major surface 211 of the first circuit board 21 to be efficiently used. For example, mounting the sensor package 65 on the second major surface 212 of the first circuit board 21 enables electronic components, which are other than the switching elements 301 to 306 and 401 to 406, to be mounted on the first major surface 211 while being thermally linked to the frame 18. For the sake of representation simplicity, electronic components, which are other than the sensor package 65, mounted on the first circuit board 21 are omitted from FIGS. 7A and 7B. Similarly, electronic components, which are other than the sensor package 65, mounted on the first circuit board 21 are also omitted from FIGS. 27, 28A and 28B.

Figure 8:
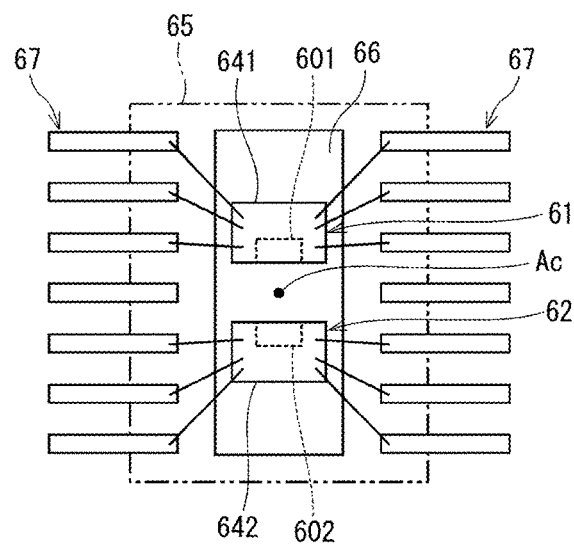
FIG. 8 is a plan view schematically illustrating a part of the rotation detecting apparatus installed in a package.

Referring to FIGS. 8 and 9, the sensor package 65 has a substantially rectangular parallelepiped shape. The sensor package 65 has a pair of longer sides, and has sensor terminals 67 mounted to the respective longer sides. The sensor terminals 67 include command terminals 671 and 673, output terminals 672 and 674, power supply terminals 675 and 677, and ground terminals 676 and 678.

The rotation detecting apparatus 1 includes constant-voltage circuits 37 and 47. The positive terminal of the first battery 39 is connected to the constant-voltage circuit 37, and the constant-voltage circuit 37 is connected to the first sensor 61 via the power supply terminal 675. The negative terminal of the first battery 39 is connected to a common signal ground of the first sensor 61 via the ground terminal 676.

Similarly, the positive terminal of the second battery 49 is connected to the constant-voltage circuit 47, and the constant-voltage circuit 47 is connected to the second sensor 62 via the power supply terminal 677. The negative terminal of the second battery 49 is connected to a common signal ground of the second sensor 62 via the ground terminal 678. That is, each of the first and second batteries 39 and 49 supplies electrical power to a corresponding one of the first and second sensors 61 and 62 via the corresponding one of the constant-voltage circuits 37 and 47, the corresponding one of the power supply terminals 675 and 677, and the corresponding one of the ground terminals 676 and 678.

Each of the first embodiment and the other embodiments described later can be configured such that a single batter or only one of the first and second batteries 39 and 49 supplies electrical power to both the first and second sensors 61 and 62. In this modification, the first and second sensors 61 and 62 can share a single constant-voltage circuit or the first and second sensors 61 and 62 can respectively use the first sensor 61 and the second sensor 62.

Each of the constant-voltage circuits 37 and 47 is comprised of, for example, a regulator having predetermined power consumption, such as the order of several mA, which can drive the corresponding one of the first and second sensors 61 and 62. That is, each of the constant-voltage circuits 37 and 47 regulates the voltage output from the corresponding one of the first and second batteries 39 and 49, thus outputting a regulated constant voltage to be supplied to the corresponding one of the first and second sensors 61 and 62. The constant-voltage circuits 37 and 47 are provided separately from the regulators of the first and second integrated circuits 56 and 57, and are capable of supplying electrical power to the sensor package 65 even if the drive apparatus 800 is deactivated.

Referring to FIG. 8, each of the chip 641, which constitutes the first sensor 61, and the chip 642, which constitutes the second sensor 62, are mounted to a substantially rectangular plate-like lead frame 66 installed in the sensor package 65. Each of the chips 641 and 642 is connected to the sensor terminals 67 by, for example, wires. The first major surface 211 of the first circuit board 21 has formed thereon a previously designed wiring pattern to which the first and second sensors 61 and 62 are connected, and the sensor terminals 67 are connected to the wiring pattern of the first major surface 211 of the first circuit board 21. This enables the first and second sensors 61 and 62 to be connected to the first circuit board 21.

Each of the first and second sensors 61 and 62 is a magnetic sensor for measuring magnetic change, i.e. magnetic flux change, based on rotation of the magnet 16 of the motor 10 together with the shaft 15. Each of the first and second sensors 61 and 62 according to the first embodiment is comprised of a Hall element. The motor 10, i.e. the magnet 16, which turns together with the shaft 15, serves as a detection target.

The first and second sensors 61 and 62, i.e. the chips 641 and 642, are arranged to be symmetric with respect to the point where the rotation center line Ac and the first circuit board 21 intersect with each other. Hereinafter, the description that A and B are arranged to be symmetric with respect to the point where the rotation center line Ac and the first circuit board 21 intersect with each other will be simply described as "A and B are arranged to be symmetric with respect to the rotation center line Ac". Locating the first and second sensors 61 and 62 to be symmetric with respect to the rotation center line Ac enables measurement errors between the first and second sensors 61 and 62 to be reduced.

Referring to FIG. 9, the circuit module 610 includes, for example, a rotational angle calculator 614, a rotation number calculator 615, and a communicator, i.e. a transceiver, which serves as, for example, an output unit 619. The circuit module 620 also includes, for example, a rotational angle calculator 624, a rotation number calculator 625, and a communicator, i.e. a transceiver, which serves as, for example, an output unit 629.

The following mainly describes the functions of the components 614, 615, and 619 of the circuit module 610, because the functions of the components 624, 625, and 629 of the circuit module 620 are identical to the functions of the respective components 614, 615, and 619 of the circuit module 610 except for the difference in reference signs therebetween.

The rotational angle calculator 614 calculates rotational angle information indicative of, i.e. as a function of, the rotational angle θm of the motor 10 based on a value, which represents the magnetic change of the magnet 16, measured by the sensor element 601. Then, the rotational angle calculator 614 outputs, to the communicator 619, a rotational angle signal including the calculated rotational angle information indicative of the rotational angle θm of the motor 10. The rotational angle calculator 614 can include an analog-to-digital (A/D) converter that converts a value actually measured by the sensor element 61 into a digital measurement value, and calculates the rotational angle information using the digital measurement value. The rotational angle information can be any data, such as a function, indicative of the rotational angle θm of the motor 10, or can be the rotational angle θm of the motor 10 itself. Calculation of the rotational angle information as the rotational angle θm of the motor 10 itself or as any data about the rotational angle θm of the motor 10 will be referred to simply as calculation of the rotational angle θm of the motor 10. Note that the first embodiment uses a mechanical rotational angle of the motor 10 as the rotational angle θm of the motor 10, but can use an electrical rotational angle of the motor 10 as the rotational angle θm of the motor 10.

The rotation number calculator 615 calculates rotation number information indicative of, i.e. as a function of, the number of rotations of the motor 10 based on a value, which represents the magnetic change of the magnet 16, measured by the sensor element 601. The number of rotations of the motor 10 will be referred to as a rotation number TC. Then, the rotation number calculator 615 outputs, to the communicator 619, a rotation number signal including the rotation number information indicative of the rotation number TC of the motor 10. The rotation number calculator 615 can include an A/D converter that converts a value actually measured by the sensor element 61 into a digital measurement value, and calculates the rotation number TC of the motor 10 using the digital measurement value. The rotation number information can be any data, such as a function, indicative of the number of rotations of the motor 10 or can be the number of rotations of the motor 10 itself. Calculation of the rotation number information as the number of rotations of the motor 10 itself or any data about the number of rotations of the motor 10 will be referred to simply as calculation of the rotation number TC of the motor 10.

For example, the first embodiment is configured to divide one rotation, i.e. 360-degree rotational angle, of the motor 10 into three partial rotations, i.e. three 120-degree rotational angular ranges, which are referred to as first to third rotational angular ranges, and determine a predetermined first rotational direction as a count-up direction, and a predetermined second rotational direction, which is opposite to the first rotational direction, as a count-down direction.

The rotation number calculator 615 includes, for example, a hardware counter or a software counter. That is, the rotation number calculator 615 is configured to (1) Increment the current counted value of the counter each time the rotational angle θm of the motor 10 changes from a current rotational angular range to an adjacent rotational angular range in the count-up direction (2) Decrement the current counted value of the counter each time the rotational angle θm of the motor 10 changes from a current rotational angular range to an adjacent rotational angular range in the count-down direction (3) Calculate the rotation number TC of the motor 10 based on the current counted value of the counter.

The counted value of the counter itself is contained in the concept of the number of rotations of the motor 10.

Counting up or down the counter each time the rotational angle θm of the motor 10 moves from a current rotational angular range to an adjacent rotational angular range in the count-up direction or the count-down direction Dividing one rotation, i.e. 360-degree rotational angle, of the motor 10 into three or more partial rotations, i.e. three or more rotational angular ranges, enables the rotational direction of the motor 10 to be identified. Dividing one rotation, i.e. 360-degree rotational angle, of the motor 10 into five partial rotations, i.e. five rotational angular ranges, enables the rotational direction of the motor 10 to be identified even if change of the rotational angle θm of the motor 10 from a current rotational angular range to an adjacent rotational angular range is skipped. The rotation number calculator 615 can be configured to calculate the number of rotations of the motor 10 based on the rotational angle θm of the motor 10.

Note that the number of rotations of the motor 10 according to the first embodiment does not represent the rotational speed, i.e. revolutions per minute in rpm, of the motor 10 but represents how many times the motor 10 turns.

The communicator 619 is configured to (1) Generate, based on the rotational angle signal including the rotational angle θm and the rotation number signal including the rotation number TC of the motor 10, an output signal including the rotational angle signal and the rotation number signal (2) Output, as a frame, the output signal to the first microcomputer 51 using a predetermined digital communication interface, such as a serial peripheral interface (SPI).

Specifically, the first microcomputer 51 sends an instruction to the first sensor 61 via a communication line 691 and the command terminal 671. The first sensor 61 outputs, as a frame, the output signal to the first microcomputer 51 via the output terminal 672 and a communication line 692. Each frame of the output signal to be sent to the first microcomputer 51 includes, in addition to the rotational angle θm and the rotation number TC, a run counter signal and a cyclic redundancy check (CRC) code, i.e. CRC signal, serving as an error detection signal. From FIG. 10, the run counter signal is removed. Another error detection signal, such as a checksum signal, can be used in place of the CRC code.

The communicator 629 of the second sensor 62 is configured to (1) Generate, based on the rotational angle signal including the rotational angle θm measured by the sensor element 602 and the rotation number signal including the rotation number TC of the motor 10 calculated by the rotation number calculator 625, an output signal including a series of, i.e. a sequence of or a train of, the rotational angle signal and the rotation number signal (2) Output, as a frame, the output signal to the second microcomputer 52 using the predetermined digital communication interface.

Specifically, the second microcomputer 52 sends an instruction to the second sensor 62 via a communication line 693 and the command terminal 673. The second sensor 62 outputs, as a frame, the output signal to the second microcomputer 52 via the output terminal 674 and a communication line 694. Each frame of the output signal to be sent to the second microcomputer 52 includes, in addition to the rotational angle θm and the rotation number TC, the run counter signal and the cyclic redundancy check (CRC) signal.

Note that each of the first and second microcomputers 51 and 52 includes a run counter with an initial count value of zero, and is configured to increment the count value by 1 each time the run counter signal is sent thereto from the corresponding one of the first and second sensors 61 and 62. This enables each of the first and second microcomputers 51 and 52 to diagnose whether communications from the corresponding one of the first and second sensors 61 and 62 to the corresponding microcomputer is normally carried out.

In particular, each of the first and second sensors 61 and 62 is configured to periodically detect the rotational angle θm and the rotation number TC of the motor 10. In addition, each of the first and second sensors 61 and 62 is configured to periodically output the output signal including the rotational angle θm and the rotation number TC of the motor 10 in response to the command signal periodically sent from a corresponding one of the first and second microcomputers 51 and 52.

Because the first and second microcomputers 51 and 52 are mounted on the second major surface of the second circuit board 22, traces of a previously designed wiring pattern and the internal signal terminals 717 serve as the communication lines 691 to 694.

The first microcomputer 51 calculates, based on the rotational angle signal contained in the output signal captured from the first sensor 61, the rotational angle θm of the motor 10. The first microcomputer 51 controls, based on the rotational angle θm of the motor 10, on-off switching operations of the switching elements 301 to 306 of the first inverter 30 and the relays 32 and 33 to control how the motor 10 is driven.

In addition, the first microcomputer 51 calculates, based on the rotational angle signal and the rotation number signal contained in the output signal, a steering angle θs of the steering shaft 102. Because the steering shaft 102 is coupled to the shaft 15 of the motor 10 via the deceleration gear mechanism 109, the first microcomputer 51 calculates the steering angle θs of the steering shaft 102 as a function of the rotational angle θm, the rotation number TC, and the gear ratio of the deceleration gear mechanism 109.

The second microcomputer 52 calculates the rotational angle θm of the motor 10 and the steering angle θs of the steering shaft 102 in accordance with the rotational angle signal and the rotation number signal contained in the output signal in the same procedure as the first microcomputer 51.

Note that the neutral position of the steering wheel 101 is defined as the position of the steering wheel 101 when the vehicle V incorporating therein the electronic power steering apparatus (EPS) 108 is travelling in a straight line.

For example, each of the first and second microcomputers 51 and 52 learns the neutral position of the steering wheel 101 while the vehicle V is travelling in a straight line at a constant speed for a predetermined time. Each of the first and second microcomputers 51 and 52 stores the learned neutral position of the steering wheel 101 in the corresponding memory unit. That is, each of the first and second microcomputers 51 and 52 calculates the steering angle θs of the steering shaft 102 relative to the neutral position of the steering wheel 101 as a function of the rotational angle θm, the rotation number TC, and the gear ratio of the deceleration gear mechanism 109. This configuration to calculate the steering angle θs of the steering shaft 102 enables steering sensors to be eliminated from the electronic power steering apparatus 108.

The steering angle θs of the steering shaft 102 according to the first embodiment represents a turning angle of the second section 102b, which is coupled to the shaft 15 of the motor 10 via the decelerating gear mechanism 109, of the steering shaft 102. That is, each of the first and second microcomputers 51 and 52 accurately calculates the steering angle θs of the second section 102b of the steering shaft 102 relative to the neutral position of the steering wheel 101 as a function of the rotational angle θm, the rotation number TC, and the gear ratio of the deceleration gear mechanism 109. Each of the first and second microcomputers 51 and 52 can transform the twist of the torsion bar 103a, which is measured by the torque sensor 103 as the steering torque, into a turning angle of the first section 102a of the steering shaft 102 relative to the neutral position of the steering wheel 101. Thus, each of the first and second microcomputers 51 and 52 can calculate the turning angle of the first section 102a of the steering shaft 102 relative to the neutral position of the steering wheel 101 as the steering angle θs of the steering shaft 102.

The following describes how each of the first and second sensors 61 and 62 communicates with a corresponding one of the first and second microcomputers 51 and 52 with reference to FIGS. 10A to 10E.

FIG. 10A schematically illustrates how the rotational angle θm of the motor 10 is periodically detected by the first sensor 61, and FIG. 10B schematically illustrates how the rotation number TC of the motor 10 is periodically detected by the first sensor 61. FIG. 10C schematically illustrates how the output signal is periodically output from the first sensor 61, and FIG. 10D schematically illustrates how the command signal is periodically transmitted from the first microcomputer 51 to the first sensor 61. FIG. 10E illustrates how the first microcomputer 51 calculates the rotational angle θm of the motor 10 and the steering angle θs of the steering shaft 102.

As illustrated in FIGS. 10A to 10E, the following describes only how the first sensor 61 communicates with the first microcomputer 51 with reference to FIGS. 10A to 10E, and eliminates how the second sensor 62 communicates with the second microcomputer 52. This is because how the second sensor 62 communicates with the second microcomputer 52 is substantially identical to how the first sensor 61 communicates with the first microcomputer 51.

Referring to FIG. 10A, the first sensor 61 calculates the rotational angle θm of the motor 10 in a predetermined update period DRT_sa. In other words, the first sensor 61 updates a value of the rotational angle θm of the motor 10 in the update period DRT_sa. FIG. 10A illustrates pulses at constant intervals each corresponding to the update period DRT_sa; each pulse represents a corresponding one update of the rotational angle θm by the rotational angle calculator 614. That is, the width of each pulse in FIG. 10A represents the calculation period required for the rotational angle calculator 614 to perform one update of the rotational angle θm.

Specifically, the width, i.e. the period, of each pulse in FIG. 10A includes a first half period Px1 and a second half period Px2. The rotational angle calculator 614 converts a value measured by the sensor element 601 into a digital measurement value during the first half period Px1, and calculates a value of the rotational angle θm based on the digital measurement value, thus updating the measurement data for the rotational angle θm during the second half period Px2. FIG. 10A illustrates that the measurement data for the rotational angle θm is updated in the order from a value 1A, 2A, . . . , and 11A.

Referring to FIG. 10B, the first sensor 61 calculates the rotation number TC of the motor 10 in a predetermined update period DRT_sb. In other words, the first sensor 61 updates a value of the rotation number TC of the motor 10 in the update period DRT_sb. FIG. 10B illustrates pulses at constant intervals each corresponding to the update period DRT_sb; each pulse represents a corresponding one update of the rotation number TC by the rotation number calculator 615. That is, the width of each pulse in FIG. 10B represents the calculation period required for the rotation number calculator 615 to perform one update of the rotation number TC.

Specifically, the width, i.e. the period, of each pulse in FIG. 10B includes a first half period Py1 and a second half period Py2. The rotation number calculator 615 converts a value measured by the sensor element 601 into a digital measurement value during the first half period Py1, and calculates a value of the rotation number TC based on the digital measurement value, thus updating the measurement data for the rotation number TC during the second half period Py2. FIG. 10B illustrates that the measurement data for the rotation number TC is updated in the order from a value 1B, 2B, . . . , and 11B.

That is, in each of FIGS. 10A, 11A, 15A, and 30A, each of the pulses 1A to 11A represents the corresponding measurement data for the rotational angle θm, and, in each of FIGS. 10B, 11B, 15B, and 30B, each of the pulses 1B to 11B represents the corresponding measurement data for the rotation number TC.

FIGS. 10A and 10B illustrate that the update period DRT_sa of the rotational angle θm is equal to the update period DRT_sb of the rotation number TC.

Referring to FIGS. 10C and 10D, the first microcomputer 51 sends a command signal com1 to the first sensor 61 at time x11. The command signal com1 requests transmission of the output signal at the next transmission timing of the next command signal com2. The time x11 is slightly later than the timing when the measurement data 1A for the rotational angle θm and the measurement data 1B for the rotation number TC were calculated. The communicator 619 transmits, at the time x11, the output signal Sd10 requested by the immediately previous command signal com0 (not shown) to the first microcomputer 51. Note that the command signals, such as com0 and com1, are also periodically sent from the first microcomputer 51 to the first sensor 61.

That is, the output signal Sd10 includes the newest measurement data 1A for the rotational angle θm, the newest measurement data 1B for the rotation number TC, and the CRC code at the time x11.

That is, the output signal Sd10 includes (1) The newest measurement data, i.e. rotational angular signal, 1A for the rotational angle θm, which is comprised of a predetermined number of bits (2) The newest measurement data, i.e. rotation number signal, 1B for the rotation number TC, which is comprised of a predetermined number of bits (3) The CRC code that is comprised of a predetermined number of bits calculated based on the newest rotational angular signal 1A of the rotational angle θm and the newest rotation number signal 1B of the rotation number TC at the time x11.

The first microcomputer 51 starts to calculate, at time x12, the rotational angle θm and the steering angle θs based on the rotational angular signal 1A and the rotation number signal 1B included in the output signal Sd10. In FIG. 10E, reference character [1A, 1B] represents that the measurement data 1A for the rotational angle θm and the measurement data 1B for the rotation number TC are used to calculate the rotational angle θm and the steering angle θs. Note that there is no need for the first microcomputer 51 to calculate the steering angle θs each time the output signal is sent to the first microcomputer 51. That is, the first microcomputer 51 calculates the steering angle θs in a predetermined calculation period DRT_m that are longer than the update periods DRT_sa and DRT_sb, but can calculate the steering angle θs at the rate of one calculation per the predetermined number of the calculation periods DRT_m.

The first microcomputer 51 sends a command signal com2 to the first sensor 61 at time x13 after the start of calculation of the rotational angle θm and the steering angle θs at the time x12. The command signal com2 requests transmission of the output signal at the next transmission timing of the next command signal com3. The time x13 is slightly later than the timing when the measurement data 4A for the rotational angle θm and the measurement data 4B for the rotation number TC were calculated. The communicator 619 transmits, at the time x13, the output signal Sd11 requested by the immediately previous command signal com1 to the first microcomputer 51.

That is, the output signal Sd11 includes the newest measurement data 4A for the rotational angle θm, the newest measurement data 4B for the rotation number TC, and the CRC code at the time x13.

The first microcomputer 51 starts to calculate, at time x14, the rotational angle θm and the steering angle θs based on the rotational angular signal 4A and the rotation number signal 4B included in the output signal Sd11.

The first microcomputer 51 sends a command signal com3 to the first sensor 61 at time x15 after the start of calculation of the rotational angle θm and the steering angle θs at the time x14. The command signal com3 requests transmission of the output signal at the next transmission timing of the next command signal com4 (not shown). The time x15 is slightly later than the timing when the measurement data 8A for the rotational angle θm and the measurement data 8B for the rotation number TC were calculated. The communicator 619 transmits, at the time x15, the output signal Sd12 requested by the immediately previous command signal com 2 to the first microcomputer 51.

That is, the output signal Sd12 includes the newest measurement data 8A for the rotational angle θm, the newest measurement data 8B for the rotation number TC, and the CRC code at the time x15.

The first microcomputer 51 starts to calculate, at time x16, the rotational angle θm and the steering angle θs based on the rotational angular signal 8A and the rotation number signal 8B included in the output signal Sd12.

FIGS. 11A to 11E, which correspond to respective FIGS. 10A to 10E, illustrate how the first sensor 61 communicates with the first microcomputer 51 when the update periods DRT_sa and DRT_sb are set to be different from each other.

Specifically, the update period DRT_sb of the rotation number TC can be set to be longer than the update period DRT_sa of the rotational angle θm. The update period DRT_sa of the rotational angle θm need be sufficiently shorter than the calculation period DRT_m of the first microcomputer 51. In contrast, the update period DRT_sb of the rotation umber TC can be set to a proper period depending on a predetermined rotational speed of the motor 10; the proper period is capable of preventing skipping of detection of each of the divided three rotational angular ranges. This is because reliably detecting each of the divided three rotational angular ranges enables the rotation number of the motor 10 and the reverse rotation of the motor 10 to be detected, resulting in preventing erroneous detection of the rotation number of the motor 10. Note that the predetermined rotational speed of the motor 10 can be set to the maximum rotational speed of the motor 10 or to a predetermined value required to count the rotation number TC.

Referring to FIGS. 11C and 11D, like the operation of the first sensor 61 at the time x11, the first sensor 61 transmits, at time x21, the output signal Sd20, which includes the newest measurement data 1A for the rotational angle θm, the newest measurement data 1B for the rotation number TC, and the CRC code at the time x11, to the first microcomputer 51. Similar to the operation of the first microcomputer 51 at the time x12, the first microcomputer 51 starts to calculate, at time x22, the rotational angle θm and the steering angle θs based on the rotational angular signal 1A and the rotation number signal 1B included in the output signal Sd20.

Similar to the operation of the first microcomputer 51 at the time x13, the first microcomputer 51 sends the command signal com2 to the first sensor 61 at time x23 after the start of calculation of the rotational angle θm and the steering angle θs at the time x22. The first sensor 61 transmits, at the time x23, the output signal Sd21, which includes the newest measurement data 4A for the rotational angle θm, the newest measurement data 3B for the rotation number TC, and the CRC code at the time x23, to the first microcomputer 51.

Similar to the operation of the first microcomputer 51 at the time x14, the first microcomputer 51 starts to calculate, at time x24, the rotational angle θm and the steering angle θs based on the rotational angular signal 4A and the rotation number signal 3B included in the output signal Sd21.

Similar to the operation of the first microcomputer 51 at the x15, the first microcomputer 51 sends the command signal com3 to the first sensor 61 at time x25 after the start of calculation of the rotational angle θm and the steering angle θs at the time x24. The first sensor 61 transmits, at the time x25, the output signal Sd22, which includes the newest measurement data 8A for the rotational angle θm, the newest measurement data 4B for the rotation number TC, and the CRC code at the time x25, to the first microcomputer 51.

Similar to the operation of the first microcomputer 51 at the time x16, the first microcomputer 51 starts to calculate, at time x26, the rotational angle θm and the steering angle θs based on the rotational angular signal 8A and the rotation number signal 4B included in the output signal Sd22.

In contrast, FIGS. 30A to 30E, which correspond to respective FIGS. 10A to 10E, illustrate how a rotational angle sensor for detecting the rotation angle of a motor and a rotation number sensor for detecting the rotation number of the motor, which are respectively provided in separated first and second chips, communicate with a microcomputer in a first comparative example. That is, in the first comparative example, the rotational angle sensor and the rotation number sensor independently output the rotational angle signal and the rotation number signal. In this first comparative example, the rotational angle signal and the rotation number signal are individually sent from the rotational angle sensor and the rotation number sensor in accordance with a chip select function of the SPI. Note that the update period of the rotational angle θm and the update period of the rotation umber TC in the first comparative example illustrated in FIGS. 30A to 30E are identical to the update period DRT_sa of the rotational angle θm and the update period DRT_sb of the rotation umber TC in the first embodiment illustrated in FIGS. 10A to 10E.

Referring to FIGS. 30C and 30D, the microcomputer sends a command signal com1c to the rotational angle sensor at time x91. The command signal com1c requests transmission of the output signal at the next transmission timing of the next command signal com2c. The rotational angle sensor transmits, at the time x91, the output signal Sd91, which includes the newest measurement data 1A for the rotational angle θm without including the newest measurement data 1B for the rotation number TC, to the microcomputer.

The microcomputer starts to calculate, at time x92, the rotational angle θm and the steering angle θs based on the rotational angular signal 1A included in the output signal Sd91 and a rotation number signal-1B included in the immediately previous output signal Sd90 (not illustrated) transmitted at the transmitting timing of the immediately previous command signal com0c (not illustrated).

The microcomputer sends a command signal com2c to the rotation number sensor at time x93 after the start of calculation of the rotational angle θm and the steering angle θs at the time x92. The rotation number sensor transmits, at the time x93, the output signal Sd92, which includes the newest measurement data 3B for the rotation number TC without including the newest measurement data 3A for the rotational angle θm, to the microcomputer.

The microcomputer also sends a command signal com3c to the rotational angle sensor at time x94. The rotational angle sensor transmits, at the time x94, the output signal Sd93, which includes the newest measurement data 8A for the rotational angle θm without including the newest measurement data 3B for the rotation number TC, to the microcomputer.

The microcomputer starts to calculate, at time x95, the rotational angle θm and the steering angle θs based on the rotational angular signal 8A included in the output signal Sd93 and the rotation number signal 3B included in the immediately previous output signal Sd92.

As described above, the first comparative example is configured such that the rotational angle sensor used to detect the rotational angle θm and the rotation number sensor used to detect the rotation number TC are respectively provided in the separated first and second chips. This results in the rotational angle signal and the rotation number signal are individually output from the rotational angle sensor and the rotation number sensor to the microcomputer.

Figure 30:
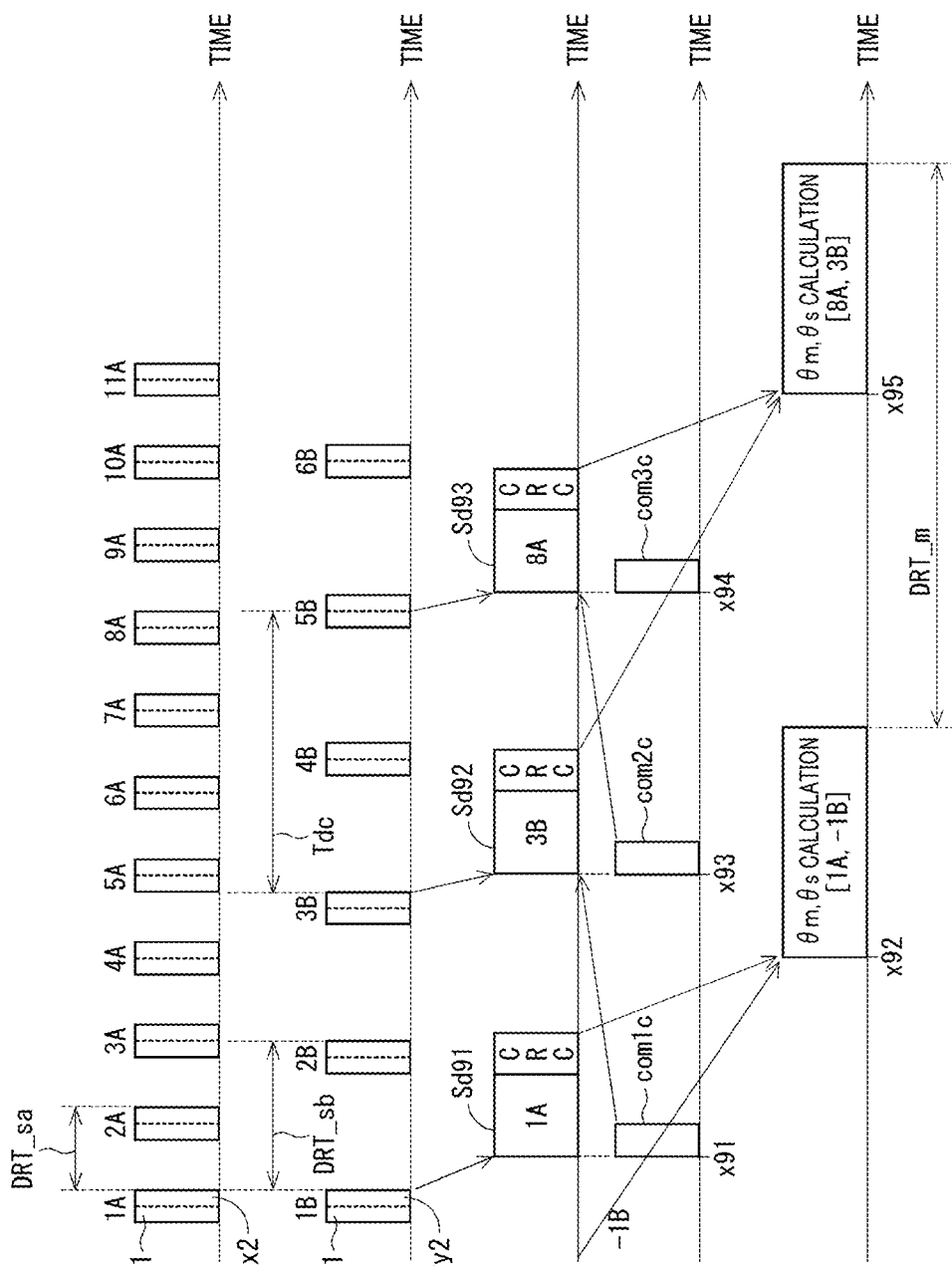
FIGS. 30A to 30E are a joint timing chart schematically illustrating an example of how a sensor and a microcomputer communicate with each other according to a first comparative example.

For this reason, as illustrated in FIG. 30, the length Tdc of the gap between the detection timing of the rotational angle signal and the detection timing of the rotation number signal used by the calculation at the time x95 as an example may become longer than the sending period of the command signals from the microcomputer.

That is, the first comparative example, which has the longer gap between each detection timing of the rotational angle signal and a corresponding detection timing of the rotation number signal, may result in the steering angle θs being incorrectly calculated.

In contrast, the rotation detecting apparatus 1 according to the first embodiment is configured such that the rotation angle calculator 614 and the rotational angle calculator 615 are integrated in the single chip 641, and is configured to transmit, to the first microcomputer 51, the output signal set, i.e. the output-signal communication frame, including a series of the rotational angle signal and the rotation number signal from the communicator 619.

For this reason, as illustrated in FIGS. 10A to 10E, if the measurement data for the rotational angle θm and the measurement data for the rotation number TC are periodically detected in synchronization with each other, the first microcomputer 51 is capable of calculating the rotational angle θm, the rotation number TC, and the steering angle θs based on the measurement data for the rotational angle θm and the measurement data for the rotation number TC for each period.

In addition, as illustrated in FIGS. 11A to 11E, even if the update period DRT_sa of the rotational angle θm and the update period DRT_sb of the rotation umber TC are different from each other, the rotation detecting apparatus 1 is configured to transmit, to the first microcomputer 51, the output signal set, which includes a series of the newest measurement data for the rotational angle θm and the newest measurement data for the rotation number TC for each output-signal transmission period. The output-signal transmission period is determined based on the command-signal sending period. This configuration enables the length Td of the gap between the detection timing of the measurement data for the rotational angle θm and the detection timing of the measurement data for the rotation number TC to be shorter than the calculation period DRT_m of the first microcomputer 51. This configuration therefore reduces the gap between the detection timing of the measurement data for the rotational angle θm and the detection timing of the measurement data for the rotation number TC as compared with the first comparative example.

The rotation detecting apparatus 1 according to the first embodiment is configured to periodically transmit, to the first microcomputer 51, the output signal set, which includes a series of the rotational angle signal and the rotation number signal, via the single communication line 692. This configuration enables the number of communication lines connecting between the first microcomputer 51 and the rotation detecting apparatus 1 to be reduced in comparison to a case where the rotational angle signal and the rotation number signal are individually transmitted to the first microcomputer 51 via separate communication lines.

As described above, the drive apparatus 800, which is configured as the dual redundant system set forth above, according to the first embodiment is installed in the electronic power steering apparatus 108. The dual redundant configuration of the drive apparatus 800 enables the driver's operation of the steering wheel 101 to be continuously assisted even if one of the dual redundant portions of the drive apparatus 800 has malfunctioned.

In particular, the rotation detecting apparatus 1 includes the duplicated circuit modules 610 and 620 each configured to calculate the rotational angle θm and the rotation number TC. This configuration enables the driver's operation of the steering wheel 101 to be continuously assisted even if one of the duplicated circuit modules 610 and 620 has malfunctioned. In addition, the rotation detecting apparatus 1 is configured such that each of the duplicated circuit modules 610 and 620 is integrated in a corresponding one of the single chips 641 and 642, resulting in the rotation detecting apparatus 1 being downsized. This contributes to downsizing of the drive apparatus 800, resulting in an increase of the passenger's space in the passenger compartment of the vehicle V and an improvement of the fuel economy of the vehicle V.

As described in detail above, the rotation detecting apparatus 1 of the first embodiment includes the first sensor 61, the second sensor 62, the first microcomputer 51, and the second microcomputer 52.

The first sensor 61 includes the sensor element 601 and the circuit module 610, and the second sensor 62 includes the sensor element 602 and the circuit module 620.

Each of the sensor elements 601 and 602 is configured to detect rotation of the motor 10. Each of the circuit modules 610 and 620 is configured to generate, based on a measurement value of a corresponding one of the 601 and 602, an output signal set that is information indicative of rotation of the motor 10, and output the output signal set to a corresponding one of the first and second microcomputers 51 and 52.

Each of the first and second microcomputers 51 and 52 obtains the output signal set sent from a corresponding one of the first and second sensors 61 and 62. Then, each of the first and second microcomputers 51 and 52 calculates, based on the output signal set sent from a corresponding one of the first and second sensors 61 and 62, at least one parameter indicative of rotation of the motor 10.

The circuit module 610 includes the rotational angle calculator 614, the rotation number calculator 615, and the communicator 619. The rotational angle calculator 614 calculates the rotational angle θm of the motor 10 based on the measurement value of the sensor element 601, thus generating the rotational angle signal associated with the rotational angle θm of the motor 10. The rotation number calculator 615 calculates the rotation number TC of the motor based on the measurement value of the sensor element 601, thus generating the rotation number signal associated with the rotation number TC of the motor 10. The communicator 619 generates an output signal set including a series of the rotational angle signal and the rotation number signal, and transmits the output signal set to the first microcomputer 51.

The circuit module 620 includes the rotational angle calculator 624, the rotation number calculator 625, and the communicator 629. The rotational angle calculator 624 calculates the rotational angle θm of the motor 10 based on the measurement value of the sensor element 602, thus generating the rotational angle signal associated with the rotational angle θm of the motor 10. The rotation number calculator 625 calculates the rotation number TC of the motor based on the measurement value of the sensor element 602, thus generating the rotation number signal associated with the rotation number TC of the motor 10. The communicator 629 generates an output signal set including a series of the rotational angle signal and the rotation number signal, and transmits the output signal set to the second microcomputer 52.

Because the rotational angle signal and the rotation number signal are contained in the output signal set, i.e. the output-signal communication frame, it is possible for each of the first and second sensors 61 and 62 to transmit both the rotational angle signal and the rotation number signal by a single communication to a corresponding one of the first and second microcomputers 51 and 52. This configuration enables the gap between the detection timing of the measurement data for the rotational angle θm and the detection timing of the measurement data for the rotation number TC to be reduced.

The rotation detecting apparatus 1 according to the first embodiment is configured to (1) Transmit, from the first sensor 61 to the first microcomputer 51, the output signal set, which includes a series of the rotational angle signal and the rotation number signal, via the single communication line 692

(2) Transmit, from the second sensor 62 to the second microcomputer 52, the output signal set, which includes a series of the rotational angle signal and the rotation number signal, via the single communication line 694.

This configuration also enables the number of communication lines connecting between each of the first and second sensors 61 and 62 and a corresponding one of the first and second microcomputers 51 and 52 to be reduced in comparison to a case where the rotational angle signal and the rotation number signal are individually transmitted from each of the first and second sensors 61 and 62 and a corresponding one of the first and second microcomputers 51 and 52.

Each of the rotational angle calculator 614 and the rotation number calculator 615 calculates a corresponding one of the rotational angle θm and the rotation number TC of the motor 10 based on the measurement value of the common sensor element 601. Similarly, each of the rotational angle calculator 624 and the rotation number calculator 625 calculates a corresponding one of the rotational angle θm and the rotation number TC of the motor 10 based on the measurement value of the common sensor element 602.

This reduces the number of sensor elements used for calculating he rotational angle θm and the rotation number TC.

The constant voltage circuits 37 and 47 are provided in the respective first and second power supply lines; the first power supply line connects between the first battery 39 and the first sensor 61, and the second power supply line connects between the second battery 49 and the second sensor 62. This configuration maintains the withstand voltage of each of the first and second sensors 61 and 62 unchanged independently of the rated voltage of each of the first and second batteries 39 and 49.

The rotation detecting apparatus 1 includes the duplicated first and second sensors 61 and 62 each configured to detect the rotational angle θm and the rotation number TC of the motor 10; the first and second sensors 61 and 62 are installed in the single package 65. This configuration enables the rotational angle θm and the rotation number TC of the motor 10 to be continuously detected even if one of the duplicated first and second sensors 61 and 62 has malfunctioned.

Figure 31:
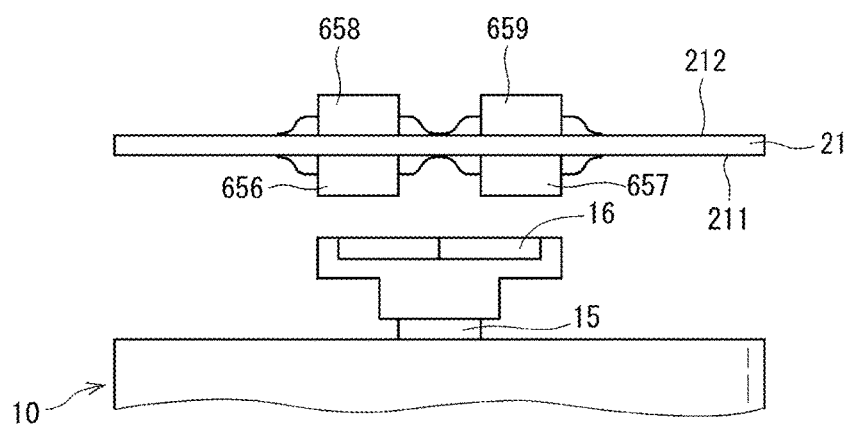
FIG. 31 is a side view of a rotation detecting apparatus according to a second comparison example.

The rotation detecting apparatus 1 whose first and second sensors 61 and 62 are installed in the single package 65 reduces the area on which the single sensor package 65 is mounted as compared with a second comparative example. Specifically, as illustrated in FIG. 31, the comparative example is configured such that a first pair of sensor packages 656 and 657 for calculating the rotational angle θm and a second pair of sensor packages 658 and 659 for calculating the rotation number TC are separately provided on the first circuit board 21.

This configuration of the rotation detecting apparatus 1 enables an area, on which the circuit components, such as the switching elements 301 to 306 and 401 to 406, from which heat should be removed, to be reliably ensured in, for example, the first major surface 201 of the first circuit board 21.

Packaging the first and second sensors 61 and 62 also enables the sensor elements 601 and 602 to be arranged close to the rotation center line Ac. This results in the magnet 16 being downsized, and prevents the detection accuracy of rotation of the motor 10 from deteriorating. In particular, the first and second sensors 61 and 62 are arranged to be symmetric with respect to the rotation center line Ac. This arrangement enables measurement errors between the first and second sensors 61 and 62 to be reduced.

The rotation detecting apparatus 1 includes (1) The first combination system of the first sensor 61 and the first microcomputer 51 that receives the output signal sent from the first sensor 61

(2) The second combination system of the second sensor 62 and the second microcomputer 52 that receives the output signal sent from the second sensor 62.

This configuration enables, even if one of the first and second combination systems has malfunctioned, the rotational angle θm and the rotation number TC to be continuously detected by the other of the first and second combination systems.

The electronic power steering apparatus 108 includes the motor 10, the rotation detecting apparatus 1, and the first and second microcomputers 51 and 52. The motor 10 is configured to generate assist torque for assisting the driver's operation of the steering wheel 101. Each of the first and second microcomputers 51 and 52 is configured to control the motor 10 based on the rotational angle signal and the rotation number signal contained in the output signal transmitted from a corresponding one of the first and second sensors 61 and 62; the output signal transmitted from a corresponding one of the first and second sensors 61 and 62 represents information associated with rotation of the motor 10. Each of the first and second microcomputers 51 and 52 is also configured to calculate the steering angle θs as a function of the rotational angle θm and the rotation number TC.

This configuration of the electronic power steering apparatus 108 enables steering sensors, each of which is engaged with the steering shaft 102 and configured to detect the steering angle θs, to be eliminated.

Because the rotational angle signal and the rotation number signal are contained in the output signal set, i.e. the output-signal communication frame, it is possible for each of the first and second sensors 61 and 62 to transmit both the rotational angle signal and the rotation number signal by a single communication to a corresponding one of the first and second microcomputers 51 and 52. This configuration enables the gap between the detection timing of the measurement data for the rotational angle θm and the detection timing of the measurement data for the rotation number TC to be reduced.

Second Embodiment

Figure 12:
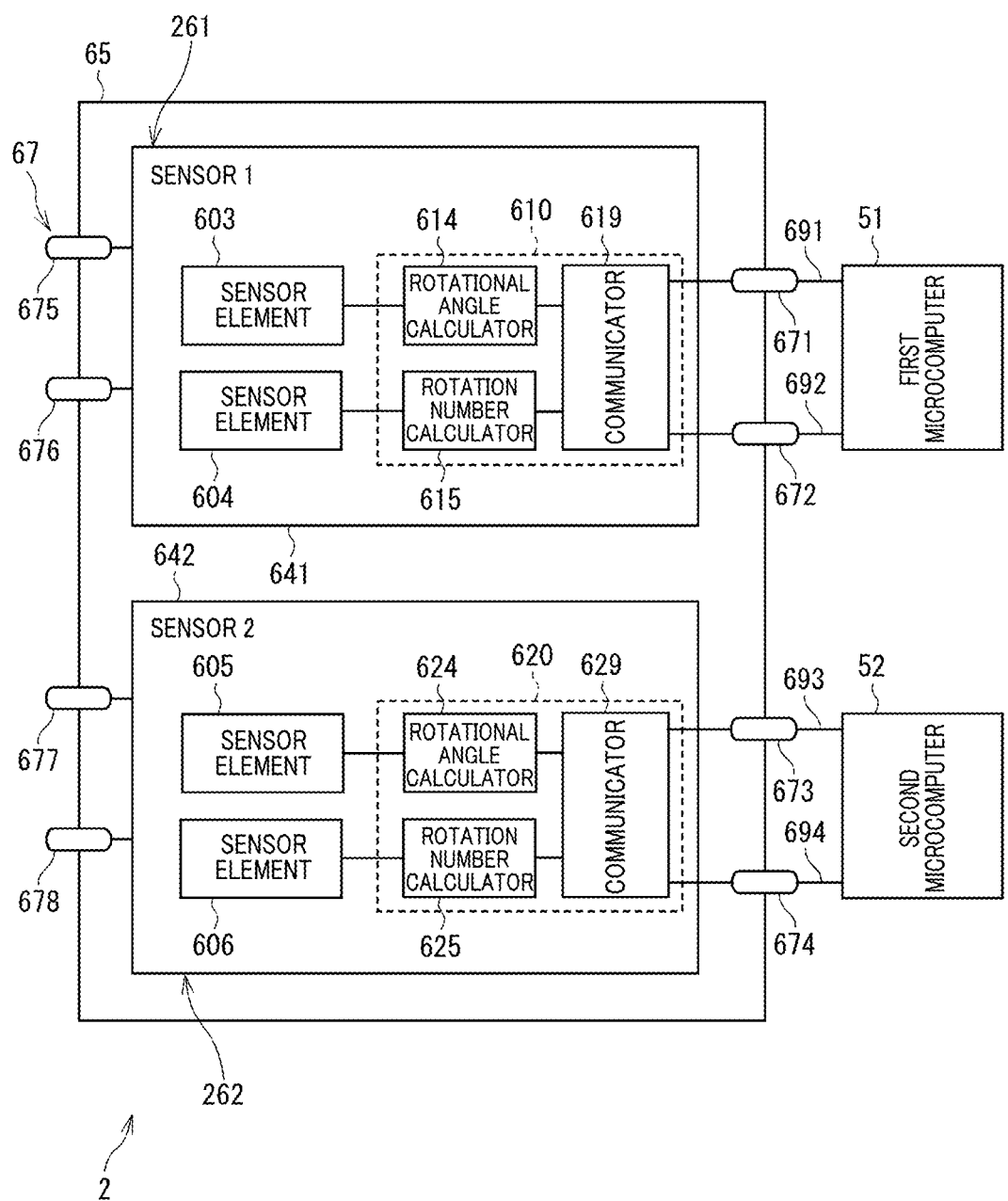
FIG. 12 is a block diagram schematically illustrating a rotation detecting apparatus according to the second embodiment of the present disclosure.

The following describes the second embodiment of the present disclosure with reference to FIGS. 12 and 13. The second embodiment includes a rotation detecting apparatus 2 that differs from the rotation detecting apparatus 1 according to the first embodiment in the following points. So, the following mainly describes the different points, and omits or simplifies descriptions of like parts between the first and second embodiments, to which identical or like reference characters are assigned, thus eliminating redundant description. For the sake of representation simplicity, the first and second batteries 39 and 49 are omitted from FIG. 12 and FIGS. 14 and 23 described later.

Referring to FIG. 12, the rotation detecting apparatus 2 includes a first sensor 261, a second sensor 262, the first microcomputer 51, and the second microcomputer 52.

The first sensor 261 includes a sensor element 603 for measuring the rotational angle of the motor 10, a sensor element 604 for measuring the rotation number of the motor 10, and the circuit module 610. The sensor elements 603 and 604 and the circuit module 610 are integrated in the single chip 641.

The second sensor 262 includes a sensor element 605 for measuring the rotational angle of the motor 10, a sensor element 606 for measuring the rotation number of the motor 10, and the circuit module 620. The sensor elements 605 and 606 and the circuit module 620 are integrated in the single chip 642. Similar to the third to sixth embodiments described later, the first and second chips 641 and 642 are installed in the single sensor package 65 mounted on the first circuit board 21.

Each of the sensor elements 603 to 606, such as a Hall element, is designed to measure magnetic change, i.e. magnetic flux change, caused by rotation of the magnet 16 like the sensor elements 601 and 602. Communications between the first sensor 261 and the first microcomputer 51 are carried out in the same manner as the communications between the first sensor 61 and the first microcomputer 51 according to the first embodiment. Communications between the second sensor 262 and the second microcomputer 52 are carried out in the same manner as the communications between the second sensor 62 and the second microcomputer 52 according to the first embodiment.

That is, the sensor elements 603 and 605 for detecting the rotational angle θm of the motor 10 and the sensor elements 604 and 606 for detecting the rotation number TC of the motor 10 are separately provided. This enables a sensor element suitable for measuring the rotational angle θm of the motor 10 and a sensor element suitable for measuring the rotation number TC of the motor 10 to be selected as the respective sensor elements 603 and 604 and as the respective sensor elements 605 and 606. For example, a sensor element, which has higher measurement accuracy, can be used as each of the sensor elements 603 and 605 for measuring the rotational angle θm of the motor 10. In contrast, a sensor element, which requires less electrical power, can be used as each of the sensor elements 604 and 606 for measuring the rotation number TC of the motor 10.

Figure 13A:
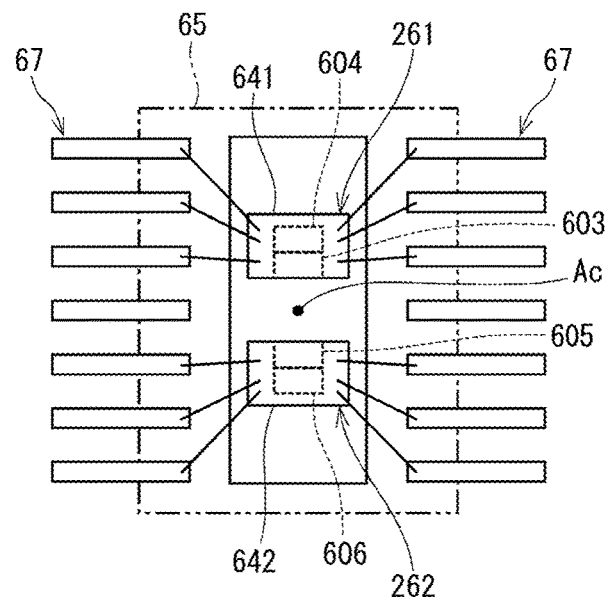
FIG. 13A is a plan view schematically illustrating a part of the rotation detecting apparatus installed in the package according to the second embodiment.
Figure 13B:
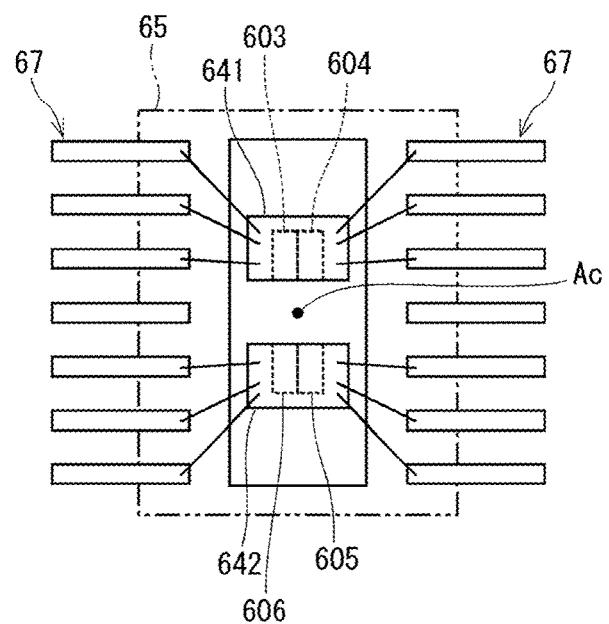
FIG. 13B is a plan view schematically illustrating a part of the rotation detecting apparatus installed in the package according to a modification of the second embodiment.

Each of FIGS. 13A and 13B illustrates an example of how the sensor elements 603 to 606 are arranged in the package 65.

Referring to FIGS. 13A and 13B, the chips 641 and 642 are arranged to be symmetric with respect to the rotation center line Ac, and the sensor elements 603 and 605, which are installed in the respective chips 641 and 642, are also arranged to be symmetric with respect to the rotation center line Ac. Similarly, the sensor elements 604 and 606, which are installed in the respective chips 641 and 642, are arranged to be symmetric with respect to the rotation center line Ac.

Specifically, as illustrated in FIG. 13A, the sensor element 603 is disposed to be closer to the rotation center line Ac than the sensor element 604. That is, the sensor element 603 is disposed on the inner side of the chip 641 and the sensor element 604 is disposed on the outer side of the chip 641 with respect to the rotation center line Ac. Similarly, as illustrated in FIG. 13A, the sensor element 605 is disposed to be closer to the rotation center line Ac than the sensor element 606. That is, the sensor element 605 is disposed on the inner side of the chip 642 and the sensor element 606 is disposed on the outer side of the chip 642 with respect to the rotation center line Ac.

That is, the sensor elements 603 and 605 for measuring the rotational angle θm of the motor 10, which require higher measurement accuracy, are disposed to be closer to the rotation center line Ac, resulting in reduction of measurement errors. In contrast, the sensor elements 604 and 606 for measuring the rotation number TC of the motor 10, whose measurement accuracy is not so much high as the sensor elements 603 and 605, are disposed to be farther to the rotation center line Ac.

In addition, as illustrated in FIG. 13B, the sensor elements 603 and 604 can be disposed in parallel to the lateral width direction of the lead frame 66 to face the rotation center line Ac in the chip 641. Similarly, the sensor elements 605 and 606 can be disposed in parallel to the lateral width direction of the lead frame 66 to face the rotation center line Ac in the chip 642. This results in the sensor elements 603 and 605 being arranged to be symmetric with respect to the rotation center line Ac, and the sensor elements 604 and 604 being arranged to be symmetric with respect to the rotation center line Ac.

Similar to the first embodiment, the rotational angle calculator 614 calculates the rotational angle θm of the motor 10 based on a value, which represents the magnetic change of the magnet 16, measured by the sensor element 603, and outputs, to the communicator 619, a rotational angle signal indicative of the calculated rotational angle θm of the motor 10. The rotation number calculator 615 calculates the rotation number TC of the motor 10, which represents the magnetic change of the magnet 16, measured by the sensor element 604. Then, the rotation number calculator 615 outputs, to the communicator 619, a rotation number signal indicative of the rotation number TC of the motor 10.

Similarly, the rotational angle calculator 615 calculates the rotational angle θm of the motor 10 based on a value, which represents the magnetic change of the magnet 16, measured by the sensor element 605, and outputs, to the communicator 619, a rotational angle signal indicative of the calculated rotational angle θm of the motor 10. The rotation number calculator 615 calculates the rotation number TC of the motor 10, which represents the magnetic change of the magnet 16, measured by the sensor element 606. Then, the rotation number calculator 615 outputs, to the communicator 619, a rotation number signal indicative of the rotation number TC of the motor 10.

As described above, the rotation detecting apparatus 2 is configured such that the sensor elements 603 and 605 for detecting the rotational angle θm of the motor 10 and the sensor elements 604 and 606 for detecting the rotation number TC of the motor 10 are separately provided. This enables a sensor element suitable for measuring the rotational angle θm of the motor 10 and a sensor element suitable for measuring the rotation number TC of the motor 10 to be selected as the respective sensor elements 603 and 604 and as the respective sensor elements 605 and 606.

The sensor elements 603 and 605 for detecting the rotational angle θm of the motor 10 according to the second embodiment each serve as a first sensor element, and the sensor elements 604 and 606 for detecting the rotation number TC of the motor 10 each serve as a second sensor element.

In addition to the specific advantageous effect, the second embodiment achieves the same advantageous effects as those achieved by the first embodiment.

Third Embodiment

Figure 14:
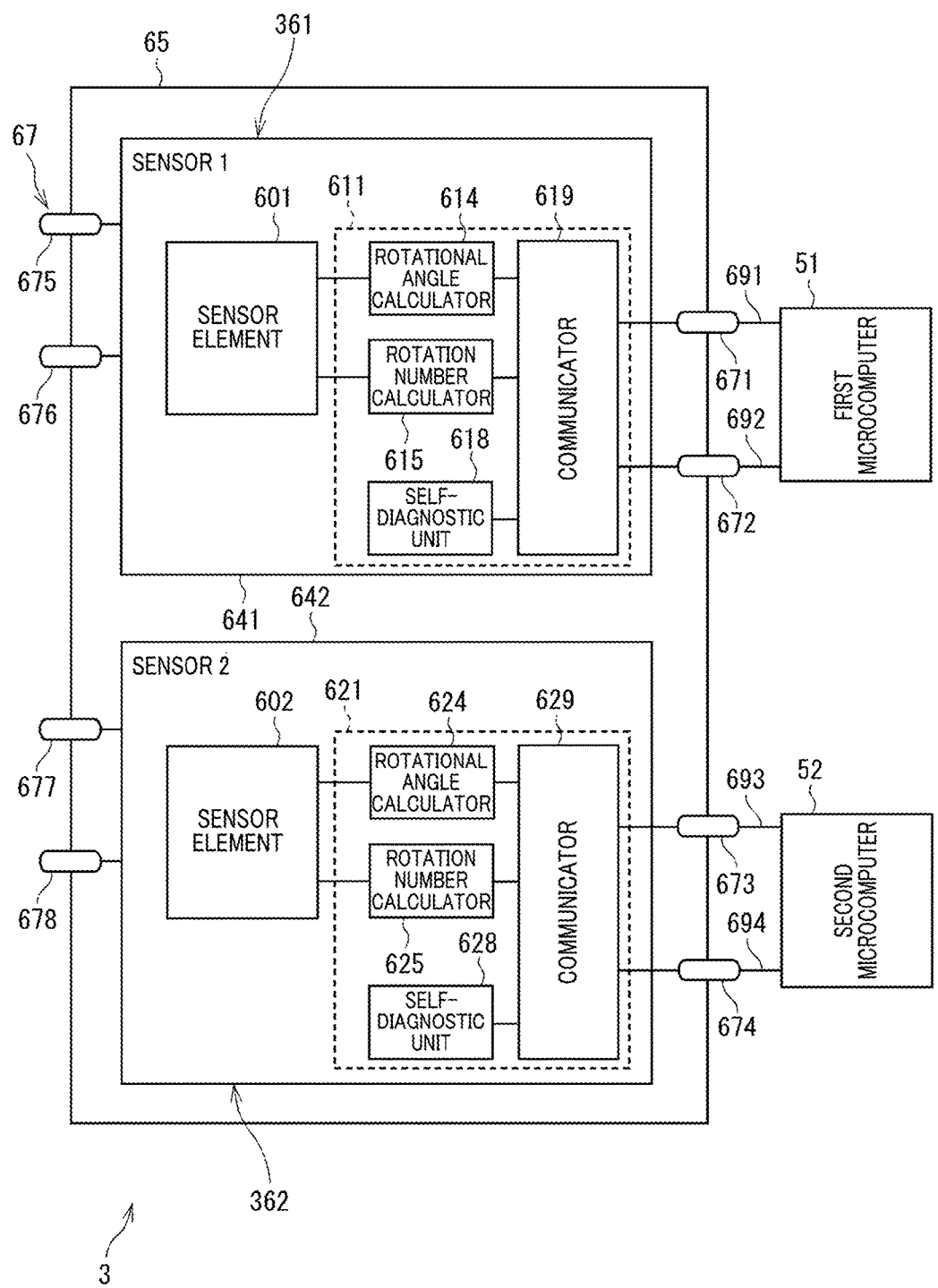
FIG. 14 is a block diagram schematically illustrating a rotation detecting apparatus according to the third embodiment of the present disclosure.
Figure 15:
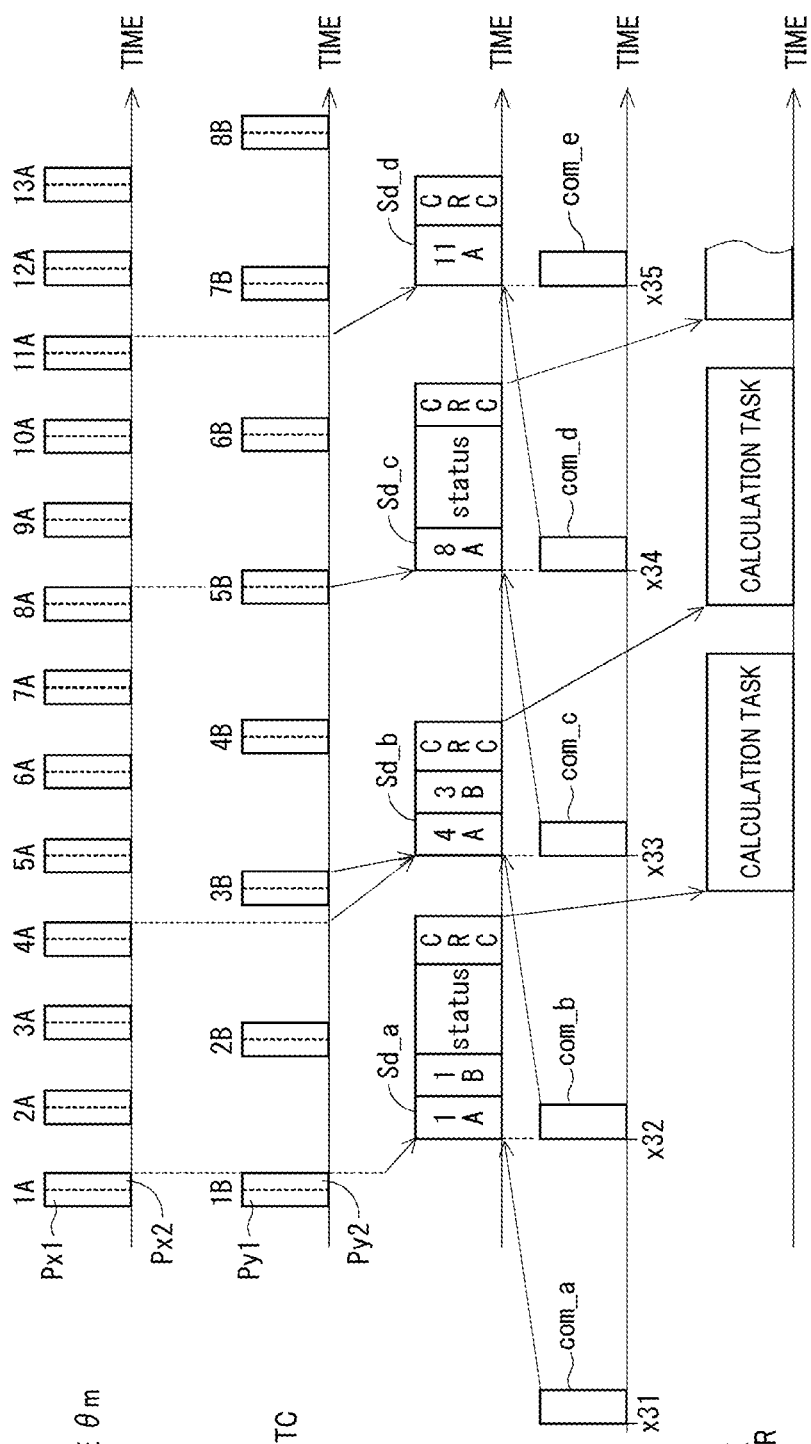
FIGS. 15A to 15E are a joint timing chart schematically illustrating an example of how the first sensor and the first microcomputer illustrated in FIG. 14 communicate with each other.

The following describes the third embodiment of the present disclosure with reference to FIGS. 14 and 15. The third embodiment includes a rotation detecting apparatus 3 that differs from the rotation detecting apparatus 1 according to the first embodiment in the following points. So, the following mainly describes the different points, and omits or simplifies descriptions of like parts between the first and third embodiments, to which identical or like reference characters are assigned, thus eliminating redundant description.

Referring to FIG. 14, the rotation detecting apparatus 3 includes a first sensor 361, a second sensor 362, the first microcomputer 51, and the second microcomputer 52.

The first sensor 361 includes a circuit module 611. The circuit module 611 includes a self-diagnostic unit 618 in addition to the components of the circuit module 610 of the first embodiment. The second sensor 362 includes a circuit module 621. The circuit module 621 includes a self-diagnostic unit 628 in addition to the components of the circuit module 620 of the first embodiment. The sensor element 601 and the circuit module 611 are integrated in the single chip 641, and the sensor element 602 and the circuit module 621 are integrated in the single chip 642. Similar to the second embodiment, different sensor elements for respectively measuring the rotational angle θm and the rotation number TC of the motor 10 can be used in place of each of the sensor elements 601 and 602.

The self-diagnostic unit 618 is configured to diagnose whether there is a fault, i.e. a malfunction, in the first sensor 361. Specifically, the self-diagnostic unit 618 is configured to monitor whether there is a power failure including power supply fault and ground fault in each of the sensor element 601, the rotational angle calculator 614, and the rotation number calculator 615. Similarly, the self-diagnostic unit 628 is configured to diagnose whether there is a fault in the second sensor 362. Specifically, the self-diagnostic unit 628 is configured to monitor whether there is a power failure including power supply fault and ground fault in each of the sensor element 602, the rotational angle calculator 624, and the rotation number calculator 625. Each of the self-diagnostic units 618 and 628 outputs the self-diagnostic result obtained thereby to the corresponding one of the communicators 619 and 629.

Each of the communicators 619 and 629 of the corresponding one of the first and second sensors 361 and 362 is configured to include, as status data or a status signal, the self-diagnostic result in the output signal to be output to the corresponding one of the first and second microcomputers 51 and 52 in response to when a predetermined type of the command signal sent from the corresponding one of the first and second microcomputers 51 and 52 is input thereto.

Specifically, each of the first and second sensors 361 and 362 is configured to change information included in an output signal to be sent to the corresponding one of the first and second microcomputers 51 and 52 depending on the type of the command signal sent from the corresponding one of the first and second microcomputers 51 and 52.

FIGS. 15A to 15E, which correspond to respective FIGS. 11A to 11E, illustrate how the first sensor 361 communicates with the first microcomputer 51 when the update periods DRT_sa and DRT_sb are set to be different from each other. Because communication timings illustrated in FIGS. 15A to 15E are substantially identical to the communication timings illustrated in FIGS. 11A to 11E, the following describes how the communicator 619 changes the information included in the output signal in response to a command signal sent from the first microcomputer 51.

Similar to the first embodiment, the following describes only how the first sensor 361 communicates with the first microcomputer 51 with reference to FIGS. 15A to 15E, and eliminates how the second sensor 362 communicates with the second microcomputer 52. This is because how the second sensor 362 communicates with the second microcomputer 52 is substantially identical to how the first sensor 361 communicates with the first microcomputer 51.

As described above, the first sensor 361 is configured to change information included in the output signal to be sent to the corresponding one of the first and second microcomputers 51 and 52 depending on the type of the command signal sent from the he corresponding one of the first and second microcomputers 51 and 52.

Referring to FIGS. 15C and 15D, the first microcomputer 51 sends a command signal com_a to the first sensor 361 at time x31. The communicator 619 of the first sensor 361 transmits, to the first microcomputer 51, an output signal Sd_a including the newest measurement data 1A for the rotational angle θm, the newest measurement data 1B for the rotation number TC, the status signal, which is shown as "status" in FIG. 11C, and the CRC code at time x31 in response to a next command signal S_b sent from the first microcomputer 51.

The first microcomputer 51 sends a command signal com_b to the first sensor 361 at the time x32. The command signal com_b requests transmission of the output signal without including the status data at the next transmission timing of the next command signal com_c. The communicator 619 transmits, at the time x33, the output signal Sd_b requested by the immediately previous command signal com_b to the first microcomputer 51; the output signal Sd_b includes the newest measurement data 4A for the rotational angle θm, the newest measurement data 3B for the rotation number TC, and the CRC code.

The first microcomputer 51 sends a command signal com_c to the first sensor 361 at the time x33. The command signal com_c requests transmission of the output signal without including the measurement data of the rotation number TC at the next transmission timing of the next command signal com_d. The communicator 619 transmits, at the time x34, the output signal Sd_c requested by the immediately previous command signal com_c to the first microcomputer 51; the output signal Sd_c includes the newest measurement data 8A for the rotational angle θm, the status data, and the CRC code.

The first microcomputer 51 sends a command signal com_d to the first sensor 361 at the time x34. The command signal com_d requests transmission of the output signal without including the measurement data of the rotation number TC and the status data at the next transmission timing of the next command signal com_e. The communicator 619 transmits, at the time x35, the output signal Sd_d requested by the immediately previous command signal com_d to the first microcomputer 51; the output signal Sd_d includes the newest measurement data 11A for the rotational angle θm and the CRC code.

FIG. 15C illustrates an example that the command signals com_a, com_b, com_c, and com_d are sent from the first microcomputer 51 to the first sensor 361 in this order, and the output signals Sd_a, Sd_b, Sd_c, and Sd_d are sent from the first sensor 361 to the first microcomputer 51 in this order. The order of transmitting the command signals com_a, com_b, com_c, and com_d can be changed, so that the corresponding order of the output signals Sd_a, Sd_b, Sd_c, and Sd_d can also be changed.

The first microcomputer 51 can be configured to
(1) Send, to the first sensor 361, first periodic command signals that request the first sensor 361 to measure the rotation number TC of the motor 10 in response to receiving each of the first periodic command signals
(2) Send, to the first sensor 361, second periodic command signals that request the first sensor 361 to obtain the status data in response to receiving each of the second periodic command signals
(3) Send, to the first sensor 361, third command signals that request the first sensor 361 to measure the rotational angle θm of the motor 10 in response to receiving each of the third command signals; the third command signals are asynchronous with the first periodic command signals and the second periodic command signals.

The period of the first periodic command signals for measuring the rotation number TC of the motor 10 and the period of the second periodic command signals for obtaining the status data can be set to be identical to each other or different from each other.

The first microcomputer 51 can be configured to send, to the first sensor 361, one of the command signals com_a, com_b, and com_c in place of the command signal com_D, each time the first microcomputer 51 requires the rotation number TC of the motor 10 and the status data of the first sensor 361.

Upon receiving one of the output signals, the first microcomputer 51 starts to perform a calculation task defined by the corresponding output signal (see FIG. 11E). FIG. 11E illustrates the periods required to perform the calculation tasks based on the respective output signals are set to be equal to each other, but can be set to be different from each other.

The rotation detecting apparatus 3 according to the third embodiment is configured such that each of the first and second sensors 361 and 362 includes the corresponding one of the self-diagnostic units 618 and 628, and changes information included in the output signal depending on the type of the command signal sent from the corresponding one of the first and second microcomputers 51 and 52. The present disclosure is however not limited to the configuration. Specifically, each of the rotation detecting apparatuses 1 and 2 according to the first and second embodiments, which does not include the self-diagnostic units 618 and 628, can be configured to change information included in the output signal depending on the type of the command signal sent from the corresponding one of the first and second microcomputers 51 and 52.

For example, each of the first sensors 61 and 261 can be configured to
(1) Output the output signal Sd_b including the newest measurement data for the rotational angle θm, the newest measurement data for the rotation number TC, and the CRC code in response to the command signal com_b (2) Output the output signal Sd_d including the newest measurement data for the rotational angle θm and the CRC code in response to the command signal com_d.

As described above, the rotation detecting apparatus 3 is configured such that the first microcomputer 51 sends, to the communicator 619, the command signal whose type specifies at least one of the pieces of data obtained by the first sensor 361; the at least one of the pieces of data should be included in the output signal. The communicator 619 receives the command signal, and changes the information included in the output signal according to the type of the command signal. This enables the communicator 619 to efficiently send, to the first microcomputer 51, at least one piece of data, which are required for the first microcomputer 51.

The circuit module 611 includes the self-diagnostic unit 618 for determining whether there is a fault in the first sensor 361, and the communicator 619 sends, to the first microcomputer 51, the output signal including the self-diagnostic result. When receiving, for example, an abnormal self-diagnostic result representing that there is a fault in the first sensor 361, the first microcomputer 51 is disabled from performing calculation based on the output signal including the abnormal self-diagnostic result. This results in the rotation detecting apparatus 3 having higher reliability.

The third embodiment describes the advantageous effect achieved by the combination of the first sensor 361 and the first miscompute 51, but the combination of the second sensor 362 and the second microcomputer 52 can achieve the same advantageous effects.

In addition to the specific advantageous effect, the third embodiment achieves the same advantageous effects as those achieved by the first embodiment.

Fourth Embodiment

Figure 16:
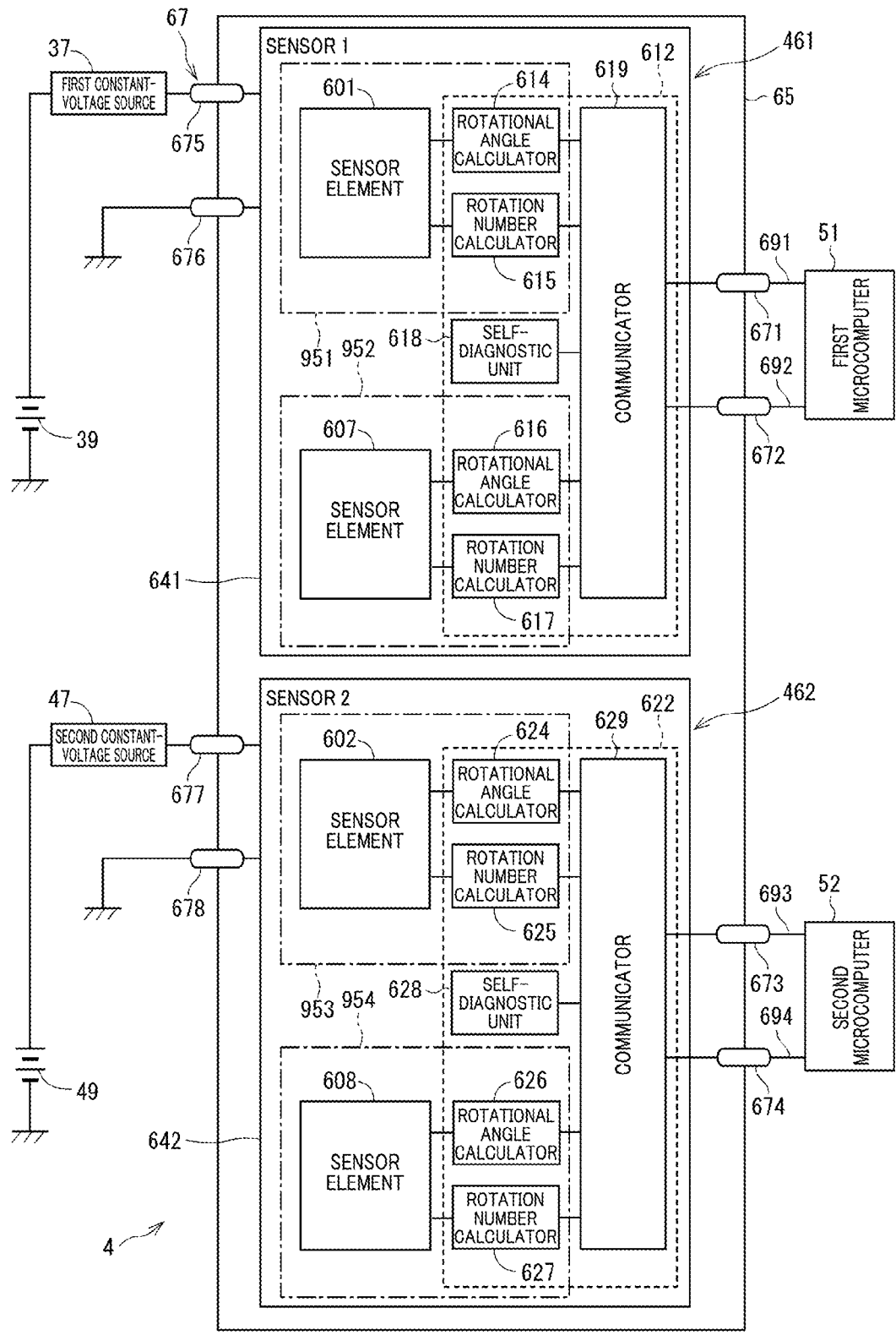
FIG. 16 is a block diagram schematically illustrating a rotation detecting apparatus according to the fourth embodiment of the present disclosure.

The following describes the fourth embodiment of the present disclosure with reference to FIG. 16. The fourth embodiment includes a rotation detecting apparatus 4 that differs from the rotation detecting apparatus 3 according to the third embodiment in the following points. So, the following mainly describes the different points, and omits or simplifies descriptions of like parts between the third and fourth embodiments, to which identical or like reference characters are assigned, thus eliminating redundant description.

Referring to FIG. 16, the rotation detecting apparatus 4 includes a first sensor 461, a second sensor 462, the first microcomputer 51, and the second microcomputer 52.

The first sensor 461 includes a sensor element 601, a sensor element 607, and a circuit module 612 installed in the single chip 641. The second sensor 462 includes a sensor element 602, a sensor element 608, and a circuit module 622 installed in the single chip 642.

The circuit module 612 includes a rotational angle calculator 616 and a rotation number calculator 617 in addition to the components of the circuit module 611 of the third embodiment.

That is, the first sensor 461 includes a pair of
(1) A rotation information calculator 951, which is comprised of the sensor element 601, the rotational angle calculator 614 and the rotation number calculator 615
(2) A rotation information calculator 952, which is comprised of the sensor element 607, the rotational angle calculator 616 and the rotation number calculator 617.

The circuit module 622 includes a rotational angle calculator 626 and a rotation number calculator 627 in addition to the components of the circuit module 612 of the third embodiment.

That is, the second sensor 462 includes a pair of (1) A rotation information calculator 953, which is comprised of the sensor element 602, the rotational angle calculator 624 and the rotation number calculator 625

(2) A rotation information calculator 954, which is comprised of the sensor element 608, the rotational angle calculator 626 and the rotation number calculator 627.

The self-diagnostic unit 618 is configured to monitor (1) Whether there is a power failure including power supply fault and ground fault in each of the sensor elements 601 and 607, the rotational angle calculators 614 and 616, and the rotation number calculators 615 and 617

(2) Whether there is a malfunction in the circuit module 612 to thereby diagnose the rotational angle θm.

For example, the self-diagnostic unit 618 is configured to compare the calculation results obtained by the rotation information calculator 951 with the corresponding calculation results obtained by the rotation information calculator 952. Then, the self-diagnostic unit 618 is configured to determine whether there is an internal fault, such as an offset fault, in the first sensor 461 based on the comparison results. This makes it possible to diagnose whether there is a malfunction in one of the sensor elements 601 and 607, and whether a value of the rotational angle θm is an abnormal value.

The self-diagnostic unit 628 is configured to monitor (1) Whether there is a power failure including power supply fault and ground fault in each of the sensor elements 602 and 608, the rotational angle calculators 624 and 626, and the rotation number calculators 625 and 627

(2) Whether there is a malfunction in the circuit module 622 to thereby diagnose the rotational angle θm.

For example, the self-diagnostic unit 628 is configured to compare the calculation results obtained by the rotation information calculator 953 with the corresponding calculation results obtained by the rotation information calculator 954. Then, the self-diagnostic unit 628 is configured to determine whether there is an internal fault, such as an offset fault, in the second sensor 462 based on the comparison results. This makes it possible to diagnose whether there is a malfunction in one of the sensor elements 602 and 608, and whether a value of the rotational angle θm is an abnormal value.

Each of the self-diagnostic units 618 and 628 outputs the self-diagnostic result obtained thereby to the corresponding one of the communicators 619 and 629.

Each of the communicators 619 and 629 of the corresponding one of the first and second sensors 461 and 462 is configured to include, as status data, the self-diagnostic result in the output signal to be output to the corresponding one of the first and second microcomputers 51 and 52 in response to when a predetermined type of the command signal sent from the corresponding one of the first and second microcomputers 51 and 52 is input thereto.

Note that the self-diagnostic unit 618 can be configured to output, to the first microcomputer 51, the calculation results obtained by the rotation information calculator 951 and the corresponding calculation results obtained by the rotation information calculator 952 without executing the comparison. Then, the first microcomputer 51 can be configured to compare the calculation results obtained by the rotation information calculator 951 with the corresponding calculation results obtained by the rotation information calculator 952, thus diagnosing whether there is a malfunction in the circuit module 612 of the first sensor 461.

Similarly, the self-diagnostic unit 628 can be configured to output, to the second microcomputer 52, the calculation results obtained by the rotation information calculator 953 and the corresponding calculation results obtained by the rotation information calculator 954 without executing the comparison. Then, the second microcomputer 52 can be configured to compare the calculation results obtained by the rotation information calculator 953 with the corresponding calculation results obtained by the rotation information calculator 954, thus diagnosing whether there is a malfunction in the circuit module 622 of the second sensor 462.

Each of the self-diagnostic units 618 and 628 can also be configured to diagnose whether there is a fault in the corresponding one of the first and second sensors 461 and 462 using at least one of known diagnostic methods.

Similar to the second embodiment, a sensor element for detecting the rotational angle θm of the motor 10 and a sensor element for detecting the rotation number TC of the motor 10 are separately provided in place of the sensor element 601, and a sensor element for detecting the rotational angle θm of the motor 10 and a sensor element for detecting the rotation number TC of the motor 10 are separately provided in place of the sensor element 607. Similarly, a sensor element for detecting the rotational angle θm of the motor 10 and a sensor element for detecting the rotation number TC of the motor 10 are separately provided in place of the sensor element 602, and a sensor element for detecting the rotational angle θm of the motor 10 and a sensor element for detecting the rotation number TC of the motor 10 are separately provided in place of the sensor element 608.

This modification results in each of the first and second sensors 461 and 462 including four sensor elements, and therefore the rotation detecting apparatus includes the total of eight sensor elements.

As described above, the rotation detecting apparatus 4 includes the first sensor 461 and the second sensor 462. The first sensor 461 includes the pair of (1) The rotation information calculator 951, which is comprised of the sensor element 601, the rotational angle calculator 614 and the rotation number calculator 615

(2) The rotation information calculator 952, which is comprised of the sensor element 607, the rotational angle calculator 616 and the rotation number calculator 617.

The second sensor 462 includes the pair of (1) The rotation information calculator 953, which is comprised of the sensor element 602, the rotational angle calculator 624 and the rotation number calculator 625

(2) The rotation information calculator 954, which is comprised of the sensor element 608, the rotational angle calculator 626 and the rotation number calculator 627.

This configuration enables (1) The self-diagnostic unit 618 or the first microcomputer 51 to diagnose whether there is a malfunction in the first sensor 461 based on a comparison between the calculation results obtained by the rotation information calculator 951 and the corresponding calculation results obtained by the rotation information calculator 952

(2) The self-diagnostic unit 628 or the first microcomputer 52 to diagnose whether there is a malfunction in the second sensor 462 based on a comparison between the calculation results obtained by the rotation information calculator 953 and the corresponding calculation results obtained by the rotation information calculator 954.

This results in efficient self-diagnosis of each of the first and second sensors 461 and 462.

In addition to the specific advantageous effect, the fourth embodiment achieves the same advantageous effects as those achieved by the third embodiment.

Fifth Embodiment

Figure 17:
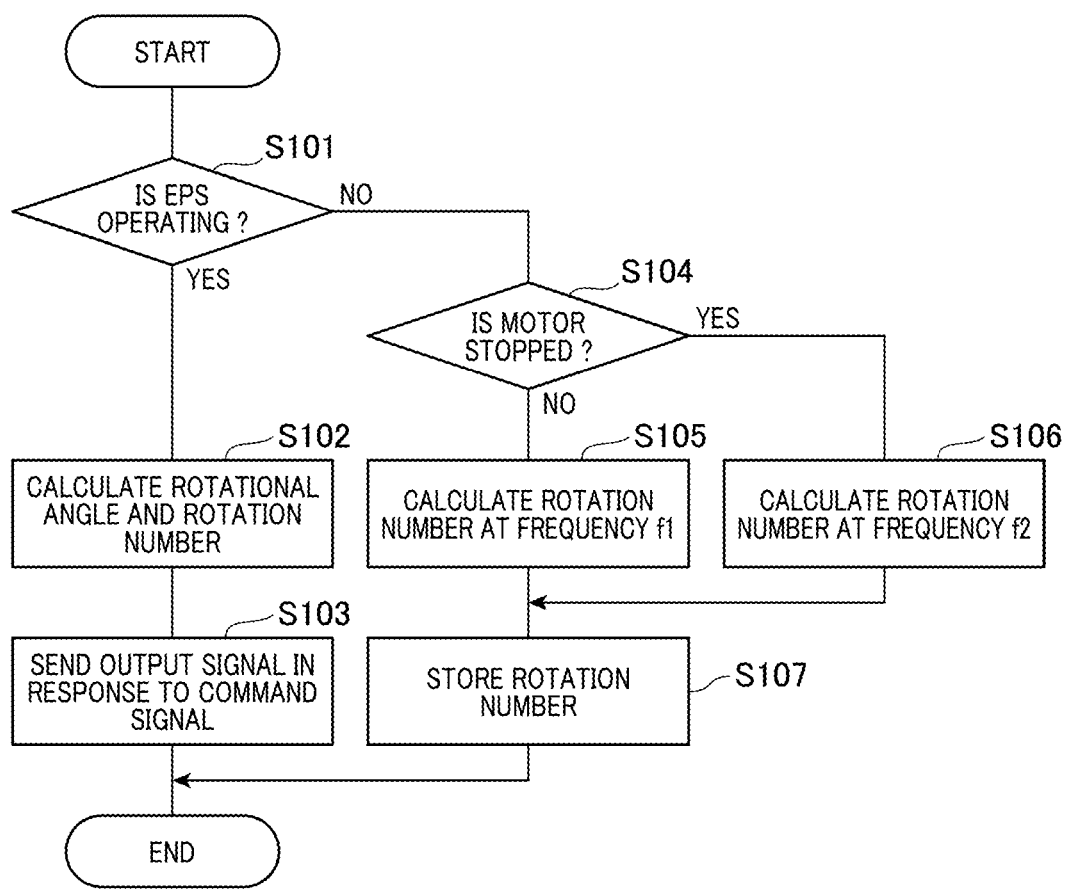
FIG. 17 is a flowchart schematically illustrating a rotational information calculating task according to the fifth embodiment of the present disclosure.

The following describes the fifth embodiment of the present disclosure with reference to FIG. 17. The fifth embodiment differs from the first embodiment in the following points. So, the following mainly describes the different points, and omits or simplifies descriptions of like parts between the first and fifth embodiments, to which identical or like reference characters are assigned, thus eliminating redundant description.

As described above, the circuit module 610 of the first sensor 61 according to each of the first to fourth embodiments performs a task of calculating information including the rotational angle θm and the newest measurement data for the rotation number TC; the task is referred to as a rotational information calculating task.

The circuit module 610 of the first sensor 61 according to the fifth embodiment is also configured to perform a rotational information calculating task that is different from the rotational information calculating tasks according to the respective first to fourth embodiments.

The electronic power steering apparatus 108 is shut down while a starting switch, that is, an ignition switch, of the vehicle V is off, so that the vehicle V is stopped. This results in power not being supplied to the first and second microcomputers 51 and 52, so that the first and second microcomputers 51 and 52 perform no calculations or communication with other devices.

The rotation detecting apparatus according to the fifth embodiment is configured such that electrical power is continuously supplied to the sensor package 65 even if the electronic power steering apparatus 108 is shut down. Specifically, the first battery 39 according to the fifth embodiment is configured to directly supply electrical power to the first sensor 61, and the second battery 49 according to the fifth embodiment is configured to directly supply electrical power to the second sensor 62 while the electronic power steering apparatus 108 is deactivated.

This enables each of the circuit modules 610 and 620 of the corresponding one of the first and second sensors 61 and 62 to continuously perform the rotational information calculating task even if the electronic power steering apparatus 108 is stopped.

As described above, the steering angle θs of the steering shaft 102 is calculated as a function of the rotational angle θm, the rotation number TC, and the gear ratio of the deceleration gear mechanism 109. While the electronic power steering apparatus 108 is deactivated, driver's operation of the steering wheel 101 causes the steering shaft 102 to turn, so that the motor 10 is rotated via the deceleration gear mechanism 109. At that time, if the rotation number TC were not counted, the steering angle θs of the steering shaft 102 could not be calculated until relearning of the neutral position of the steering wheel 101 is completed. Note that, because calculation of the steering angle θs of the steering shaft 102 requires an instantaneous value of the rotational angle θm at the restarting of the vehicle V, i.e. the restarting of the electronic power steering apparatus 108, it is unnecessary to continuously calculate the rotational angle θm.

In view of these circumstances, the rotation detecting apparatus according to the fifth embodiment is configured such that the first battery 39 directly supplies electrical power to the first sensor 61, and the second battery 49 directly supplies electrical power to the second sensor 62 while the electronic power steering apparatus 108 is deactivated. This enables each of the first and second sensors 61 and 62 to continuously perform at least calculation of the rotation number TC of the motor 10 while the electronic power steering apparatus 108 is deactivated. Note that the fifth embodiment can also be configured such that each of the first and second sensors 61 and 62 continuously performs calculation of the rotational angle θm of the motor 10 while the electronic power steering apparatus 108 is deactivated. Preferably, each of the first and second sensors 61 and 62 is configured not to continuously perform calculation of the rotational angle θm of the motor 10 while the electronic power steering apparatus 108 is deactivated, to prevent power consumption of the electronic power steering apparatus 108 from rising.

Each of the first and second sensors 61 and 62 stores the counted rotation number TC therein without transmitting the counted rotation number TC to the corresponding one of the first and second microcomputers 51 and 52, because the first and second microcomputers 51 and 52 are deactivated. Then, after restarting of the electronic power steering apparatus 108, each of the first and second sensors 61 and 62 sends, to the corresponding microcomputer, the output signal including the rotational angle signal and the counted rotation number TC stored therein in response to the command signal transmitted from the corresponding microcomputer. This enables each of the first and second microcomputers 51 and 52 to properly calculate the steering angle θs of the steering shaft 102 at the restarting of the electronic power steering apparatus 108 without performing relearning of the neutral position of the steering wheel 101.

The following describes in detail the rotational information calculating task carried out by the each of the circuit modules 610 and 620 of the corresponding one of the first and second sensors 61 and 62. The following describes only the rotational information calculating task carried out by the circuit module 610 of the first sensor 61, and eliminates the rotational information calculating task carried out by the circuit module 620 of second sensor 62. This is because the rotational information calculating task carried out by the circuit module 620 of second sensor 62 is substantially identical to the rotational information calculating task carried out by the circuit module 610 of the first sensor 61.

When starting the rotational information calculating task, the circuit module 610 determines whether the electronic power steering apparatus 108 is operating, in step S101. For example, the circuit module 610 is capable of determining that the electronic power steering apparatus 108 is not operating in accordance with no clock signals and/or command signals being sent thereto from the first microcomputer 51 in step S101. When it is determined that the electronic power steering apparatus 108 is not operating (NO in step S101), the rotational information calculating task proceeds to step S104. Otherwise, when it is determined that the electronic power steering apparatus 108 is operating (YES in step S101), the rotational information calculating task proceeds to step S102.

In step S102, the circuit module 610 calculates the rotational angle θm and the rotation number TC based on a value measured by the sensor element 601, and calculates the rotation number TC based on a value measured by the sensor element 601. Then, the circuit module 610 outputs, to the first microcomputer 51, the output signal including the rotational angle θm and the rotation number TC in response to the command signal sent from the first microcomputer 51. This results in the first microcomputer 51 calculating the rotational angle θm and the steering angle θs based on the rotational angle θm and the rotation number TC included in the output signal.

Otherwise, upon determining that the electronic power steering apparatus 108 is not operating (NO in step S101), the circuit module 610 determines whether the motor 10 is stopped in step S104. For example, in step S104, the circuit module 610 is capable of determining that the motor 10 is stopped when, for example, the rotational speed of the motor 10 is lower than a predetermined threshold. The circuit module 610 is also capable of determining that the motor 10 is stopped when the measurement signal indicative of the rotational angle θm measured by the first sensor 601 is unchanged. The circuit module 610 is further capable of determining that the motor 10 is stopped when the amount of change of measured values successively output from the sensor element 601, such as the deviation between the current measured value and the immediately previous measured value of the sensor element 601 or the differential value of the deviation, is lower than a predetermined threshold. In addition, if the circuit module 610 is configured to increment a counted value indicative of the number of rotations of the motor 10 each time the motor 10 turns one of the three or more divided rotational angular ranges, the circuit module 610 is capable of determining that the motor 10 is stopped when the same counted value is continued for a predetermined period.

When it is determined that the motor 10 is operating (NO in step S104), the rotational information calculating task proceeds to step S105. Otherwise, when it is determined that the motor 10 is stopped (YES in step S104), the rotational information calculating task proceeds to step S106.

In step S105, the rotation number calculator 615 of the circuit module 610 calculates the rotation number TC at a first frequency f1. The first frequency f1 can be set to prevent skipping of detection of the motor's rotation. In step S105, the rotation number calculator 615 of the circuit module 610 can calculate the rotation number TC at the first frequency f1 only within a predetermined period.

In step S106, the rotation number calculator 615 of the circuit module 610 calculates the rotation number TC at a second frequency f1 lower than the first frequency f1. Because the rotation number TC is unchanged while the motor 10 is stopped, reducing the frequency of calculating the rotation number TC while the motor 10 is stopped as compared with the frequency of calculating the rotation number TC while the motor 10 is operating enables power consumption based on the operations of the motor 10 to be reduced.

Setting the calculation frequency to be equal to or higher than the first frequency f1 while the electronic power steering apparatus 108 is operating prevents skipping of detecting rotation of the motor 10. While the electronic power steering apparatus 108 is operating, the first microcomputer 51 is capable of calculating, based on the rotational angle θm, the rotation number TC, because the rotational angle θm is sent to the first microcomputer 51. This enables the calculation frequency of the rotation number TC while the electronic power steering apparatus 108 is operating to be set to be lower than the first frequency f1.

Following the operation in step S105 or S106, the circuit module 610 stores the rotation number TC therein in step S107. Note that, when executing the operation in step S107 of the current rotational information calculating task, the circuit module 610 updates the value of the rotation number TC stored in the operation in step S107 of the immediately previous rotational information calculating task to the value of the rotation number TC stored in the operation in step S107 of the current rotational information calculating task.

The circuit module 610 sends, to first microcomputer 51, the rotation number TC stored therein and the rotational signal including the rotational angle θm when the electronic power steering apparatus 108 is restarted.

As described above, each of the first and second sensors 61 and 62 is configured to change the frequency of updating, i.e. calculating, the rotation number TC by the corresponding one of the rotation number calculators 615 and 625 in accordance with whether the motor 10 is operating. Specifically, each of the first and second sensors 61 and 62 is configured to reduce the frequency of updating, i.e. calculating, the rotation number TC while the motor 10 is stopped as compared with the frequency of updating, i.e. calculating, the rotation number TC while the motor 10 is operating. This enables power consumption of each of the first and second sensors 61 and 62 to be reduced while the motor 10 is stopped.

The rotation detecting apparatus according to the fifth embodiment is configured such that the first battery 39 directly supplies electrical power to the first sensor 61, and the second battery 49 directly supplies electrical power to the second sensor 62 while the electronic power steering apparatus 108 is deactivated.

This enables each of the first and second sensors 61 and 62 to continuously perform at least calculation of the rotation number TC of the motor 10 while the electronic power steering apparatus 108 is deactivated. This enables each of the first and second microcomputers 51 and 52 to properly calculate the steering angle θs of the steering shaft 102 at the restarting of the electronic power steering apparatus 108 without performing relearning of the neutral position of the steering wheel 101.

In addition to the specific advantageous effect, the fifth embodiment achieves the same advantageous effects as those achieved by the first embodiment.

Sixth Embodiment

Figure 18:
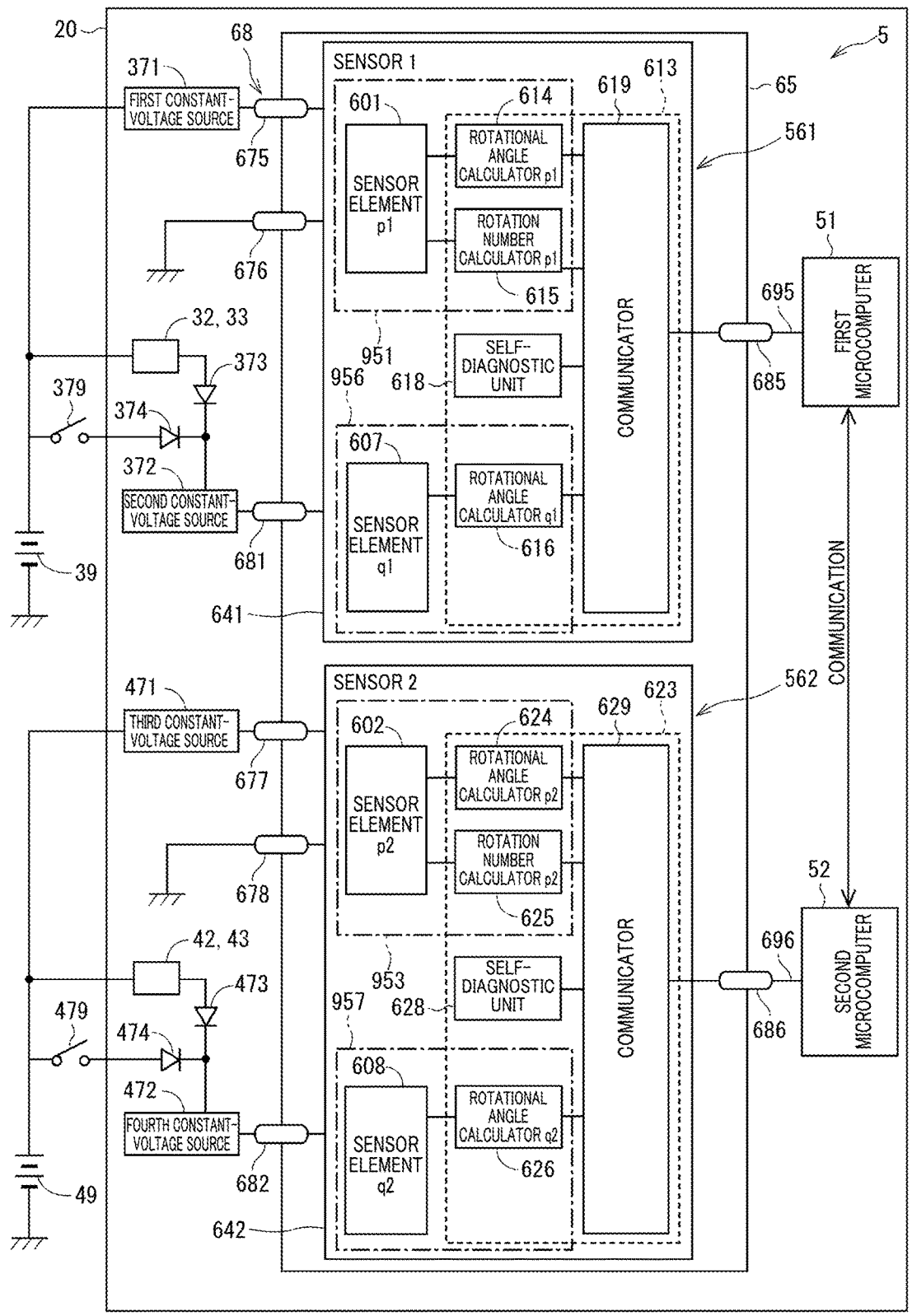
FIG. 18 is a block diagram schematically illustrating a rotation detecting apparatus according to the sixth embodiment of the present disclosure.
Figure 20:
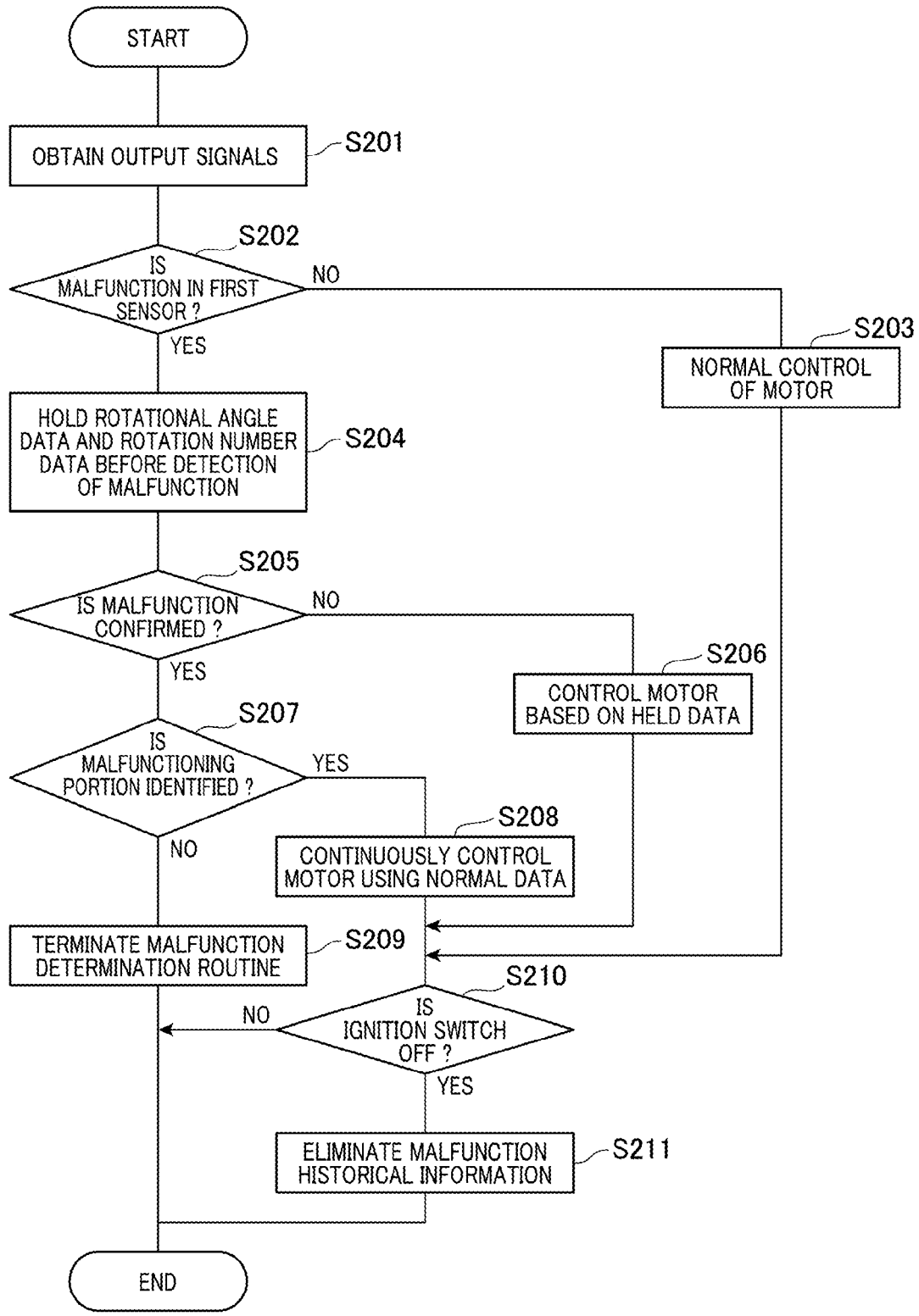
FIG. 20 is a flowchart schematically illustrating a malfunction determination routine according to the sixth embodiment.

The following describes the sixth embodiment of the present disclosure with reference to FIGS. 18 to 20. The sixth embodiment includes a rotation detecting apparatus 5 that differs from the rotation detecting apparatus 4 according to the fourth embodiment in the following points. So, the following mainly describes the different points, and omits or simplifies descriptions of like parts between the sixth and fourth embodiments, to which identical or like reference characters are assigned, thus eliminating redundant description.

Referring to FIG. 18, the rotation detecting apparatus 5 includes a first sensor 561, a second sensor 562, the first microcomputer 51, and the second microcomputer 52.

The first sensor 561 includes the sensor element 601, the sensor element 607, and a circuit module 613 installed in the single chip 641. The second sensor 562 includes the sensor element 602, the sensor element 608, and a circuit module 623 installed in the single chip 642.

The circuit module 613 includes the rotational angle calculator 616 in addition to the components of the circuit module 611 of the third embodiment.

That is, the first sensor 561 includes a pair of
(1) The rotation information calculator 951, which is comprised of the sensor element 601, the rotational angle calculator 614 and the rotation number calculator 615

(2) A rotation information calculator 956, which is comprised of the sensor element 607 and the rotational angle calculator 616.

In other words, the rotation number calculator 617 is eliminated from the rotation information calculator 952 of the fourth embodiment.

Similarly, the circuit module 623 includes the rotational angle calculator 616 in addition to the components of the circuit module 621 of the third embodiment.

That is, the second sensor 562 includes a pair of (1) The rotation information calculator 953, which is comprised of the sensor element 602, the rotational angle calculator 624, and the rotation number calculator 625

(2) A rotation information calculator 957, which is comprised of the sensor element 608 and the rotational angle calculator 626.

In other words, the rotation number calculator 627 is eliminated from the rotation information calculator 954 of the fourth embodiment.

The following assigns (1) A measurement value by the sensor element 601 of the first sensor 561 to reference index p1

(2) A measurement value by the sensor element 607 of the first sensor 561 to reference index q1

(3) A measurement value by the sensor element 602 of the second sensor 562 to reference index p2

(2) A measurement value by the sensor element 608 of the second sensor 562 to reference index q2.

That is, each of the indexes p1 and q1 represents a corresponding measurement value that is measured by the first sensor 561, and each of the indexes p2 and q2 represents a corresponding measurement value that is measured by the second sensor 562. When it is unnecessary to distinguish measurement values by one of the sensor elements from measurement values by the other thereof, no indexes are assigned to the measurement values. Similarly, when it is unnecessary to distinguish measurement values by one of the first and second sensors from measurement values by the other thereof, no indexes are assigned to the measurement values.

Additionally, the sensor package 65 has a pair of longer sides, and has sensor terminals 68 mounted to the respective longer sides. The sensor terminals 68 include communication terminals 685 and 686, power supply terminals 675, 677, 681 and 682, and the ground terminals 676 and 678.

The rotation detecting apparatus 5 includes power-supply relays 320 and 420, reverse-connection protection relays 330 and 430, diodes 373, 374, 473, and 474, and switches 379 and 479.

The positive terminal of the first battery 39 is connected to a first constant-voltage circuit 371, and the first constant-voltage circuit 371 is connected to the first sensor 561 via the power supply terminal 675. The negative terminal of the first battery 39 is connected to the common signal ground of the first sensor 561 via the ground terminal 676.

The positive terminal of the first battery 39 is also connected to a second constant-voltage circuit 372, and the second constant-voltage circuit 372 is connected to the first sensor 561 via the power supply terminal 681.

The second constant voltage circuit 372 is connected to the positive terminal of the first battery 39 via the diode 373, the power-supply relay 320, and the reverse-connection protection relay 330. The second constant voltage circuit 372 is also connected to the positive terminal of the first battery 39 via the diode 374 and the switch 379. Each of the diodes 373 and 374 is connected to the first battery 39 to permit power supply from the first battery 39 to the second constant voltage circuit 372 while disabling power supply from the second constant voltage source 372 to the first battery 39. Each of the power-supply relay 320 and the reverse-connection protection relay 330 includes substantially the same function as the function of the corresponding one of the first power-supply relay 32 and the first reverse-connection protection relay 33. The switch 379 is synchronously turned on or off when the ignition switch is turned on or off.

The positive terminal of the second battery 49 is connected to a third constant-voltage circuit 373, and the third constant-voltage circuit 373 is connected to the second sensor 562 via the power supply terminal 677. The negative terminal of the second battery 49 is connected to the common signal ground of the second sensor 562 via the ground terminal 678.

The positive terminal of the second battery 49 is also connected to a fourth constant-voltage circuit 472, and the fourth constant-voltage circuit 472 is connected to the second sensor 562 via the power supply terminal 682.

The fourth constant voltage circuit 472 is connected to the positive terminal of the second battery 49 via the diode 473, the power-supply relay 420, and the reverse-connection protection relay 430. The fourth constant voltage circuit 472 is also connected to the positive terminal of the second battery 49 via the diode 474 and the switch 479. Each of the diodes 473 and 474 is connected to the second battery 49 to permit power supply from the second battery 49 to the fourth constant voltage circuit 472 while disabling power supply from the fourth constant voltage source 472 to the second battery 49. Each of the power-supply relay 420 and the reverse-connection protection relay 430 includes substantially the same function as the function of the corresponding one of the second power-supply relay 42 and the second reverse-connection protection relay 43. The switch 479 is synchronously turned on or off when the ignition switch is turned on or off.

Each of the constant-voltage circuits 371 and 372 is comprised of, for example, a regulator having predetermined power consumption, such as the order of several mA, which can drive the first sensor 561. That is, each of the constant-voltage circuits 371 and 372 regulates the voltage output from the first battery 39, thus outputting a regulated constant voltage to be supplied to the first sensor 561. The constant-voltage circuits 371 and 372 are capable of supplying electrical power to the sensor package 65 even if the drive apparatus 800 is deactivated.

Each of the constant-voltage circuits 471 and 472 is also comprised of, for example, a regulator having predetermined power consumption, such as the order of several mA, which can drive the second sensor 562. That is, each of the constant-voltage circuits 471 and 472 regulates the voltage output from the second battery 49, thus outputting a regulated constant voltage to be supplied to the second sensor 562. The constant-voltage circuits 471 and 472 are capable of supplying electrical power to the sensor package 65 even if the drive apparatus 800 is deactivated.

These first to fourth constant-voltage circuits 371, 372, 471, and 472 are designed to be identical to each other, or to be different from each other. FIG. 18 illustrates the first to fourth constant-voltage circuits 371, 372, 471, and 472 as constant-voltage circuits 1, 2, 3, and 4. FIG. 18 also illustrates the set of the power-supply relay 320 and the reverse-connection protection relay 330 as a single block, and also illustrates the set of the power-supply relay 420 and the reverse-connection protection relay 430 as a single block.

The first sensor 561 is communicably connected to the first microcomputer 51 via the communication terminal 685 and a communication line 695, and the second sensor 562 is communicably connected to the second microcomputer 52 via the communication terminal 686 and a communication line 696.

That is, transmission of the command signals from the first microcomputer 51 to be received by the first sensor 561 and transmission of the output signals from the first sensor 561 to be received by the first microcomputer 51 are carried out through the common communication terminal 685. Similarly, transmission of the command signals from the second microcomputer 52 to be received by the second sensor 562 and transmission of the output signals from the second sensor 562 to be received by the second microcomputer 52 are carried out through the common communication terminal 686.

Similar to the sixth embodiment, a plurality of constant-voltage circuits and power supply terminals can be provided for each of the first and second sensors 461 and 462 according to the fourth embodiment. Similar to the sixth embodiment, the pair of the command terminal 671 and the output terminal 672 can be replaced with such a common communication terminal 685, and the pair of the command terminal 673 and the output terminal 674 can be replaced with such a common communication terminal 686.

Same type of sensor elements or different types of sensor elements can be used as the respective sensor elements 601, 602, 607, and 608. Preferably, the same types of sensor elements, such as GMR sensor elements, are used as the sensor elements 601 and 607 of the first sensor 561, and the other same types of sensor elements, such as Hall elements, are used as the sensor elements 602 and 608 of the second sensor 562. This enables each of the first and second sensors 561 and 562 to have more robust duplication.

Wiring between the first battery 39 and the first sensor 561 via the power supply terminals 675 and 681 and the ground terminal 676 is configured such that (1) The first battery 39 constantly supplies electrical power to the sensor element 601, the rotation number calculator 615, and the self-diagnostic unit 618 via the power supply terminal 675 and the ground terminal 676

(2) The first battery 39 supplies electrical power to the sensor element 607, the rotational angle calculators 614 and 616, and communicator 619 via the power supply terminal 681 and the ground terminal 676 when either each of the relays 320 and 330 or the switch 379 is on.

In other words, the sensor element 607, the rotational angle calculators 614 and 616, and communicator 619 are shut down when neither each of the relays 320 and 330 nor the switch 379 is on.

Similarly, wiring between the second battery 49 and the second sensor 562 via the power supply terminals 677 and 681 and the ground terminal 678 is configured such that (1) The second battery 49 constantly supplies electrical power to the sensor element 602, the rotation number calculator 625, and the self-diagnostic unit 628 via the power supply terminal 677 and the ground terminal 678

(2) The second battery 49 supplies electrical power to the sensor element 608, the rotational angle calculators 624 and 626, and communicator 629 via the power supply terminal 682 and the ground terminal 678 when either each of the relays 420 and 430 or the switch 349 is on.

In other words, the sensor element 608, the rotational angle calculators 624 and 626, and communicator 629 are shut down when neither each of the relays 420 and 430 nor the switch 479 is on.

The following describes the output-signal communication frame to be transmitted by one communication from the first sensor 561 or the second sensor 562 to the first microcomputer 51 or the second microcomputer 52 with reference to FIGS. 19A and 19B.

Referring to FIG. 19A, the output-signal communication frame is comprised of a run-counter signal, the rotational angle signal based on the rotational angle $\theta m\_pk$, the rotational angle signal based on the rotational angle $\theta m\_qk$, the rotation number signal TC_pk, the status signal, and the CRC signal; these signals constitute respective segments of the output-signal communication frame, and each segment has a predetermined number of bits. That is, the order of the segments in the output-signal communication frame can be freely determined, and the number of bits of each segment can also be freely determined.

In contrast, let us assume that each of the first and second sensors 561 and 562 is designed as the corresponding one of the first and second sensors 461 and 462 according to the fourth embodiment. That is, for the first sensor 561, the sensor element 607 measures a value for the rotation number TC_p1, and the sensor element 608 measures a value for the rotation number TC_q2.

In this assumption, referring to FIG. 19B, the output-signal communication frame is comprised of a run-counter signal, the rotational angle signal based on the rotational angle $\theta m\_pk$, the rotational angle signal based on the rotational angle $\theta m\_qk$, the rotation number signal TC_pk, the rotation number signal TC_qk, the status signal, and the CRC signal; these signals constitute respective segments of the output-signal communication frame, and each segment has a predetermined number of bits. That is, the order of the segments in the output-signal communication frame can be freely determined, and the number of bits of each segment can also be freely determined.

The index k of the output-signal communication frame following the index p or q is set to 1 when the corresponding output signal is output from the first sensor 561, and set to 2 when the corresponding output signal is output from the second sensor 562.

Returning to FIG. 18, the first and second microcomputers 51 and 52 are configured to communicate information with each other. Each of the first and second microcomputers 51 and 52 is therefore capable of using (1) Information correlating with the rotational angle $\theta m$ based on the measurement values by the four sensor elements 601, 602, 607, and 608

(2) Information correlating with the rotation number TC based on the measurement values by the two sensor elements 601 and 602.

In detail, each of the first and second microcomputers 51 and 52 is capable of using (1) The rotational angle $\theta m\_p1$ based on the measurement value by the sensor element 601

(2) The rotation number TC_p1 based on the measurement value by the sensor element 601

(3) The rotational angle $\theta m\_q1$ based on the measurement value by the sensor element 607

(4) The rotational angle $\theta m\_p2$ based on the measurement value by the sensor element 602

(5) The rotation number TC_p2 based on the measurement value by the sensor element 602

(6) The rotational angle $\theta m\_q2$ based on the measurement value by the sensor element 608.

The first microcomputer 51 is configured to determine whether there is a malfunction in the rotation detecting apparatus 5 based on (1) The information correlating with the rotational angle and rotation number included in the output signal that is output from the first sensor 561 and directly obtained from the first sensor 561

(2) The information correlating with the rotational angle and rotation number included in the output signal that is output from the second sensor 562 and obtained from the second microcomputer 52.

Similarly, the second microcomputer 52 is configured to determine whether there is a malfunction in the rotation detecting apparatus 5 based on (1) The information correlating with the rotational angle and rotation number included in the output signal that is output from the second sensor 562 and directly obtained from the second sensor 562

(2) The information correlating with the rotational angle and rotation number included in the output signal that is output from the first sensor 561 and obtained from the first microcomputer 51.

As described above, each of the first and second microcomputers 51 and 52 is configured to increment the count value of the corresponding run counter by 1 each time the run counter signal is sent thereto from the corresponding one of the first and second sensors 61 and 62.

Next, the following describes a malfunction determination routine carried out by each of the first and second microcomputers 51 and 52 with reference to FIG. 20. Each of the first and second microcomputers 51 and 52 is programmed to carry out the malfunction determination routine in a predetermined period while the ignition switch is on. The following describes only the malfunction determination routine carried out by the first microcomputer 51, because the malfunction determination routine carried out by the second microcomputer 52 is substantially identical to that carried out by the first microcomputer 51.

In particular, the second microcomputer 52 carries out the malfunction determination routine using (1) The output signal sent from the second sensor 562 in place of the output signal sent from the first sensor 561

(2) The output signal obtained, via microcomputer-microcomputer communications, from the first microcomputer 51 in place of the output signal obtained, via microcomputer-microcomputer communications, from the second microcomputer 52.

When starting the malfunction determination routine, the first microcomputer 51 obtains the output signal from the first sensor 561, and obtains the output signal sent from the second sensor 562 using microcomputer-microcomputer communications in step S201.

In step S202, the first microcomputer 51 performs the following first to fourth malfunction determination tasks to thereby determine whether there is a malfunction in the first sensor 561:

(i) The first malfunction determination task is to determine whether the run counter has not been updated based on the run counter signal included in the output signal received from the first sensor 561 in step S201, and to determine that a communication interruption malfunction has occurred when the run counter has not been updated.

(ii) The second malfunction determination task is to determine whether there is a malfunction in the first sensor 561 based on the status signal included in the output signal received from the first sensor 561 in step S201, and to determine that there is a malfunction in the first sensor 561 when the status signal represents that there is a malfunction in the first sensor 561.

(iii) The third malfunction determination task is to determine whether there is data corruption in the output signal received from the first sensor 561 in step S201 based on the CRC code included in the output signal received from the first sensor 561 in step S201.

(iv) The fourth malfunction determination task is to determine whether there is a malfunction in the first sensor 561 based on comparison between the rotational angle θm_p1 and the rotation number TC_p1 included in the output signal received from the first sensor 561 in step S201.

For example, when performing the fourth malfunction determination task, the first microcomputer 51 converts a predetermined number of values of the rotational angle θm_p1 obtained for a predetermined number of cycles of the current malfunction detection routines including the current malfunction detection routine into a conversion value of the rotation number as a comparison target with the rotation number TC_p1. Then, the first microcomputer 51 compares the conversion value of the rotation number with the rotation number TC_p1, thus determining whether there is a malfunction in the first sensor 561 based on a result of the comparison. Specifically, for each cycle of the malfunction detection routine, the first microcomputer 51 calculates the deviation of the current value of the rotational angle θm_p1 from the immediately previous value of the rotational angle θm_p1, and adds the deviation obtained in the current cycle of the malfunction detection routine to the deviation obtained in the immediately previous cycle of the malfunction detection routine, thus obtaining the sum of the deviations among the values of the rotational angle θm_p1 up to the completion of the current cycle of the malfunction detection routine. Then, for each cycle of the malfunction detection routine, the first microcomputer 51 calculates the conversion value of the rotation number based on the sum of the deviations among the values of the rotational angle θm_p1 up to the completion of the current cycle of the malfunction detection routine.

Note that the first microcomputer 51 is configured to perform comparison between the rotational angle θm_p1 and the rotation number TC_p1 included in the output signal received from the first sensor 561 in step S201, thus obtaining information indicative of whether there is a malfunction in the first sensor 561, but the present disclosure is not limited thereto. Specifically, the circuit module 613 can be configured to perform comparison between the rotational angle θm_p1 and the rotation number TC_p1 obtained thereby, and send, to the first microcomputer 51, the output signal whose status signal includes a result of the comparison between the rotational angle θm_p1 and the rotation number TC_p1.

Upon determining that there is a malfunction in the first sensor 561, the first microcomputer 51 compares the output signal directly received from the first sensor 561 with the output signal obtained from the second microcomputer 52 using microcomputer-to-microcomputer communications in step S202. Then, the first microcomputer 51 determines, based on a result of the comparison, whether to identify a portion of the first sensor 561 whether a malfunction has occurred in step S202.

Upon determining that the malfunctioning portion is identified in step S202, the first microcomputer 51 stores the malfunctioning portion in its memory unit as malfunction history information in step S202.

When it is determined that there is a malfunction in the first sensor 561 (YES in step S202), the malfunction determination routine proceeds to step S204. Otherwise, when it is determined that there is not a malfunction in the first sensor 561 (NO in step S202), the malfunction determination routine proceeds to step S203.

In step S203, the first microcomputer 51 performs normal control of the motor 10, i.e. on-off switching control of the switching elements 301 to 306 of the first inverter 30 and the relays 32 and 33, using the measurement values included in the output signal received from the first sensor 561. Note that the measurement values used for controlling the motor 10 are measurement values by at least one of the sensor elements 601 and 607 that have no malfunction histories while the switches 379 and 479 are on, or that have returned to be a normal state independently of the on or off states of the switches 379 and 479.

On the other hand, when it is determined that there is a malfunction in the first sensor 561 (YES in step S202), in step S204, the first microcomputer 51 stores, in its memory unit, the rotational angle data and rotation number data included in the output signal that has received from the first sensor 561 before determining that there is a malfunction in the first sensor 561 in step S202.

Next, the first microcomputer 51 confirms whether there is a malfunction in the first sensor 561 in step S205. For example, the first microcomputer 51 confirms that there is a malfunction in the first sensor 561 when the determination that there is a malfunction in the first sensor 561 in step S202 has been for a predetermined time.

When it is determined that the first microcomputer 51 does not confirm that there is a malfunction in the first sensor 561 (NO in step S205), the malfunction determination routine proceeds to step S206. Otherwise, when it is determined that the first microcomputer 51 confirms that there is a malfunction in the first sensor 561 (YES in step S205), the malfunction determination routine proceeds to step S207.

In step S206, the first microcomputer 51 continuously performs control of the motor 10, i.e. on-off switching control of the switching elements 301 to 306 of the first inverter 30 and the relays 32 and 33, using the rotational angle data and rotation number data held in its memory unit. In step S206, the first microcomputer 51 can continuously perform control of the motor 10, i.e. on-off switching control of the switching elements 301 to 306 of the first inverter 30 and the relays 32 and 33, using normal rotational angle data and rotation number data included in the output signal currently received from the first sensor 561 when the malfunctioning portion has been fixed.

In step S207, the first microcomputer 51 determines whether the malfunctioning portion has been fixed based on, for example, comparison between the output signal directly received from the first sensor 561 and the output signal obtained from the second microcomputer 52 using microcomputer-to-microcomputer communications.

When it is determined that the malfunctioning portion has not been fixed (NO in step S207), the malfunction determination routine proceeds to step S209. Otherwise, when it is determined that the malfunctioning portion has been fixed (YES in step S207), the malfunction determination routine proceeds to step S208.

In step S208, the first microcomputer 51 continuously performs control of the motor 10, i.e. on-off switching control of the switching elements 301 to 306 of the first inverter 30 and the relays 32 and 33, using normal rotational angle data and rotation number data included in the output signal received from the first sensor 561 when the first sensor 561 is independent from the identified malfunctioning portion. Note that the normal rotational angle data and rotation number data used for controlling the motor 10 are based on measurement values by at least one of the sensor elements 601 and 607 that have no malfunction histories or that have returned to be a normal state even if it has been temporarily determined that there is a malfunction in the at least one of the sensor elements 601 and 607.

Note that, when it is determined that the first microcomputer 51 confirms that there is a malfunction in the first sensor 561 (YES in step S205), the first microcomputer 51 can terminate control of the motor 10 using the first motor drive system 901 like the following operation in step S209.

In step S209, the first microcomputer 51 terminates control of the motor 10 using the first motor drive system 901 like the following operation in step S209. Even if control of the motor 10 by the first motor drive system 901 has been terminated, the second motor drive system 902 continuously performs control of the motor 10 as long as the second sensor 562 is determined to operate normally.

On the other hand, following the operation in step S203, S206, or S208, the first microcomputer 51 determines whether the ignition switch has been turned off in step S210. Note that each of the first and second microcomputers 51 and 52 is configured to continuously perform a predetermined task, such as a predetermined termination process, for a predetermined time after turnoff of the ignition switch, so that each of the first and second microcomputers 51 and 52, which has performed the predetermined task, is shut down.

Upon determining that the ignition switch has not been turned off (NO in step S210), the first microcomputer 51 terminates this cycle of the malfunction determination routine. Otherwise, upon determining that the ignition switch has been turned off (YES in step S210), the first microcomputer 51 deletes the malfunction history information stored in its memory unit in step S210. This enables at least one of the sensor elements, which has been temporarily determined that there is a malfunction therein and is returned to be a normal sensor element, to be regarded as a normal sensor element. Note that, if a volatile memory in the memory unit is used to store the malfunction history information, the operations in steps S210 and S211 can be eliminated.

As described in detail above, the rotation detecting apparatus 5 according to the sixth embodiment is capable of determining whether the output signal sent from each of the first and second sensors 561 and 562 has malfunctioned based on the run counter signal, the status signal, and/or the CRC signal.

The rotation detecting apparatus 5 is also capable of comparing the rotational angle $\theta m\_pk$, the rotational angle $\theta m\_qk$, and the rotation number TC_pk included in the same output-signal communication frame with each other, thus determining whether there is a malfunction in the corresponding sensor based on the result of the comparison. Because the rotational angle $\theta m\_pk$, the rotational angle $\theta m\_qk$, and the rotation number TC_pk are included in the same output-signal communication frame, the rotational angle $\theta m\_pk$, the rotational angle $\theta m\_qk$, and the rotation number TC_pk have smaller errors due to their time lags.

For example, the rotational angle $\theta m\_pk$ and the rotation number TC_pk are measured by the same sensor element. Thus, when determining that the conversion value of the rotation number based on the rotational angle $\theta m\_pk$ is different from the rotation number TC_pk, the rotation detecting apparatus 5 compares the conversion value of the rotation number based on the rotational angle $\theta m\_pk$ with the conversion value of the rotation number based on the rotational angle $\theta m\_qk$, thus determining which if any of the sensor elements is malfunctioning.

Each of the first and second microcomputers 51 and 52 is capable of obtaining the measurement values by the first sensor 561 and the measurement values by the second sensor 562 using microcomputer-microcomputer communications with respect to the other of the first and second microcomputers 51 and 52. Because the total of four sensor elements are provided in the first and second sensors 561 and 562, each of the first and second microcomputers 51 and 52 is capable of identifying where a malfunctioning portion is in the four sensor elements using majority rule based on the four sets of the measurement values by the respective four sensor elements.

Each of the first and second microcomputers 51 and 52 is capable of determining whether there is a malfunction in the corresponding one of the first and second sensors 561 and 562 using the output signal received from the corresponding one of the first and second sensors 561 and 562; the output signal includes the run counter signal, the status signal, and the CRC signal as an example of error detection signals. The status signal includes in the output signal sent from each of the first and second sensors 561 and 562 is based on the self-diagnostic result by the corresponding one of the self-diagnostic units 618 and 628.

This configuration enables each of the first and second microcomputers 51 and 52 to reliably monitor whether there is a malfunction in the corresponding one of the first and second sensors 561 and 562.

Each of the first and second microcomputers 51 and 52 is capable of comparing the rotational angle signal with the rotation number single included in the same output-signal communication frame, thus determining whether there is a malfunction in the corresponding sensor based on the result of the comparison. Because the rotational angle signal and the rotation number signal are included in the same output-signal communication frame, each of the first and second microcomputers 51 and 52 enables whether there is a malfunction in the corresponding sensor to be reliably determined based on the rotational angle single and rotation number single that have smaller errors due to their time lags.

Each of the first and second microcomputers 51 and 52 is capable of confirming that there is a malfunction in the corresponding sensor when the determination that there is a malfunction in the corresponding sensor has been for the predetermined time. This enables whether each of the sensors 561 and 562 has malfunctioned to be reliably determined without performing erroneous determination of the corresponding sensor having malfunctioned.

Each of the first and second microcomputers 51 and 52 is capable of holding, i.e. storing, in its memory unit, the rotation angle data and rotation number data included in the output signal that has received from the corresponding sensor before determining that there is a malfunction in the corresponding sensor. Then, each of the first and second microcomputers 51 and 52 is capable of continuously controlling the motor 10 using the rotational angle data and rotation number data held in its memory unit for the predetermined time until the malfunction of the corresponding sensor is confirmed, i.e. is fixedly determined. This enables continuous control of the motor 10 to be carried out without using the rotational angle data and rotation number data received from the malfunctioning sensor.

Each of the first and second microcomputers 51 and 52 is capable of terminating control of the motor 10 upon confirming that there is a malfunction in the corresponding sensor. This prevents control of the motor 10 based on the rotational angle data and rotation number data obtained from a malfunctioning sensor from being carried out.

Each of the first and second microcomputers 51 and 52 is capable of continuously performing control of the motor 10 using normal rotational angle data and rotation number data included in the output signal received from the corresponding sensor until it is determined that the malfunctioning portion has been fixed. This enables proper control of the motor 10 to be continuously carried out without using abnormal rotational angle data and rotation number data due to the malfunctioning portion.

Each of the first and second microcomputers 51 and 52 is capable of (1) Holding, when determining that there is a malfunction in the corresponding sensor, the malfunction history information about the corresponding sensor while the corresponding one of the switches 379 and 479 is on, i.e. the ignition switch is on (2) Eliminating the malfunction history information when the ignition switch, which has been turned off, is turned on again.

This configuration enables continuous control of the motor 10 to be carried out without using the output signals obtained from a malfunctioning sensor having the malfunction history information.

The first microcomputer 51 is capable of determining whether the malfunctioning portion has been fixed based on, for example, comparison between the output signal directly received from the first sensor 561 and the output signal obtained from the second microcomputer 52 using microcomputer-to-microcomputer communications.

Similarly, the second microcomputer 52 is capable of determining whether the malfunctioning portion has been fixed based on, for example, comparison between the output signal directly received from the second sensor 562 and the output signal obtained from the first microcomputer 51 using microcomputer-to-microcomputer communications.

This enables where a malfunction has occurred in the first sensor 561 and the second sensor 562 to be reliably identified.

In addition to the specific advantageous effects, the sixth embodiment achieves the same advantageous effects as those achieved by the fourth embodiment.

Seventh Embodiment

Figure 21:
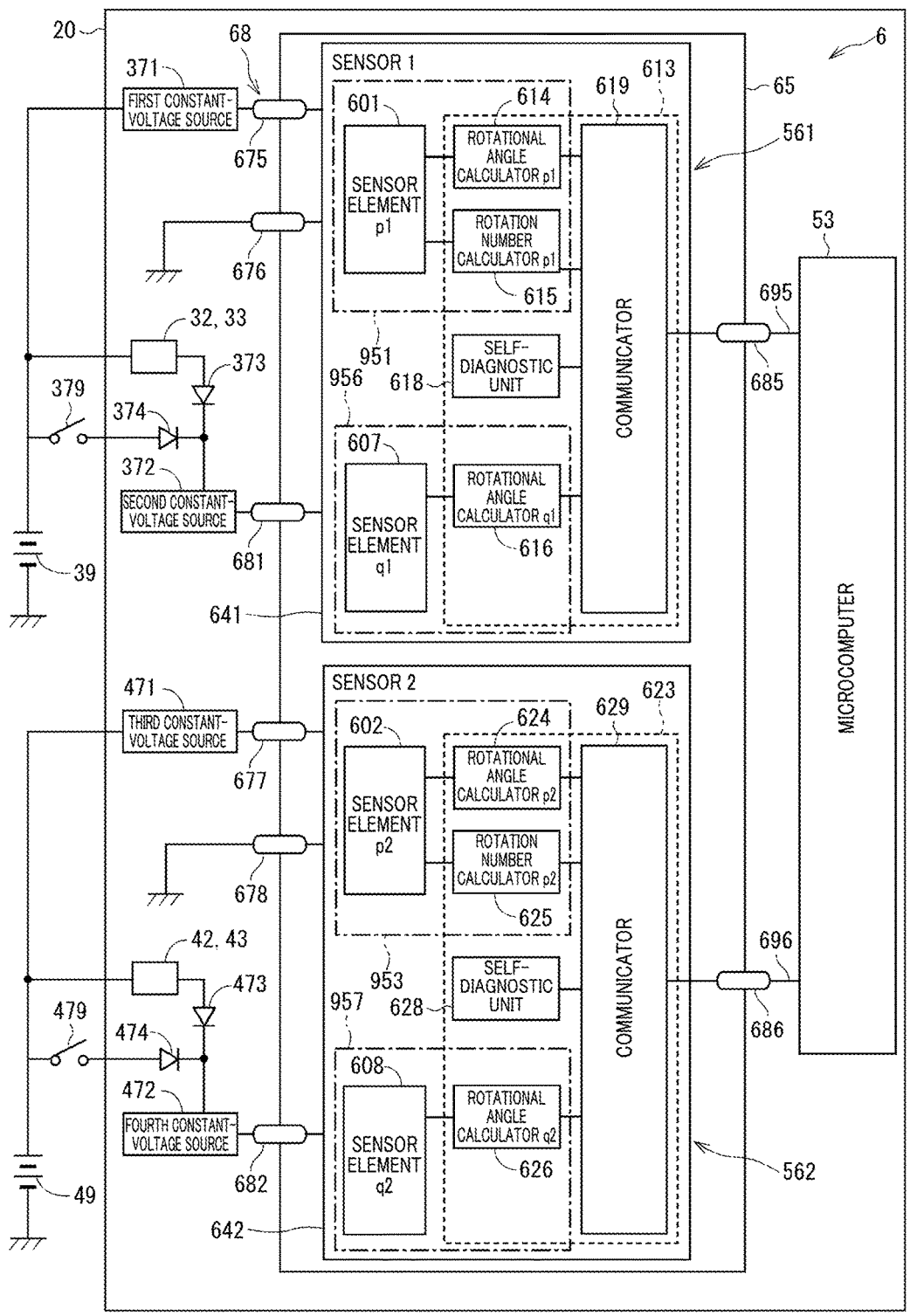
FIG. 21 is a block diagram schematically illustrating a rotation detecting apparatus according to the seventh embodiment of the present disclosure.

The following describes the seventh embodiment of the present disclosure with reference to FIG. 21. The seventh embodiment includes a rotation detecting apparatus 6 that differs from the rotation detecting apparatus 5 according to the sixth embodiment in the following points. So, the following mainly describes the different points, and omits or simplifies descriptions of like parts between the seventh and seventh embodiments, to which identical or like reference characters are assigned, thus eliminating redundant description.

The rotation detecting apparatus 6 includes a single microcomputer 53 provided for both the first and second sensors 561 and 562. That is, the microcomputer 53, which is shared by the first and second sensors 561 and 562, is communicably connected to both the first and second sensors 561 and 562 via the respective communication terminals 685 and 686. The microcomputer 53 serves as both the first and second microcomputers 51 and 52.

The microcomputer 53 according to the seventh embodiment is configured to be shared by both the first and second sensors 561 and 562 according to the sixth embodiment, but can be configured to be shared by the first and second sensors according to one of the other embodiments.

This configuration of the rotation detecting apparatus 6 eliminates the number of components of the rotation detecting apparatus 6 as compared with the configurations of the other rotation detecting apparatuses each using two microcomputers.

In addition to the specific advantageous effect, the seventh embodiment achieves the same advantageous effects as those achieved by the sixth embodiment.

Eighth Embodiment

Figure 22:
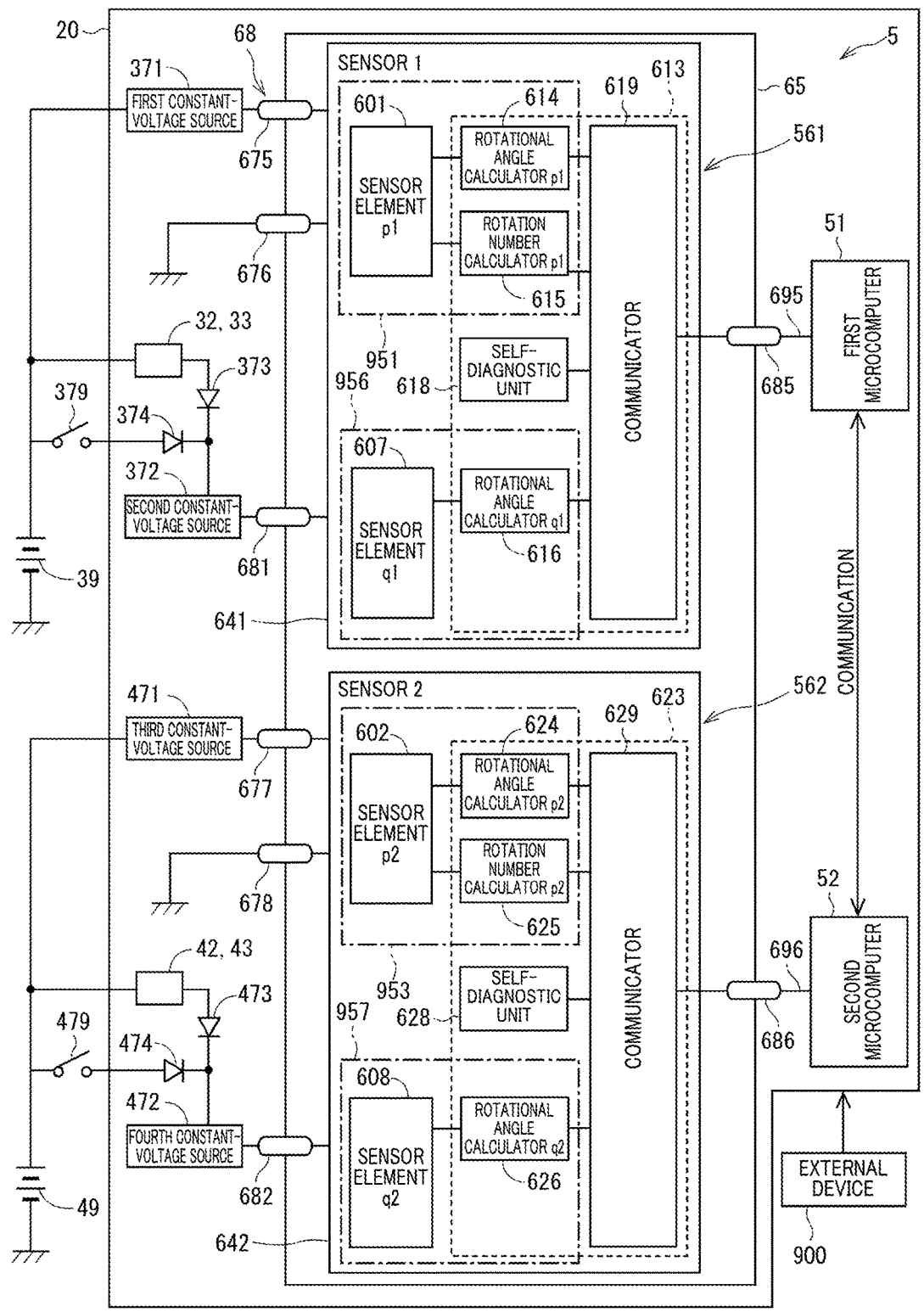
FIG. 22 is a block diagram schematically illustrating a rotation detecting apparatus according to the eighth embodiment of the present disclosure.

The following describes the eighth embodiment of the present disclosure with reference to FIG. 22. The eighth embodiment differs from the sixth embodiment in the following points. So, the following mainly describes the different points, and omits or simplifies descriptions of like parts between the eighth and sixth embodiments, to which identical or like reference characters are assigned, thus eliminating redundant description. redundant description Referring to FIG. 22, an external device 900 is communicably connected to the rotation detecting apparatus 5. A steering sensor, which measures a steering angle θs3 of the steering shaft 102, is used as the external device 900. Another device, which is capable of calculating the steering angle θs3 of the steering shaft 102, can be used as the external device 900. Note that the steering angle θs of the steering shaft 102 calculated by the first microcomputer 51 will be referred to as a steering angle θs1 of the steering shaft 102, and the steering angle θs of the steering shaft 102 calculated by the second microcomputer 52 will be referred to as a steering angle θs2 of the steering shaft 102.

The first microcomputer 51 is configured to receive the steering angle θs2 of the steering shaft 102 from the second microcomputer 52, and the steering angle θs3 of the steering shaft 102 from the external device 900. Then, the first microcomputer 51 is configured to compare with the steering angles θs1, θs2, and θs3 with each other to thereby perform (1) A first task of determining whether there is a malfunction in the rotation detecting apparatus 5

(2) A second task of identifying where a malfunctioning portion is in the rotation detecting apparatus 5.

This configuration enables the rotation detecting apparatus 5 to have more duplication, because the rotation detecting apparatus 5 performs the first and second tasks using information received from the external device 900.

In addition to the specific advantageous effect, the eighth embodiment achieves the same advantageous effects as those achieved by the sixth embodiment.

Ninth Embodiment

Figure 23:
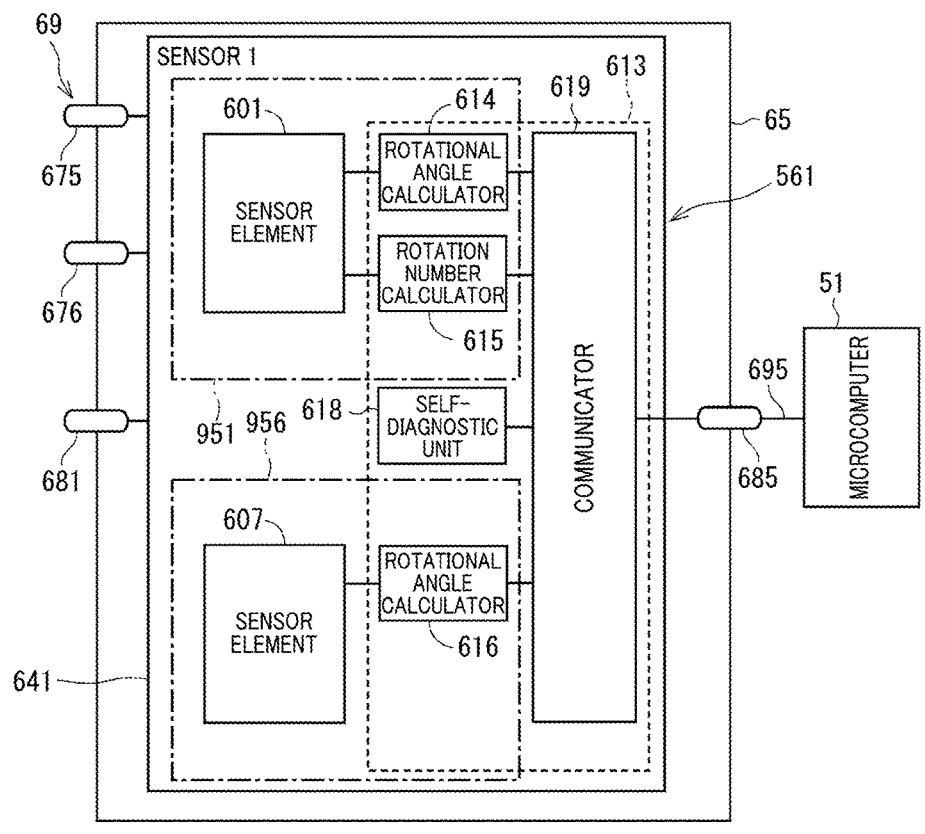
FIG. 23 is a block diagram schematically illustrating a rotation detecting apparatus according to the ninth embodiment of the present disclosure.
Figure 24:
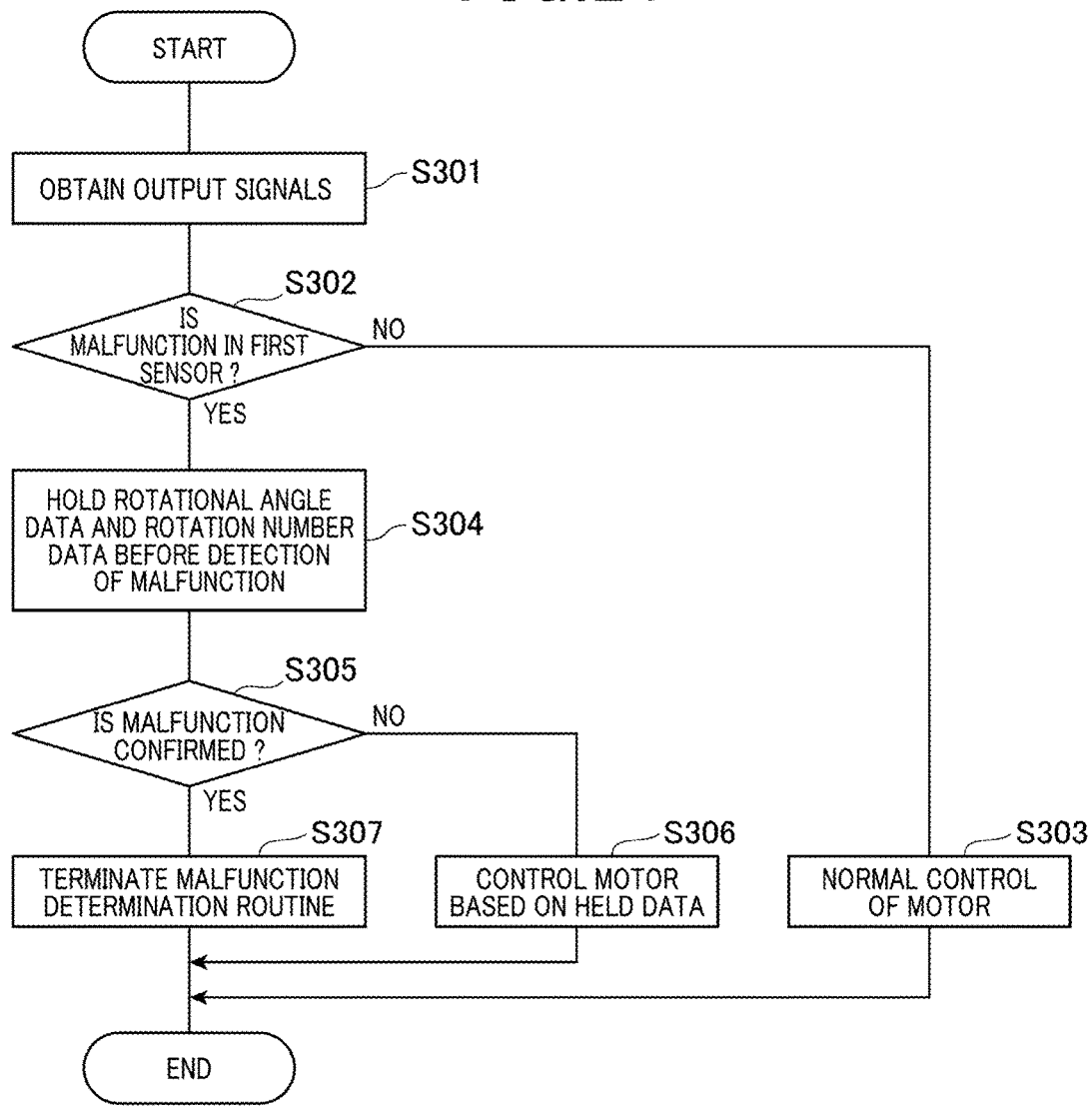
FIG. 24 is a flowchart schematically illustrating a malfunction determination routine according to the ninth embodiment.

The following describes the ninth embodiment of the present disclosure with reference to FIGS. 23 and 24. The ninth embodiment includes a rotation detecting apparatus 7 that differs from the rotation detecting apparatus 5 according to the sixth embodiment in the following points. So, the following mainly describes the different points, and omits or simplifies descriptions of like parts between the ninth and sixth embodiments, to which identical or like reference characters are assigned, thus eliminating redundant description.

The rotation detecting apparatus 7 includes only the set of the first sensor 561 and the first microcomputer 51 and their peripheral devices including the components 39, 371, 320, 330, 372, 373, and 374. In FIG. 23, the peripheral devices are omitted. That is, the sensor package 65 according to the ninth embodiment has sensor terminals 69 mounted to the respective longer sides thereof. The sensor terminals 69 are identical to the sensor terminals 67 except that the sensor terminals 69 include no terminals 675, 674, 677, and 678.

The ninth embodiment uses the sensor 561 according to the sixth embodiment, but can use the sensor according to one of the other embodiments.

Next, the following describes a malfunction determination routine carried out by the microcomputer 51 with reference to FIG. 24. The microcomputer 51 is programmed to carry out the malfunction determination routine in a predetermined period while the ignition switch is on.

When starting the malfunction determination routine, the microcomputer 51 obtains the output signal from the sensor 561 in step S301.

In step S302, the microcomputer 51 performs the first to fourth malfunction determination tasks (i) to (iv) described in the sixth embodiment to thereby determine whether there is a malfunction in the sensor 561.

When it is determined that there is a malfunction in the sensor 561 (YES in step S302), the malfunction determination routine proceeds to step S304. Otherwise, when it is determined that there is no malfunction in the sensor 561 (NO in step S302), the malfunction determination routine proceeds to step S303.

In step S303, the first microcomputer 51 performs normal control of the motor 10 in the same process as the operation in step S203.

On the other hand, when it is determined that there is a malfunction in the sensor 561 (YES in step S302), in step S304, the microcomputer 51 stores, in its memory unit, the rotational angle data and rotation number data included in the output signal that has received from the sensor 561 before determining that there is a malfunction in the sensor 561 in step S302.

Next, the microcomputer 51 determines whether to confirm that there is a malfunction in the sensor 561 in step S305. For example, the microcomputer 51 confirms that there is a malfunction in the sensor 561 when determining that the determination that there is a malfunction in the sensor 561 in step S302 has been for a predetermined time.

When it is determined that the microcomputer 51 does not confirm that there is a malfunction in the sensor 561 (NO in step S305), the malfunction determination routine proceeds to step S306. Otherwise, when it is determined that the microcomputer 51 confirms that there is a malfunction in the sensor 561 (YES in step S305), the malfunction determination routine proceeds to step S307.

In step S306, the microcomputer 51 continuously performs control of the motor 10 using the rotational angle data and rotation number data held in its memory unit.

In step S307, the microcomputer 51 terminates control of the motor 10.

As described above, even if the rotation detecting apparatus 7 includes only the single pair of the first sensor 561 and the first microcomputer 51 and their peripheral devices including the components 39, 371, 320, 330, 372, 373, and 374, it is possible to achieve at least some of the advantageous effects achieved by the sixth embodiment except advantageous effects achieved by the pair of microcomputers 51 and 52 and the pair of first and second sensors 561 and 562.

Tenth Embodiment

Figure 25A:
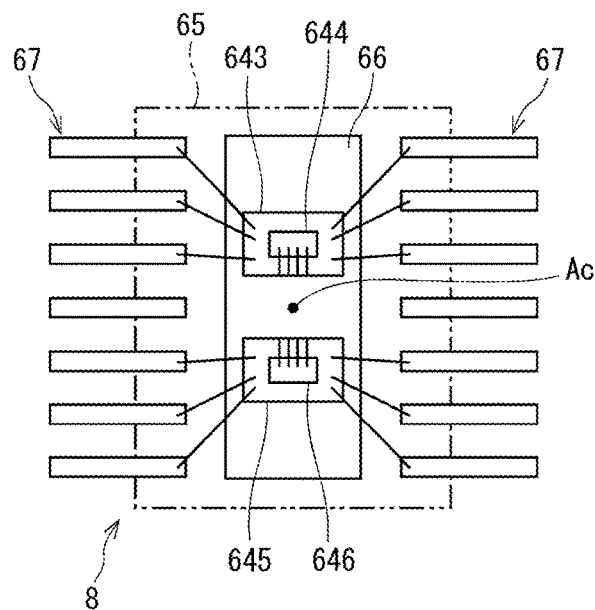
FIG. 25A is a plan view schematically illustrating a part of the rotation detecting apparatus installed in the package according to the tenth embodiment of the present disclosure.
Figure 25B:
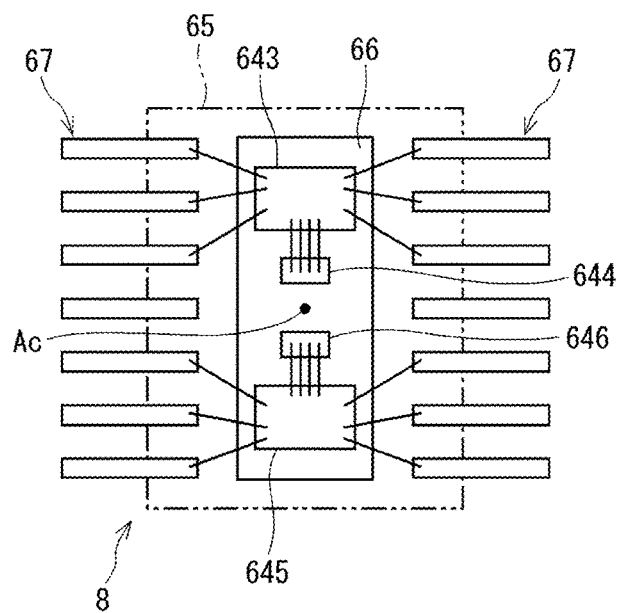
FIG. 25B is a plan view schematically illustrating a part of the rotation detecting apparatus installed in the package according to a modification of the tenth embodiment.

The following describes the tenth embodiment of the present disclosure with reference to FIGS. 25A and 25B. The tenth embodiment differs from the first embodiment in the following points. So, the following mainly describes the different points, and omits or simplifies descriptions of like parts between the tenth and first embodiments, to which identical or like reference characters are assigned, thus eliminating redundant description.

Each of FIGS. 25A to 25C corresponds to FIG. 8 according to the first embodiment. Descriptions of the first and second microcomputers 51 and 52 are omitted from each of the tenth to twelfth embodiments.

The rotation detecting apparatus 1 according to the first embodiment is configured such that the sensor element 601 and the circuit module 610 are integrated in the single chip 641, and the sensor element 602 and the circuit module 620 are integrated in the single chip 642.

In contrast, as illustrated in FIG. 25A, a rotation detecting apparatus 8 according to the tenth embodiment is configured such that (1) The circuit module 610 is integrated in a chip 643
(2) The sensor element 601 is integrated in a chip 644
(3) The circuit module 620 is integrated in a chip 645
(2) The sensor element 602 is integrated in a chip 646.

The sensor element and the circuit included in each of the chips 643, 644, 645, and 646 are omitted from FIG. 15A.

In place of the circuit module 610, the circuit modules 611 and 612 can be used, and in place of the circuit module 620, the circuit modules 621 and 622 can be used. In place of the sensor element 601, the sensor elements 603 and 604 can be used, and in place of the sensor element 602, the sensor elements 605 and 606 can be used.

Referring to FIG. 25A, the chip 643, which includes the circuit module 610, is mounted on the lead frame 66 installed in the sensor package 65, and the chip 644, which includes the sensor element 601, is mounted on an upper surface of the chip 643. The upper surface of the chip 643 is opposite to a surface mounted on the lead frame 66. Similarly, the chip 645, which includes the circuit module 620, is mounted on the lead frame 66 installed in the sensor package 65, and the chip 646, which includes the sensor element 602, is mounted on an upper surface of the chip 645. The upper surface of the chip 645 is opposite to a surface mounted on the lead frame 66.

The chips 643 and 645 are arranged to be symmetric with respect to the rotation center line Ac.

Mounting each of the chips 644 and 646 including the corresponding one of the sensor elements 601 and 602 on the corresponding one of the chips 643 and 645, which includes the corresponding one of the circuit modules 610 and 620, enables the mounting area on the lead frame 66 to be reduced, resulting in the rotation detecting apparatus 8 being downsized.

As another example, as illustrated in FIG. 25B, the chips 644 and 646, each of which includes the corresponding one of the sensor elements 601 and 602, are disposed to be closer to the rotation center line Ac than the chips 643 and 645, each of which includes the corresponding one of the circuit modules 610 and 620. In other words, the chips 644 and 646 are disposed on the inner side on the lead frame 66 with respect to the rotation center line Ac, and the chips 643 and 645 are disposed on the outer side on the lead frame 66 with respect to the rotation center line Ac. The chips 644 and 646 are also arranged to be symmetric with respect to the rotation center line Ac.

This enables the sensor elements 601 and 602 to be closer to the rotation center line Ac, resulting in reduction of measurement errors.

In addition to the specific advantageous effect, the tenth embodiment achieves the same advantageous effects as those achieved by the first embodiment.

Eleventh Embodiment

The following describes the eleventh embodiment of the present disclosure with reference to FIGS. 26 to 28B. The eleventh embodiment differs from the first embodiment in the following points. So, the following mainly describes the different points, and omits or simplifies descriptions of like parts between the eleventh and first embodiments, to which identical or like reference characters are assigned, thus eliminating redundant descriptions.

The rotation detecting apparatus 1 according to the first embodiment is configured such that the first and second sensors 61 and 62 are installed in the single package 65.

Figure 26:
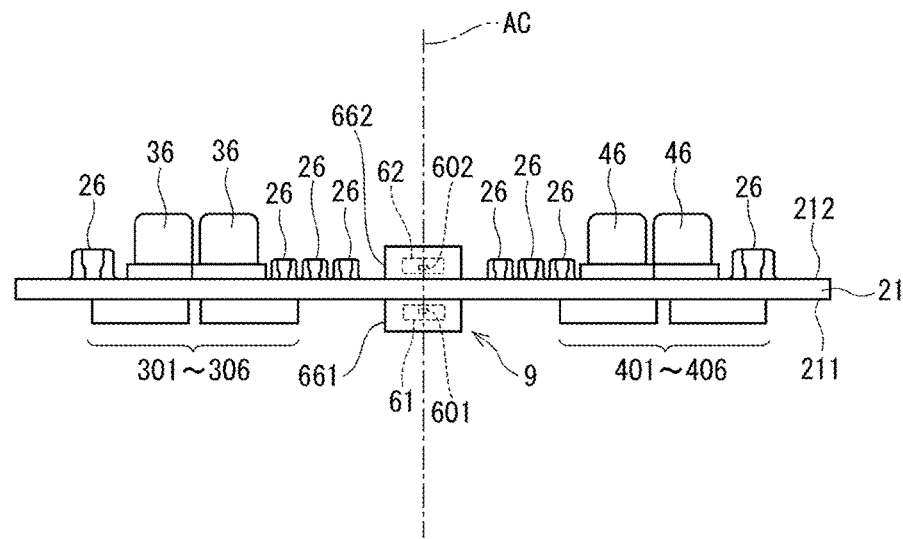
FIG. 26 is a side view of the first circuit board according to the eleventh embodiment of the present disclosure.

In contrast, as illustrated in FIG. 26, a rotation detecting apparatus 9 according to the eleventh embodiment is configured such that the first sensor 61 is installed in a first package 661, and the second sensor 62 is installed in a second package 662. Specifically, the first and second packages 661 and 662 are separately provided for the respective first and second sensors 61 and 62. The configuration of each of the first and second sensors 61 and 62 can be identical to the corresponding sensor of one of the embodiments other than the first embodiment.

Figure 27:
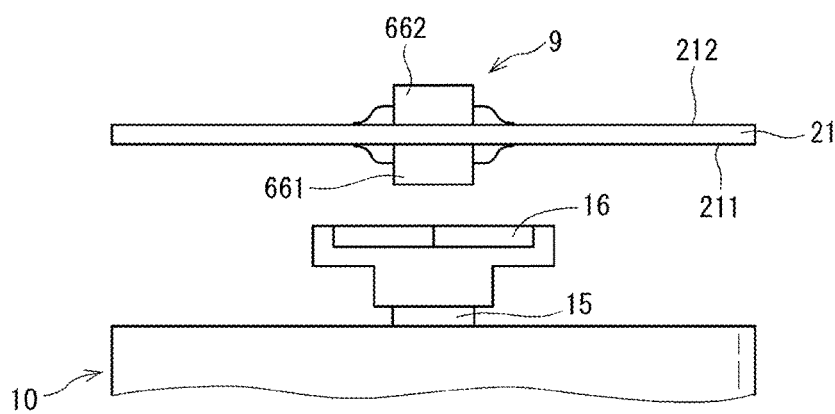
FIG. 27 is a side view of the rotation detecting apparatus according to the eleventh embodiment.

Referring to FIGS. 26 and 27, the first package 661 is mounted on the first major surface 211 of the first circuit board 21, and the second package 662 is mounted on the second major surface 212 of the first circuit board 21. Mounting the first and second packages 661 and 662 on the respective first and second major surfaces 211 and 212 of the first circuit board 21 enables the mounting areas of the first circuit board 21 to be reduced. Preferably, the first and second packages 661 and 662 are arranged such that the sensor element 601 of the first sensor 61 and the sensor element 602 of the second sensor 62 are disposed on the rotation center line Ac, resulting in the rotation detecting apparatus 9 having higher detection accuracy.

Figure 28A:
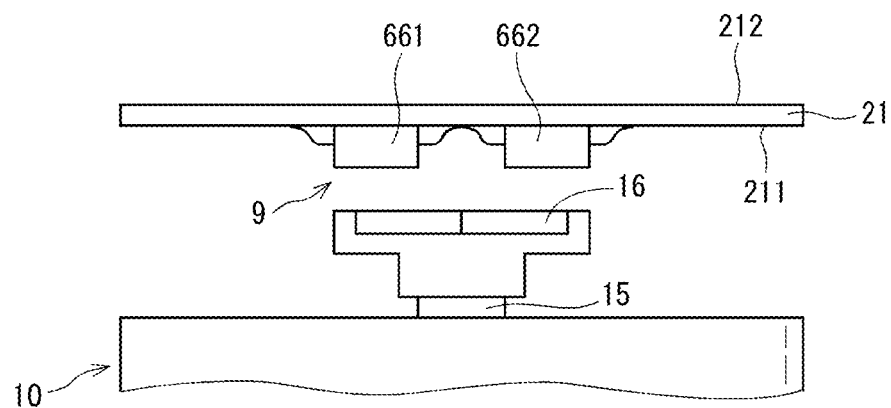
FIG. 28A is a side view of the rotation detecting apparatus according to a first modification of the eleventh embodiment.
Figure 28B:
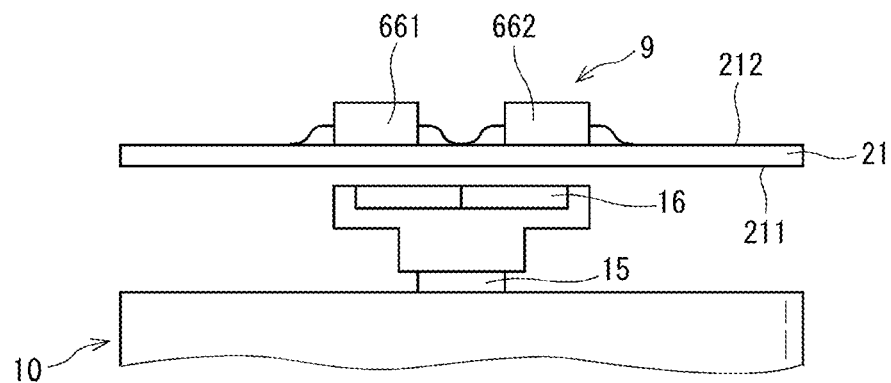
FIG. 28B is a side view of the rotation detecting apparatus according to a first modification of the eleventh embodiment.

As another example, the rotation detecting apparatus 9 is configured such that the first and second packages 661 and 662 are mounted on the first major surface 211 of the first circuit board 21 (see FIG. 28A). As a further example, the rotation detecting apparatus 9 is configured such that the first and second packages 661 and 662 are mounted on the second major surface 212 of the first circuit board 21 (see FIG. 28B).

As described above, the rotation detecting apparatus 9 according to the eleven embodiment is configured such that the at least one pair of first sensor 61 and second sensor 62 are individually installed in the separate first and second packages 661 and 662. This configuration of the rotation detecting apparatus 9 results in a higher flexibility of arranging the rotation detecting apparatus 9. This configuration of the rotation detecting apparatus 9 also prevents both the first and second motor drive systems 901 and 902 from simultaneously malfunctioning due to a failure in one of the first and second packages 661 and 662. That is, even if there is a failure in one of the first and second packages 661 and 662, the components of the other of the first and second packages 661 and 662 enable the rotational angle θm and the rotation number TC to be continuously calculated.

In addition to the specific advantageous effects, the eleventh embodiment achieves the same advantageous effects as those achieved by the first embodiment.

Twelfth Embodiment

Figure 29:
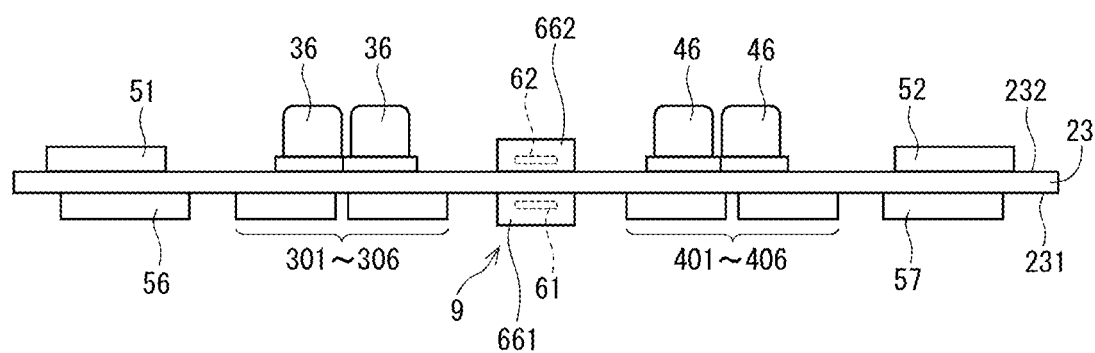
FIG. 29 is a side view of the first circuit board according to the twelfth embodiment of the present disclosure.

The following describes the twelfth embodiment of the present disclosure with reference to FIG. 29. The twelfth embodiment differs from the eleventh embodiment in the following points. So, the following mainly describes the different points, and omits or simplifies descriptions of like parts between the twelfth and eleventh embodiments, to which identical or like reference characters are assigned, thus eliminating redundant description.

As illustrated in FIG. 29, a rotation detecting apparatus 9A according to the twelfth embodiment is configured such that the switching elements 301 to 306, 401 to 406, capacitors 36 and 46, and the rotation detecting 9A are mounted on a first major surface 231 of a single circuit board 23, and the first and second microcomputers 51 and 52, and the first and second integrated circuits 56 and 57 are mounted on a second major surface 232, which is opposite to the first major surface 231, of the circuit board 23. Some components, such as spring terminals, are omitted from FIG. 29.

In addition, the rotation detecting apparatus 9A is configured such that the first sensor 61 is installed in the first package 661, and the second sensor 62 is installed in the second package 662.

Referring to FIG. 29, the first package 661 is mounted on the first major surface 231 of the circuit board 23; the first major surface 231 constitutes the motor-controlling major surface on which the components for controlling the motor 10 are mounted. The second package 662 is mounted on the second major surface 232 of the circuit board 23; the second major surface 232 constitutes the surface opposite to the motor-controlling major surface.

That is, the components of the drive apparatus 800 are mounted to the single circuit board 23.

The first and second packages 661 and 662 can be mounted on one of the first and second major surfaces 231 and 232 of the circuit board 23, or the first and second sensors 61 and 62 can be installed in a single package. If the first and second sensors 61 and 62 can be installed in a single package, the rotation detecting apparatus 9A is preferably mounted on the first manor surface 231 of the circuit board 23 for the sake of higher detection accuracy.

Mounting the components of the drive apparatus 800 on both the major surfaces of the single circuit board 23 results in reduction of the number of components of the steering apparatus 100. As compared with the configuration in which the components of the drive apparatus 800 are stacked on one of the major surfaces in the axial direction, the configuration of the twelfth embodiment results in downsizing of the drive apparatus 800.

In addition to the specific advantageous effects, the twelfth embodiment achieves the same advantageous effects as those achieved by the eleventh embodiment.

Modifications

The present disclosure is not limited to the above described embodiments, and can be variably modified within the scope of the present disclosure.

The rotation detecting apparatus according to each of the first to twelfth embodiments includes the first sensor and the second sensor, but can include a single sensor or three or more sensors.

The rotation detecting apparatus according to some of the embodiments includes one or two rotation information calculators provided for each of the sensors, but can include three or more rotation information calculators provided for each of the sensors.

The rotation detecting apparatus according to each of the first to twelfth embodiments includes one or more sensors provided for each of the circuit modules, but three or more sensors provided for each of the circuit modules.

Each of the first to twelfth embodiments is configured such that each sensor and the corresponding microcomputer communicate with each other in accordance with the SPI, but can communicate with each other in accordance with predetermined types of digital communication interfaces, such as a single edge nibble transmission (SENT) interface as long as each type of the digital communication interfaces can include a series of, i.e. a set of, the rotational angle signal and the rotation number signal as the output signal.

The rotation detecting apparatus according to the fifth embodiment is configured to change the frequency of updating, i.e. calculating, the rotation number TC in accordance with whether the motor 10 is operating. The rotation detecting apparatus according to a modification can be configured to perform updating of the rotation number TC independently of how the motor 10 is operating or the power steering apparatus 108 is operating.

The rotation detecting apparatus according to each of the first to twelfth embodiments is configured to detect rotation of the motor 10 as its detection target, but can be configured to detect rotation of another detection target.

Each of the first to twelfth embodiments uses a three-phase brushless motor as the motor 10, but can use another type of motors, a power generator, or a motor-generator serves as both a motor and a power generator.

At least the first embodiment is configured such that the sensor package 65 including the first and second sensors 61 and 62 and the components for driving the motor 10 are mounted to the first circuit board 21, and the components for controlling how the motor 10 is driven are mounted to the second circuit board 22, but the present disclosure is not limited thereto. Specifically, at least part of the components, which will be referred to as control components, for controlling how the motor 10 is driven can be mounted to the first substrate 21, and at least part of the components, which will be referred to as drive components, for driving the motor 10 can be mounted to the second circuit board 22.

As a modification, the driving components for the motor 10 and the control components for the motor 10, which are included in the first motor drive system 901, can be mounted to the first circuit board 21, and the driving components for the motor 10 and the control components for the motor 10, which are included in the second motor drive system 902, can be mounted to the second circuit board 22. This modification enables, even if one of the first and second circuit boards 21 and 22 has malfunctioned, the drive components for the motor 10 and the control components for the motor 10, which are mounted to the other of the first and second circuit boards 21 and 22, to continuously controllably drive the motor 10, i.e. the power steering apparatus 108.

If the rotation detecting apparatus according to each embodiment uses a plurality of circuit boards, the rotation detecting apparatus can includes heatsinks each disposed between a corresponding at least one adjacent pair of the circuit boards. That is, each heatsink enables one or more of the components mounted to the corresponding one adjacent pair of the circuit boards to dissipate heat from the one or more components.

The drive apparatus 800 of each of the first to twelfth embodiments is applied to the electronic power steering apparatus 108, but can be applied to another apparatus.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A rotation detecting apparatus comprising:
a sensor comprising a sensor element that outputs a measurement value indicative of rotation of a detection target, and a circuit module, the circuit module comprising:
a rotational angle calculator configured to calculate, based on the measurement value, rotational angle information indicative of a rotational angle of the detection target, and generate a rotational angle signal including the rotational angle information;
a rotation number calculator configured to calculate, based on the measurement value, rotation number information indicative of the number of rotations of the detection target, and generate a rotation number signal including the rotation number information; and
an output unit configured to output, as an output signal, a communication frame storing a series of at least the rotational angle signal and the rotation number signal; and
a controller configured to obtain the output signal from the communicator, and calculate, based on the output signal, information associated with the rotation of the detection target.

2. The rotation detecting apparatus according to claim 1, wherein:
the controller is configured to send, to the output unit, a command signal representing:
signals that are requested to be included in the output signal, the signals including at least the rotational angle signal and the rotation number signal; and
a timing to output the output signal to the controller; and
the output unit is configured to generate, based on the command signal, the output signal including at least the rotational angle signal and the rotation number signal, and output the output signal at the timing included in the command signal.

3. The rotation detecting apparatus according to claim 1, wherein:
the rotation number calculator is configured to:
calculate the rotation number information at a predetermined frequency; and
determine how the frequency of calculation of the rotation number information is changed depending on whether the detection target is operating.

4. The rotation detecting apparatus according to claim 1, wherein:
the sensor element comprises a first sensor element and a second sensor element, each of the first and second sensor elements being configured to independently output the measurement value indicative of rotation of the detection target;
the rotational angle calculator is configured to calculate, based on the measurement value output from the first sensor element, the rotational angle information; and
the rotational number calculator is configured to calculate, based on the measurement value output from the second sensor element, the rotation number information.

5. The rotation detecting apparatus according to claim 1, wherein:
the controller is configured to periodically send, to the output unit, the command signal; and
each of the rotational angle calculator and the rotation number calculator is configured to calculate the corresponding one of the rotational angle information and the rotation number information for each time the command signal is periodically sent to the circuit module from the controller.

6. The rotation detecting apparatus according to claim 1, wherein:
the sensor element comprises a plurality of sensor elements provided for the output unit;
the rotational angle calculator comprises a plurality of rotational angle calculators connected to the respective sensor elements and connected to the output unit; and
the rotation number calculator comprises a plurality of rotation number calculators connected to the respective sensor elements and connected to the output unit.

7. The rotation detecting apparatus according to claim 1, wherein:
the detection target is included in an electrical system connected to the sensor; and
the sensor is connected to a battery and is configured such that electrical power output from the battery is supplied thereto via a predetermined power supply path even if the electrical system is shut down.

8. The rotation detecting apparatus according to claim 7, further comprising:
a power supply terminal connected to the battery via a constant voltage circuit on the power supply path, the constant-voltage circuit regulating the electrical power output from the battery, wherein:
the sensor element is configured such that the regulated electrical power is supplied thereto.

9. The rotation detecting apparatus according to claim 1, further comprising:
a single package,
wherein the sensor comprises a plurality of sensors installed in the single package.

10. The rotation detecting apparatus according to claim 1, further comprising:
a plurality of packages,
wherein the sensor comprises a plurality of sensors installed in the respective packages.

11. The rotation detecting apparatus according to claim 1, wherein:
the circuit module comprises a self-diagnostic unit configured to perform a diagnostic task to diagnose whether there is a fault therein.

12. The rotation detecting apparatus according to claim 11, wherein:
the self-diagnostic unit is configured to output a self-diagnostic signal indicative of a result of the diagnostic task to the output unit; and
the output unit is configured to output, as the output signal, the series of at least the rotational angle signal, the rotation number signal, the self-diagnostic signal, a counter signal, and an error detection signal; and
the controller is configured to determine whether there is a malfunction in the sensor based on the run counter signal, the self-diagnostic signal, and the error detection signal.

13. The rotation detecting apparatus according to claim 12, wherein:
the controller is configured to confirm that there is a malfunction in the sensor when determination that there is a malfunction in the sensor has continued for a predetermined time.

14. The rotation detecting apparatus according to claim 13, wherein:
the controller is configured to:
store therein the rotational angle information and the rotation number information included in the output signal before determining that there is a malfunction in the sensor; and
continuously calculate, based on the rotational angle information and the rotation number information held therein, the information associated with the rotation of the detection target for the predetermined time until confirming that there is a malfunction in the sensor.

15. The rotation detecting apparatus according to claim 13, wherein the controller is configured to terminate calculation of the information associated with the rotation of the detection target upon confirming that there is a malfunction in the sensor.

16. The rotation detecting apparatus according to claim 13, wherein the controller is configured to:
identify where a malfunctioning portion is in the sensor; and
continuously calculate, based on the output signal, the information associated with the rotation of the detection upon the rotational angle information and the rotation number information being independent from the identified malfunctioning portion.

17. The rotation detecting apparatus according to claim 13, wherein:
the sensor is connected to a battery and is configured such that electrical power output from the battery is supplied thereto via a switch that is on; and
the controller is configured to:
store, upon the controller confirming that there is a malfunction in the sensor, historical information indicative of the sensor having malfunctioned while the switch is on; and
eliminate the historical information upon the switch, which has been turned off, being turned on.

18. The rotation detecting apparatus according to claim 1, wherein:
the controller is configured to compare the rotational angle signal included in the output signal with the rotation number signal included in the output signal, thus determining whether there is a malfunction in the sensor.

19. The rotation detecting apparatus according to claim 1, wherein:
the sensor comprises at least a first sensor and a second sensor,
the first sensor being configured to output, as the output signal, a first output signal obtained thereby, the second sensor being configured to output, as the output signal, a second output signal obtained thereby; and
the controller comprises at least a first controller and a second controller,
the first controller being configured to:
obtain the first output signal from the first sensor; and
calculate, based on the first output signal, the information associated with the rotation of the detection target,
the second controller being configured to:
obtain the second output signal from the second sensor; and
calculate, based on the second output signal, the information associated with the rotation of the detection target.

20. The rotation detecting apparatus according to claim 19, wherein:
the first and second controllers are communicably connected to each other; and
the first controller is configured to:
obtain, from the second controller, the second output signal;
perform a comparison between the first output signal and the second output signal; and
identify where a malfunctioning portion is in the first sensor based on a result of the comparison.

21. The rotation detecting apparatus according to claim 1, wherein:
the communication frame additionally stores an error detection signal calculated based on the rotational angle signal and the rotation number signal stored in the communication frame.

22. An electric power steering apparatus comprising:
a motor configured to provide assist torque for assisting a driver's operation of a steering wheel; and
the rotation detecting apparatus comprising:
a sensor comprising a sensor element that outputs a measurement value indicative of rotation of a detection target, and a circuit module, the circuit module comprising:
a rotational angle calculator configured to calculate, based on the measurement value, rotational angle information indicative of a rotational angle of the detection target, and generate a rotational angle signal including the rotational angle information;
a rotation number calculator configured to calculate, based on the measurement value, rotation number information indicative of the number of rotations of the detection target, and generate a rotation number signal including the rotation number information; and
an output unit configured to output, as an output signal, a communication frame storing a series of at least the rotational angle signal and the rotation number signal; and
a controller configured to obtain the output signal from the communicator, and calculate, based on the output signal, information associated with the rotation of the detection target,
wherein the sensor element of the rotation detecting apparatus is configured to output the measurement value indicative of rotation of the motor as the detection target.

23. The electric power steering apparatus according to claim 22, wherein:
the controller of the rotation detecting apparatus is configured to calculate, based on the rotational angle information and the rotation number information, a steering angle of the steering wheel.

* * * * *